United States Patent
Arakage et al.

(10) Patent No.: US 9,848,187 B2
(45) Date of Patent: Dec. 19, 2017

(54) MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

(71) Applicant: JVC KENWOOD Corporation, Yokohama-shi (JP)

(72) Inventors: Kazumi Arakage, Yokosuka (JP); Hideki Takehara, Yokosuka (JP); Shigeru Fukushima, Yokosuka (JP); Hiroya Nakamura, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 462 days.

(21) Appl. No.: 14/299,830

(22) Filed: Jun. 9, 2014

(65) Prior Publication Data

US 2014/0286429 A1    Sep. 25, 2014

Related U.S. Application Data

(63) Continuation of application No. PCT/JP2012/008443, filed on Dec. 28, 2012.

(30) Foreign Application Priority Data

Dec. 28, 2011  (JP) .................................. 2011-289669
Dec. 28, 2011  (JP) .................................. 2011-289670

(51) Int. Cl.
*H04N 7/12* (2006.01)
*H04N 19/583* (2014.01)
(Continued)

(52) U.S. Cl.
CPC ..... *H04N 19/00733* (2013.01); *H04N 19/503* (2014.11); *H04N 19/52* (2014.11); *H04N 19/593* (2014.11)

(58) Field of Classification Search
None
See application file for complete search history.

(56) References Cited

U.S. PATENT DOCUMENTS

2009/0177952 A1*  7/2009  Yokosato ....... H04N 21/234309
                                                  714/799
2012/0195368 A1*  8/2012  Chien ................... H04N 19/52
                                                  375/240.02

(Continued)

FOREIGN PATENT DOCUMENTS

| JP | 10-276439 A | 10/1998 |
|---|---|---|
| JP | 2014-509480 A | 4/2014 |
| WO | WO-2012/102927 A1 | 8/2012 |

OTHER PUBLICATIONS

Decision of Refusal in Japanese Patent Application No. 2011-289669, dated Apr. 28, 2015.
(Continued)

*Primary Examiner* — Dakshesh Parikh
(74) *Attorney, Agent, or Firm* — Venable LLP; Michael A. Sartori; Miguel A. Lopez

(57) ABSTRACT

A merging motion information calculating unit calculates motion information of a plurality of coded neighboring blocks located at predetermined positions neighboring to a coding target block in space as spatial motion information candidates of the coding target block, in a case where there are spatial motion information candidates having the same motion information out of the spatial motion information candidates, sets one of the spatial motion information candidates having the same motion information as the spatial motion information candidate and, calculates a temporal
(Continued)

motion information candidate of the coding target block by using the motion information of a coded block included in a picture that is different in time from a picture including the coding target block, and includes the spatial motion information candidates and the temporal motion information candidate in candidates for the motion information.

3 Claims, 49 Drawing Sheets

(51) Int. Cl.
*H04N 19/52* (2014.01)
*H04N 19/503* (2014.01)
*H04N 19/593* (2014.01)

(56) References Cited

U.S. PATENT DOCUMENTS

2012/0320984 A1* 12/2012 Zhou .................. H04N 19/50
    375/240.16
2014/0140408 A1* 5/2014 Lee .................. H04N 19/00587
    375/240.16

OTHER PUBLICATIONS

Decision of Refusal in Japanese Patent Application No. 2011-289670, dated Apr. 28, 2015.
Thomas Wiegand, et al., "WD1: Working Draft 1 of High-Efficiency Video Coding," Joint Collaborative Team on Video Coding (JCT-VC) of ITU-T SG16 WP3 and ISO/IEC JTC1/SC29/WG11 3rd Meeting: Guangzhou, CN, Oct. 7, 2010.
Guillaume Laroche, et al., "Non-CE9: On parallel derivation of the temporal predictor for Merge/Skip modes", Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G241.
Notification of Reasons for Refusal in Japanese Patent Application No. 2011-289669, dated Jan. 13, 2015.
Notification of Reasons for Refusal in Japanese Patent Application No. 2011-289670, dated Jan. 13, 2015.
Hideki Takehara et al., "Non-CE9: Merge candidates pruning without TMVP," Joint Collaborative Team on Video Coding (JCT-VC) of ITU-T SG16 WP3 and ISO/IEC JTC1/SC29/WG11 8th Meeting: San Jose, CA, USA, Feb. 1, 2012.
International Search Report in PCT International Application No. PCT/JP2012/008443, dated Mar. 26, 2013.
International Preliminary Report on Patentability and Written Opinion in PCT International Application No. PCT/JP2012/008443, dated Jul. 1, 2014.

* cited by examiner

FIG.3

| PREDICTION BLOCK SIZE | | INTER-CU PARTITION MODE | | | |
|---|---|---|---|---|---|
| | | 2Nx2N (0) | 2NxN (1) | Nx2N (2) | NxN (3) |
| NUMBER OF CU PARTITIONS | 0 | 64x64 | 64x32 | 32x64 | - |
| | 1 | 32x32 | 32x16 | 16x32 | - |
| | 2 | 16x16 | 16x8 | 8x16 | - |
| | 3 | 8x8 | 8x4 | 4x8 | 4x4 |

SINGLE DIRECTION 1

SINGLE DIRECTION 2

BI-DIRECTION 1

BI-DIRECTION 2

| INDEX | COMPARISON TARGET INDEX |
|---|---|
| 1 | 1 | 0 |
| 2 | 2 | 0 |
| 3 | 2 | 1 |
| 4 | 3 | 0 |
| 5 | 3 | 1 |
| 6 | 3 | 2 |

FIG.17A

| INDEX | COMPARISON TARGET INDEX |
|---|---|
| 1 | 1 | 0 |
| 2 | 2 | 0 |
| 3 | 2 | 1 |
| 4 | 3 | 0 |
| 5 | 3 | 1 |
| 6 | 3 | 2 |
| 7 | 4 | 0 |
| 8 | 4 | 1 |
| 9 | 4 | 2 |
| 10 | 4 | 3 |

FIG.17B

CASE WHERE PREDICTION BLOCK IS SMALLER THAN MINIMAL SPATIAL PREDICTION BLOCK

BLOCK ON CoIPic LOCATED AT SAME POSITION AS THAT OF PREDICTION TARGET BLOCK

FIG.22

| loopTimes | M | N |
|---|---|---|
| 0 | 0 | 1 |
| 1 | 1 | 0 |
| 2 | 0 | 2 |
| 3 | 2 | 0 |
| 4 | 1 | 2 |
| 5 | 2 | 1 |
| 6 | 0 | 3 |
| 7 | 3 | 0 |

FIG.25

| Value (MERGING MOTION INFORMATION INDEX) | codeNum |
|---|---|
| 0 | 0 |
| 1 | 10 |
| 2 | 110 |
| 3 | 1110 |
| 4 | 1111 |

FIG.32

| INDEX | COMPARISON TARGET INDEX |
|---|---|
| 1 | 0 |
| 2 | 1 |
| 3 | 2 |
| 3 | 0 |

| numCand | numCompare[numCand] |
|---|---|
| 0 | 0 |
| 1 | 0 |
| 2 | 1 |
| 3 | 3 |
| 4 | 4 |

FIG.37A

| i | cur[i] | ref[i] |
|---|---|---|
| 0 | 1 | 0 |
| 1 | 2 | 0 |
| 2 | 2 | 1 |
| 3 | 3 | 0 |

| BEFORE ADDING LEAD | AFTER ADDING LEAD |
|---|---|
| 0 | 0 |
| 1 | 1 |
| 2 | 2 |
| — | 2 |

FIG.40B

| INDEX | COMPARISON TARGET INDEX |
|---|---|
| 1 | 0 |
| 2 | 1 |
| 2 | 2 |
| 2 | 0 |

FIG.43

| i | cur[i] | ref[i] |
|---|--------|--------|
| 0 | 1 | 0 |
| 1 | 2 | 1 |
| 2 | 3 | 1 |
| 3 | 3 | 0 |

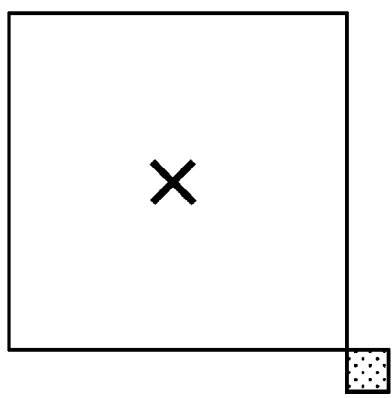
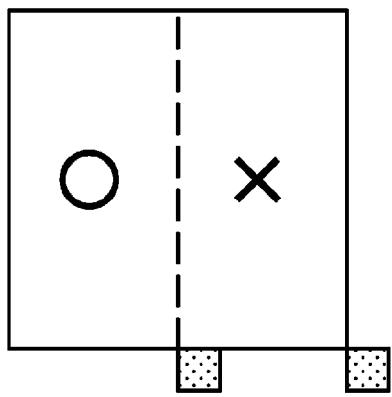
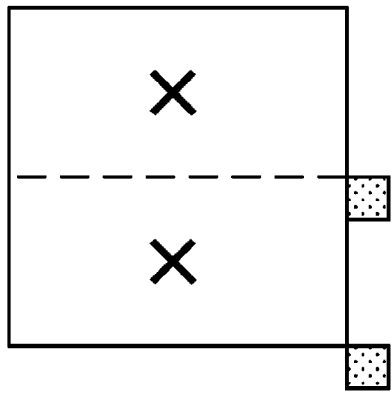
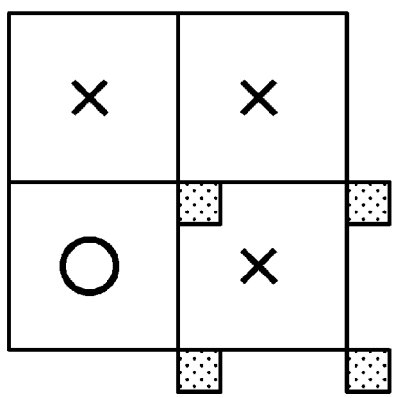
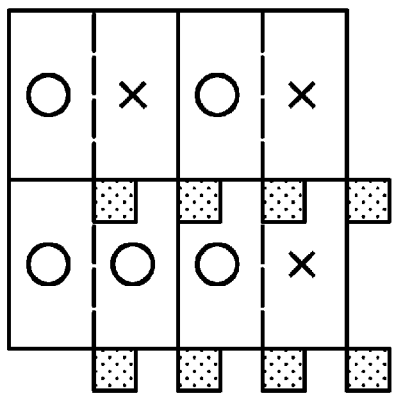
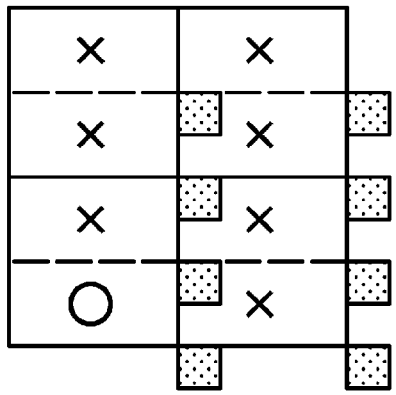

| numCand | numCompare[numCand] |
|---|---|
| 0 | 0 |
| 1 | 0 |
| 2 | 1 |
| 3 | 3 |
| 4 | 4 |
| 5 | 4 |

FIG.48A

| i | cur[i] | ref[i] |
|---|---|---|
| 0 | 1 | 0 |
| 1 | 2 | 0 |
| 2 | 2 | 1 |
| 3 | 3 | 0 |

FIG.48B

CASE WHERE THERE ARE FOUR VALID SPATIAL CANDIDATES

CASE WHERE THERE ARE THREE VALID SPATIAL CANDIDATES

MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

BACKGROUND

The present invention relates to moving picture coding and decoding technologies using a motion-compensated prediction and, more particularly, to a moving picture coding device, a moving picture coding method, and a moving picture coding program, and a moving picture decoding device, a moving picture decoding method, and a moving picture decoding program that are used for a motion-compensated prediction.

In moving picture coding represented by MPEG-4 AVC/H.264 (hereinafter, referred to as AVC) or the like, a motion-compensated prediction is used in which a picture is partitioned into rectangular blocks, and a motion is estimated and compensated between pictures in units of blocks. In the motion-compensated prediction, in order to reduce the coding amount of a motion vector generated in each block, a prediction process is performed.

In the AVC, a predicted value is calculated based on a neighboring block by using the presence of a strong correlation between motion vectors of neighboring blocks, and a differential vector with respect to the predicted value is coded, whereby the coding amount is reduced. However, in such a prediction method, since the position of the neighboring block to be referred to is limited, a difference between motion vectors is large when the prediction is incorrect, and there is a problem in that the amount of generated coding increases. In addition, although the coding amount of the motion vector is reduced, the other motion information such as a predicted direction, a reference picture index, and the like is coded for each processing target block, and accordingly, there is a problem in that efficient coding is not achieved.

In order to solve such problems, as disclosed in Japanese Patent Application Laid-Open No. JP 10-276439 A, a merge coding technology is used in which, by coding additional information used for specifying a neighboring bock from among a plurality of neighboring blocks, motion information of a processing target block is not coded, but coding is performed using the motion information of a neighboring block, whereby the coding amount is reduced.

According to the merge coding, instead of coding the motion information of a processing target block, coding is performed by using the motion information of a block that is neighboring in space and time, and accordingly, the coding amount is reduced to improve the coding efficiency. In addition, by preparing a plurality of candidates for the neighboring block to be referred to and coding the additional information specifying the neighboring block to be referred to, a neighboring block of which the motion information is closer to the motion information of the coding target block can be referred to.

Accordingly, in a case where a plurality of neighboring blocks having the same motion information are included in reference neighboring block candidates, the number of kinds of motion information that can be represented by the reference neighboring block candidates is small, and, consequently, the improvement of the coding efficiency is not achieved. However, in a case where the motion information of the reference neighboring block candidates is compared in detail, and reference neighboring block candidates having the same motion information are removed, the processing amount increases.

SUMMARY

The present invention is contrived in consideration of such situations, and an object thereof is to provide a technology having a small processing load and improved coding efficiency of the motion information in a case where coding is performed using the motion information of a neighboring block.

In order to solve the problem described above, according to an aspect of the present invention, a moving picture coding device that codes moving picture data in units of blocks acquired by partitioning each picture of the moving picture data includes:

a candidate list constructing unit (906) configured to derive motion information of a coded block included in a picture that is different in time from a picture including a coding target block that is a target for the coding, derive a temporal motion information candidate of the coding target block based on the derived motion information of the coded block, derive a plurality of candidates based on motion information of a plurality of coded neighboring blocks located at predetermined positions neighboring to the coding target block in space, derive spatial motion information candidates based on the plurality of derived candidates, and construct a list of motion information candidates including the derived temporal motion information candidate and the derived spatial motion information candidates;

a prediction mode determining unit (109) configured to determine whether to perform the coding in a merging prediction mode deriving the motion information of the coding target block based on the motion information candidates included in the list; and a coding unit (103, 110) configured to code information representing whether or not the coding is performed in the merging prediction mode, code an index designating a predetermined motion information candidate included in the list in a case where the coding is determined to be performed in the merging prediction mode, derive the motion information of the coding target block based on the motion information candidate designated by the coded index, and code the coding target block. The candidate list constructing unit (906), in a case where there are candidates having the same moving information out of the candidates, derives one spatial motion information candidate from the candidates of which the motion information is the same.

According to another aspect of the present invention, there is provided a moving picture coding method. This method is a moving picture coding method for coding moving picture data in units of blocks acquired by partitioning each picture of moving picture data. The moving picture coding method includes: deriving motion information of a coded block included in a picture that is different in time from a picture including a coding target block that is a target for the coding, deriving a temporal motion information candidate of the coding target block based on the derived motion information of the coded block, deriving a plurality of candidates based on motion information of a plurality of coded neighboring blocks located at predetermined positions neighboring to the coding target block in space, deriving spatial motion information candidates based on the plurality of derived candidates, and constructing a list of motion information candidates including the derived temporal motion information candidate and the spatial motion information candidates; determining whether to perform the coding in a merging prediction mode deriving the motion information of the coding target block based on the motion information candidates included in the list; and coding information representing whether or not the coding is performed in the merging prediction mode, coding an index designating a predetermined motion information candidate included in the list in a case where the coding is determined to be performed in the merging prediction mode, deriving the motion information of the coding target block based on the motion information candidate designated by the coded index, and coding the coding target block. In the constructing of a list of motion information candidates, in a case where there are candidates having the same moving information out of the candidates, one spatial motion information candidate is derived from the candidates of which the motion information is the same.

According to an aspect of the present invention, a moving picture decoding device that decodes a coded bitstream in units of blocks acquired by partitioning each picture of moving picture data includes:

a candidate list constructing unit (2604) configured to derive motion information of a decoded block included in a picture that is different in time from a picture including a decoding target block that is a target for the decoding, derive a temporal motion information candidate of the decoding target block based on the derived motion information of the decoded block, derive a plurality of candidates based on motion information of a plurality of decoded neighboring blocks located at predetermined positions neighboring to the decoding target block in space, derive spatial motion information candidates based on the plurality of derived candidates, and construct a list of motion information candidates including the derived temporal motion information candidate and the derived spatial motion information candidates; and a decoding unit (602, 606) configured to decode information representing whether or not the decoding is performed in a merging prediction mode deriving the motion information of the decoding target block based on the motion information candidates included in the list, in a case where the information representing to perform the decoding in the merging prediction mode is decoded, decode an index designating a predetermined motion information candidate included in the list, derive the motion information of the decoding target block based on the motion information candidate designated by the decoded index, and decodes the decoding target block. The candidate list constructing unit (2604), in a case where there are candidates having the same moving information out of the candidates, derives one spatial motion information candidate from the candidates of which the motion information is the same.

According to further another aspect of the present invention, there is provided a moving picture decoding method. This method is a moving picture decoding method for decoding a coded bitstream in units of blocks acquired by partitioning each picture of moving picture data. The moving picture decoding method includes:

deriving motion information of a decoded block included in a picture that is different in time from a picture including a decoding target block that is a target for the decoding, deriving a temporal motion information candidate of the decoding target block based on the derived motion information of the decoded block, deriving a plurality of candidates based on motion information of a plurality of decoded neighboring blocks located at predetermined positions neighboring to the decoding target block in space, deriving spatial motion information candidates based on the plurality of derived candidates, and constructing a list of motion information candidates including the derived temporal motion information candidate and the derived spatial motion information candidates; and decoding information representing whether or not the decoding is performed in a merging prediction mode deriving the motion information of the decoding target block based on the motion information candidates included in the list, in a case where the information representing to perform the decoding in the merging prediction mode is decoded, decoding an index designating a predetermined motion information candidate included in the list, deriving the motion information of the decoding target block based on the motion information candidate designated by the decoded index, and decoding the decoding target block, wherein, in the constructing of a list of motion information candidates, in a case where there are candidates having the same moving information out of the candidates, one spatial motion information candidate is derived from the candidates of which the motion information is the same.

Furthermore, an arbitrary combination of the constituent elements described above or a conversion of the representation of the present invention among a method, a device, a system, a recording medium, a computer program, and the like is also valid as an aspect of the present invention.

BRIEF DESCRIPTION OF THE DRAWINGS

FIG. 3 is a diagram that illustrates a detailed definition of a prediction block sizes;

FIGS. 17A and 17B are diagrams that illustrate comparative relations among motion information candidates in the merging motion information candidate removing process according to Embodiment 1;

FIG. 22 is a diagram that illustrates the relation among the number of times of combination checking, a merging motion information candidate M, and a merging motion information candidate N;

FIG. 25 is a diagram that illustrates a truncated unary bitstream of a case where the number of merging motion information candidates is "5";

FIG. 32 is a diagram that illustrates the content of a comparison between motion information candidates in the merging motion information candidate removing process according to Embodiment 2;

FIGS. 37A and 37B are diagrams that illustrate the content of a comparison between motion information candidates in the merging motion information candidate removing process according to Embodiment 3;

FIGS. 40A and 40B are diagrams that illustrate the content of a comparison between motion information candidates in the merging motion information candidate removing process according to Embodiment 4;

FIG. 43 is a diagram that illustrates the content of a comparison between motion information candidates in the merging motion information candidate removing process according to Embodiment 5;

FIGS. 45A to 45F are diagrams that illustrate statuses in which a block A0 can be used;

FIGS. 48A and 48B are diagrams that illustrate the content of a comparison between motion information candidates in the merging motion information candidate removing process according to Embodiment 6.

DETAILED DESCRIPTION

Figure 1:
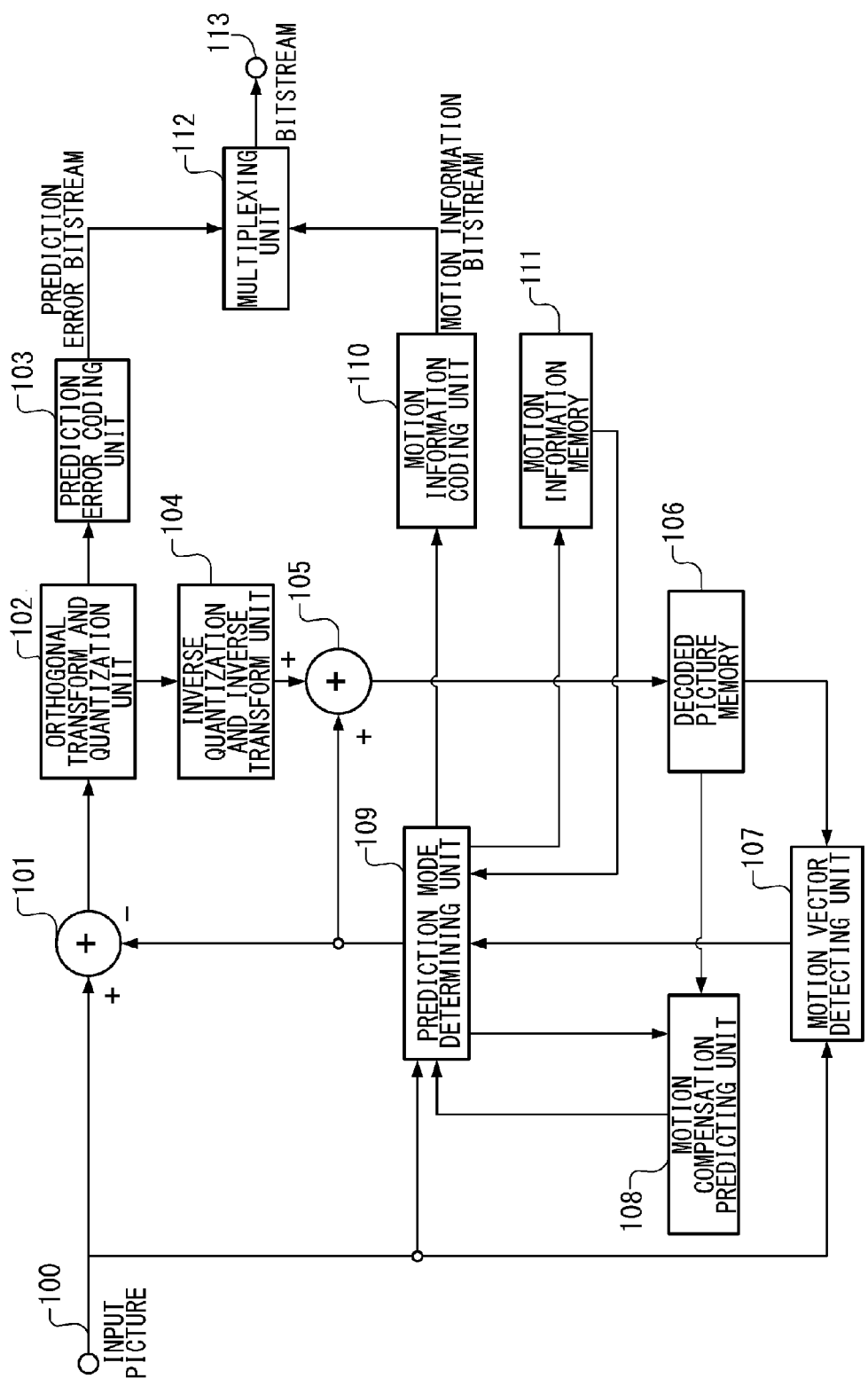
FIG. 1 is a diagram that illustrates the configuration of a moving picture coding device according to Embodiment 1 of the present invention.

The invention will now be described by reference to the preferred embodiments. This does not intend to limit the scope of the present invention, but to exemplify the invention.

Hereinafter, a moving picture coding device, a moving picture coding method, a moving picture coding program, a moving picture decoding device, a moving picture decoding method, and a moving picture decoding program according to preferred embodiments of the present invention will be described with reference to the drawings. Like reference numerals in the drawings denote like elements, and duplicate description thereof will not be presented.

(Embodiment 1)

[Entire Configuration of Moving Picture Coding Device]

FIG. 1 is a diagram that illustrates the configuration of a moving picture coding device according to Embodiment 1 of the present invention. Hereinafter, the operation of each unit will be described. The moving picture coding device according to Embodiment 1 includes: an input terminal 100; a subtraction unit 101; an orthogonal transform and quantization unit 102; a prediction error coding unit 103; an inverse quantization and inverse transform unit 104; an addition unit 105; a decoded picture memory 106; a motion vector detecting unit 107; a motion-compensated prediction unit 108; a prediction mode determining unit 109; a motion information coding unit 110; a motion information memory 111; a multiplexing unit 112; and an output terminal 113.

A picture signal of a prediction block that is a coding processing target is cut out from a picture signal input from the input terminal 100 based on position information of the prediction block and the size of the prediction block, and the picture signal of the prediction block is supplied to the subtraction unit 101, the motion vector detecting unit 107, and the prediction mode determining unit 109.

Figure 2:
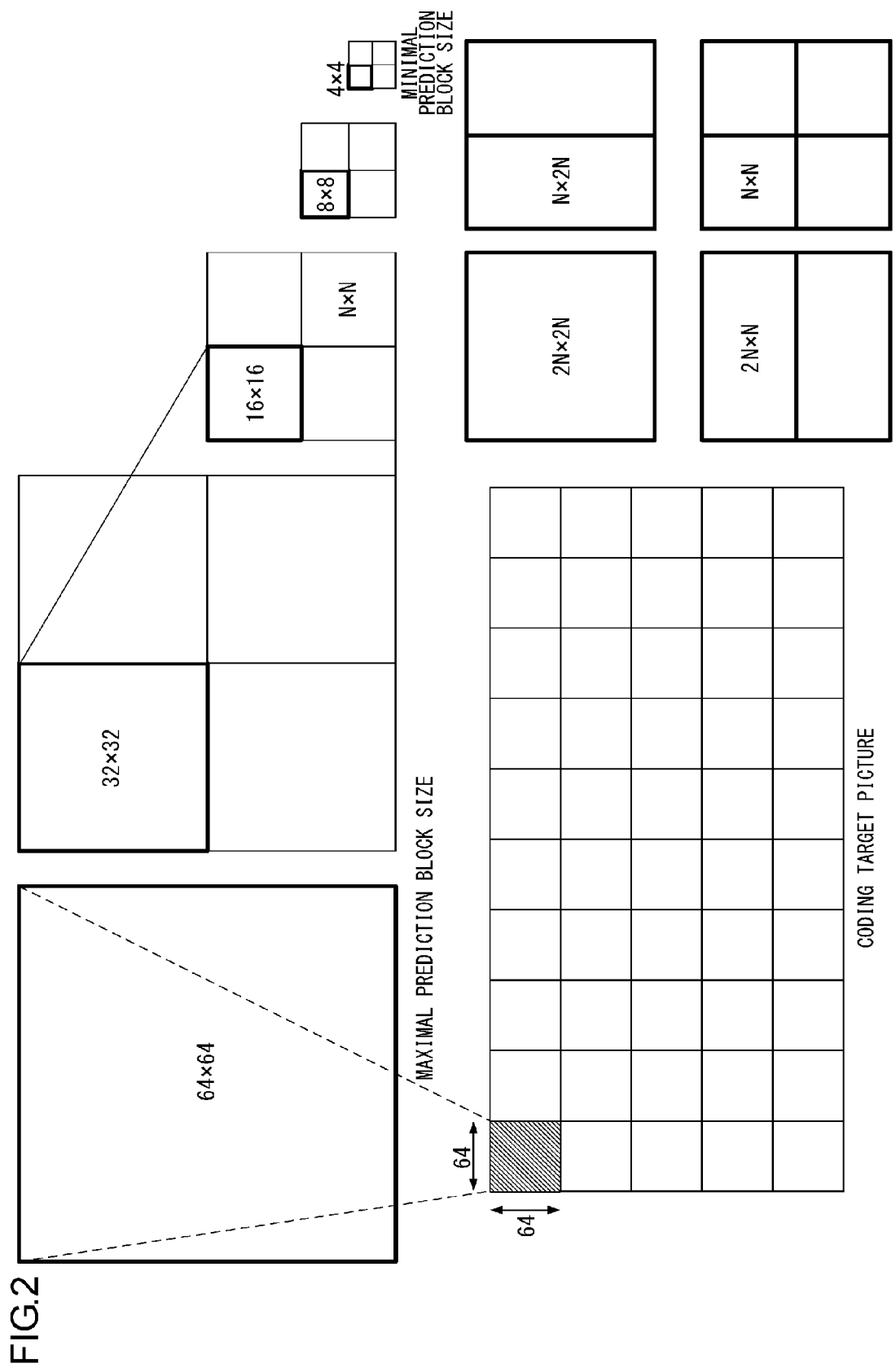
FIG. 2 is a diagram that illustrates an example of a coding target picture.

FIG. 2 is a diagram that illustrates an example of a coding target picture. Regarding the size of the prediction block according to Embodiment 1, as illustrated in FIG. 2, a coding target picture is coded in units of coding blocks CUs each configured by 64×64 pixels, and the prediction block is configured in units in which the coding block is further partitioned. A maximum prediction block size is 64×64 pixels, which is the same as the size of the coding block, and a minimum prediction block size is 4×4 pixels. As the partition configurations for partitioning the coding block into prediction blocks, a no-partition (2N×2N), a partition made in the horizontal and vertical directions (N×N), a partition made only in the horizontal direction (2N×N), and a partition made only in the vertical direction (N×2N) can be formed. Only in the case of the partition made in the horizontal and vertical directions, additionally, the partitioned prediction block as coding blocks can be hierarchically partitioned into prediction blocks, and the hierarchy is represented by the number of partitions of the CU (hereinafter, referred to as a CU partition number).

FIG. 3 is a diagram that illustrates a detailed definition of the prediction block sizes. There are 13 prediction block sizes including a size of 64×64 pixels that is the maximum prediction block size corresponding to the CU partition number of "0" to a size of 4×4 pixels that is the minimum prediction block size corresponding to a CU partition number of "3".

However, the partition configuration of the prediction block according to Embodiment 1 of the present invention is not limited to such a combination. While the prediction block size of the moving picture coding device may be adaptively selected for a structure having higher coding efficiency in units of coding blocks, in Embodiment 1, the focus is on an inter prediction made in units of prediction blocks and coding of motion information between screens, and thus, constituent elements relating to the selection of an optimal prediction block size and description thereof will not be presented. Relating to the operation of the moving picture coding device presented below, the operation performed in units of a selected prediction block size will be described.

Referring back to FIG. 1, the subtraction unit 101 calculates a prediction error signal by performing subtraction between a picture signal supplied from the input terminal 100 and a prediction signal supplied from the prediction mode determining unit 109 and supplies the calculated prediction error signal to the orthogonal transform and quantization unit 102.

The orthogonal transform and quantization unit 102 performs an orthogonal transform and quantization of the prediction error signal supplied form the subtraction unit 101 and supplies the quantized prediction error signal to the prediction error coding unit 103 and the inverse quantization and inverse transform unit 104.

The prediction error coding unit 103 generates a bitstream of the prediction error signal by performing entropy coding of the quantized prediction error signal supplied from the orthogonal transform and quantization unit 102 and supplies the generated bitstream to the multiplexing unit 112.

The inverse quantization and inverse transform unit 104 generates a decoding prediction error signal by performing processes of inverse quantization, an inverse orthogonal transform, and the like for the quantized prediction error signal supplied from the orthogonal transform and quantization unit 102 and supplies the generated decoding prediction error signal and supplied the generated decoding prediction error signal to the addition unit 105.

The addition unit 105 generates a decoded picture signal by adding the decoding prediction error signal supplied from the inverse quantization and inverse transform unit 104 and the prediction signal supplied from the prediction mode determining unit 109 together and supplies the generated decoded picture signal to the decoded picture memory 116.

The decoded picture memory 106 stores the decoded picture signal supplied from the addition unit 105. In addition, for a decoded picture for which the entire picture has been decoded, one or a predetermined number of pictures are stored as a reference picture, and reference picture signals are supplied to the motion vector detecting unit 107 and the motion-compensated prediction unit 108.

The motion vector detecting unit 107 receives a picture signal of the prediction block that is supplied form the input terminal 100 and a signal of the reference picture that is stored in the decoded picture memory 106, detects a motion vector with respect to each reference picture, and supplies the value of the detected motion vector to the prediction mode determining unit 109.

In a general motion vector detecting method, an error evaluation value is calculated for a picture signal corresponding to a reference picture that is moved from the same position as the position of the picture signal by a predetermined movement amount, and a movement amount for which the error evaluation value is minimal is set as a motion vector. As the error evaluation value, a sum SAD (sum of absolute difference) of absolute values of differences for pixels, a sum SSE (sum of square error) of the squares of error values of pixels, or the like is used.

The motion-compensated prediction unit 108 derives a picture signal located at a position acquired by moving a reference picture represented by reference picture designation information stored inside the decoded picture memory 106 from the same position as the position of the picture signal of the prediction block by a motion vector value in accordance with the reference picture designation information designated by the prediction mode determining unit 109 and the motion vector value and generates a prediction signal.

In a case where the prediction mode designated by the prediction mode determining unit 109 is a single prediction, a prediction signal derived based on one reference picture is set as a motion-compensated prediction signal. On the other hand, in a case where the prediction mode is a bi-prediction, a weighted average of prediction signals derived based on two reference pictures is set as a motion-compensated prediction signal. Then, the motion-compensated prediction signal is supplied to the prediction mode determining unit 109. Here, the ratio of the weighted average of the bi-prediction is set to 1:1.

FIGS. 4A to 4D are diagrams that illustrate prediction types of a motion-compensated prediction. A process in which a prediction is made based on a single reference picture is defined as a single prediction, and, in the case of the single prediction, one of reference pictures added in two reference picture management lists of L0 and L1 predictions is used.

Figure 4A:
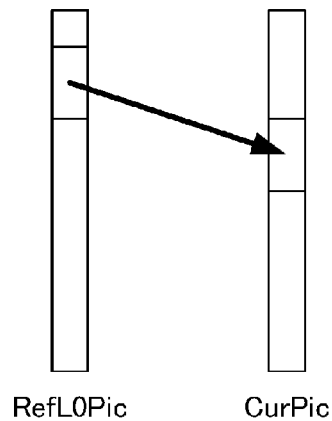
FIGS. 4A to 4D are diagrams that illustrate prediction directions of a motion-compensated prediction.
Figure 4B:
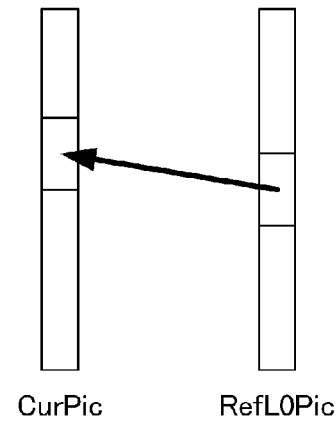

FIG. 4A represents a single prediction and illustrates a case where a reference picture RefL0Pic of the L0 prediction is prior to a coding target picture CurPic in time. FIG. 4B represents a single prediction and illustrates a case where a reference picture of the L0 prediction is posterior to a coding target picture in time. Similarly, the single prediction may be made with the reference picture of the L0 prediction illustrated in FIG. 4A or 4B being substituted with a reference picture RefL0Pic of the L1 prediction.

Figure 4C:
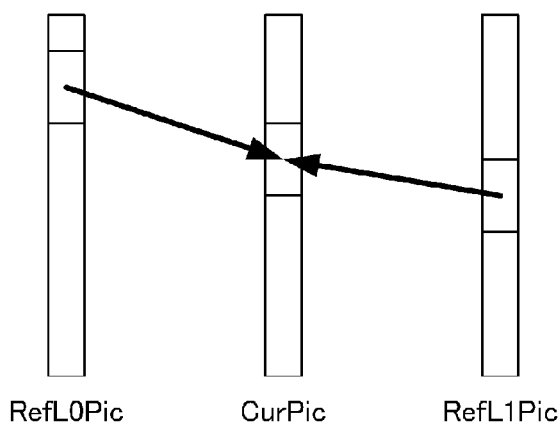
Figure 4D:
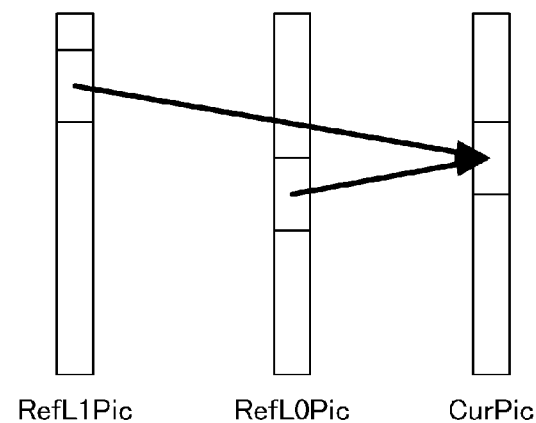

The process making a prediction based on two reference pictures is defined as a bi-prediction, and, the case of the bi-prediction is represented as a BI prediction using both the L0 prediction and the L1 prediction. FIG. 4C represents a bi prediction and illustrates a case where a reference picture of the L0 prediction is prior to a coding target picture in time, and a reference picture of the L1 prediction is posterior to the coding target picture in time. FIG. 4D represents a bi prediction and illustrates a case where a reference picture of the L0 prediction and a reference picture of the L1 prediction are prior to a coding target picture in time. As above, the relation between the prediction types L0 and L1 and time can be used without being limited to a case where the L0 prediction is made in the past direction or a case where the L1 prediction is made in the future direction.

Referring back to FIG. 1, the prediction mode determining unit 109 sets reference picture designation information and a motion vector value used for each motion-compensated prediction mode defined in Embodiment 1 in the motion-compensated prediction unit 108 based on the motion vector value detected for each reference picture input from the motion vector detecting unit 107 and motion information (a prediction type, a motion vector value, and reference picture designation information) stored in the motion information memory 111. Based on the set values, an optimal motion-compensated prediction mode is determined using a motion-compensated prediction signal supplied from the motion-compensated prediction unit 108 and a picture signal of the prediction block that is supplied from the input terminal 100.

The prediction mode determining unit 109 supplies the determined prediction mode, the prediction type corresponding to the prediction mode, the motion vector, and the information specifying the reference picture designation information to the motion information coding unit 110, supplies the determined prediction mode, the prediction type, the motion vector value, and the reference picture designation information for the prediction mode to the motion information memory 111, and supplies a prediction signal corresponding to the determined prediction mode to the subtraction unit 101 and the addition unit 105.

In the moving picture coding device, in order to code a reference picture that is set as the reference, while an intra prediction making a prediction using a coded picture within the same screen is made, the focus of Embodiment 1 is on the inter prediction, and thus, constituent elements relating to the intra prediction are not illustrated. The detailed configuration of the prediction mode determining unit 109 will be described later.

The motion information coding unit 110 generates a bitstream of motion information by coding the prediction mode supplied from the prediction mode determining unit 109, the prediction type corresponding to the prediction mode, the motion vector, and the information specifying the reference picture designation information in accordance with a predetermined syntax structure and supplies the generated bitstream to the multiplexing unit 112.

The motion information memory 111 stores the motion information (the prediction type, the motion vector, and the reference picture index), which is supplied from the prediction mode determining unit 109, corresponding to a predetermined number of pictures by using the unit of the minimal prediction block size as the reference. The motion information of neighboring blocks of the prediction block that is the processing target is set as a spatial candidate block group, and a block on a picture ColPic that is located at the same position as the position of the prediction block that is the processing target and blocks neighboring thereto is set as a temporal candidate block group.

Here, the picture ColPic is a decoded picture other than that of the prediction block, which is the processing target, and is stored as a reference picture in the decoded picture memory 106. In Embodiment 1, the picture ColPic is set as a reference picture that has been immediately previously decoded. In Embodiment 1, while a reference picture that has been immediately previously decoded is used as the picture ColPic, the picture ColPic may be a prior reference picture in the display order or a posterior reference picture in the display order, or a reference picture used as the picture ColPic may be directly designated in the bitstream.

The motion information memory 111 supplies the motion information of the spatial candidate block group and the temporal candidate block group to the prediction mode determining unit 109 as the motion information of candidate block groups. The multiplexing unit 112 generates a bitstream by multiplexing the bitstream of the prediction error that is supplied from the prediction error coding unit 103 and the bitstream of the motion information supplied from the motion information coding unit 110 and outputs the generated bitstream to a recording medium transmission path and the like through the output terminal 113.

The configuration of the moving picture coding device illustrated in FIG. 1 may be realized by hardware such as an information processing device including a central processing unit (CPU), a frame memory, a hard disk, and the like.

Figure 5:
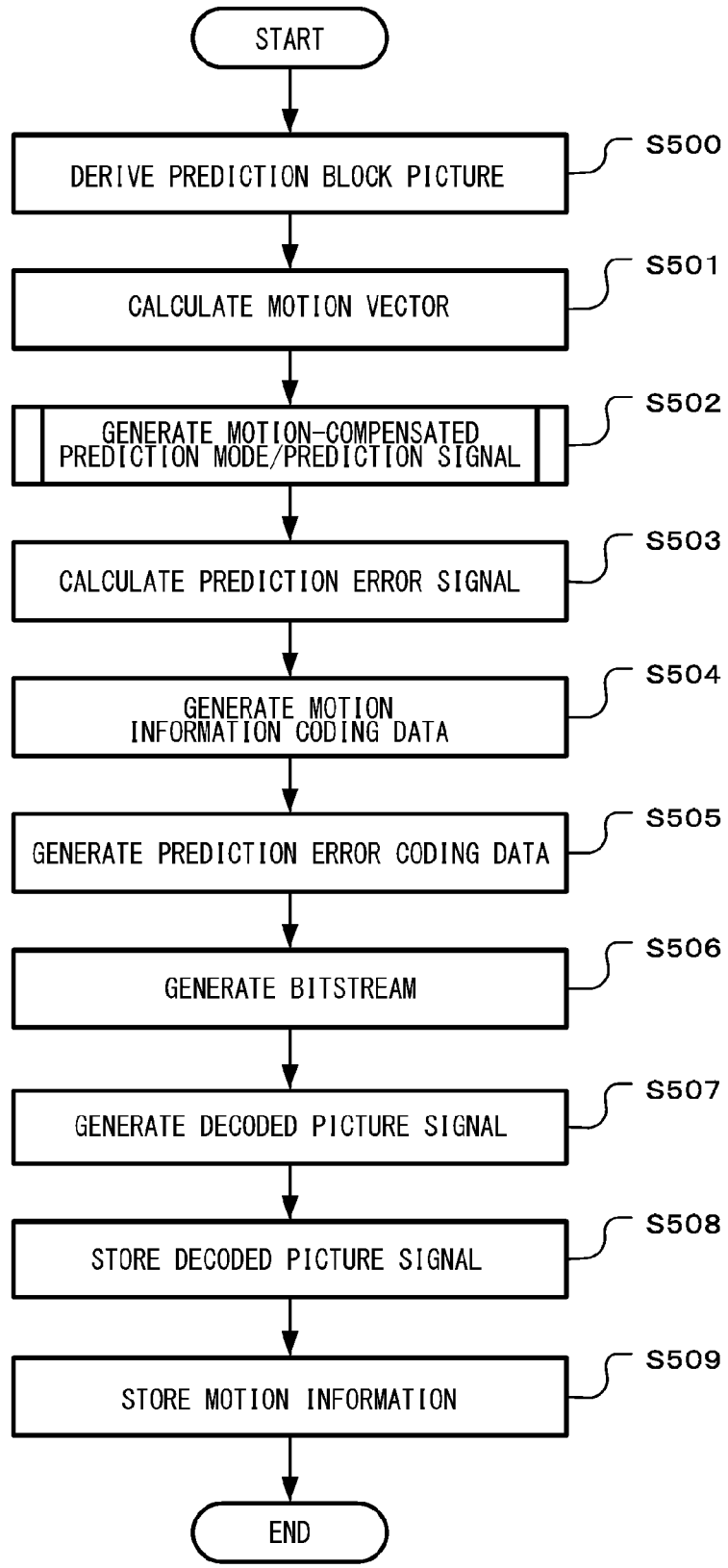
FIG. 5 is a flowchart that illustrates the flow of the operation of a coding process performed by a moving picture coding device according to Embodiment 1 of the present invention.

FIG. 5 is a flowchart that illustrates the flow of the operation of a coding process performed by the moving picture coding device according to Embodiment 1 of the present invention. For each prediction block, a prediction block picture that is the processing target is derived from the input terminal 100 in step S500. The motion vector detecting unit 107 calculates a motion vector value for each reference picture based on the prediction block picture that is the processing target and a plurality of reference pictures stored in the decoded picture memory 106 in step S501.

Subsequently, the prediction mode determining unit 109 derives a prediction signal for each motion-compensated prediction mode defined in Embodiment 1 using the motion-compensated prediction unit 108 by using the motion vector supplied from the motion vector detecting unit 107 and the motion information stored in the motion information memory 111, selects an optimal prediction mode, and generates a prediction signal in step S502. The process of step S502 will be described later in detail.

Subsequently, the subtraction unit 101 calculates a difference between the prediction block picture that is the processing target and the prediction signal supplied from the prediction mode determining unit 109 as a prediction error signal in step S503. The motion information coding unit 110 generates coding data of the motion information by coding the prediction mode supplied from the prediction mode determining unit 109, the prediction type corresponding to the prediction mode, the motion vector, and the information specifying the reference picture designation information in accordance with a predetermined syntax structure in step S504.

Subsequently, the prediction error coding unit 103 generates coding data of the prediction error by performing entropy coding of the quantized prediction error signal generated by the orthogonal transform and quantization unit 102 in step S505. The multiplexing unit 112 generates a bitstream by multiplexing the coding data of the motion information that is supplied from the motion information coding unit 110 and the coding data of the prediction error that is supplied from the prediction error coding unit 103 in step S506.

The addition unit 105 generates a decoded picture signal by adding the decoded prediction error signal supplied from the inverse quantization and inverse transform unit 104 and the prediction signal supplied from the prediction mode determining unit 109 in step S507. The decoded picture signal generated by the addition unit 105 is supplied to the decoded picture memory 106 for storage and is used for a motion-compensated prediction process of a coding picture to be coded after the storage in step S508. The motion information memory 111 stores the motion information (the prediction type, the motion vector, and the reference picture designation information) supplied from the motion vector detecting unit 107 in units of the minimal prediction block size in step S509.

[Entire Configuration of Moving Picture Decoding Device]

Figure 6:
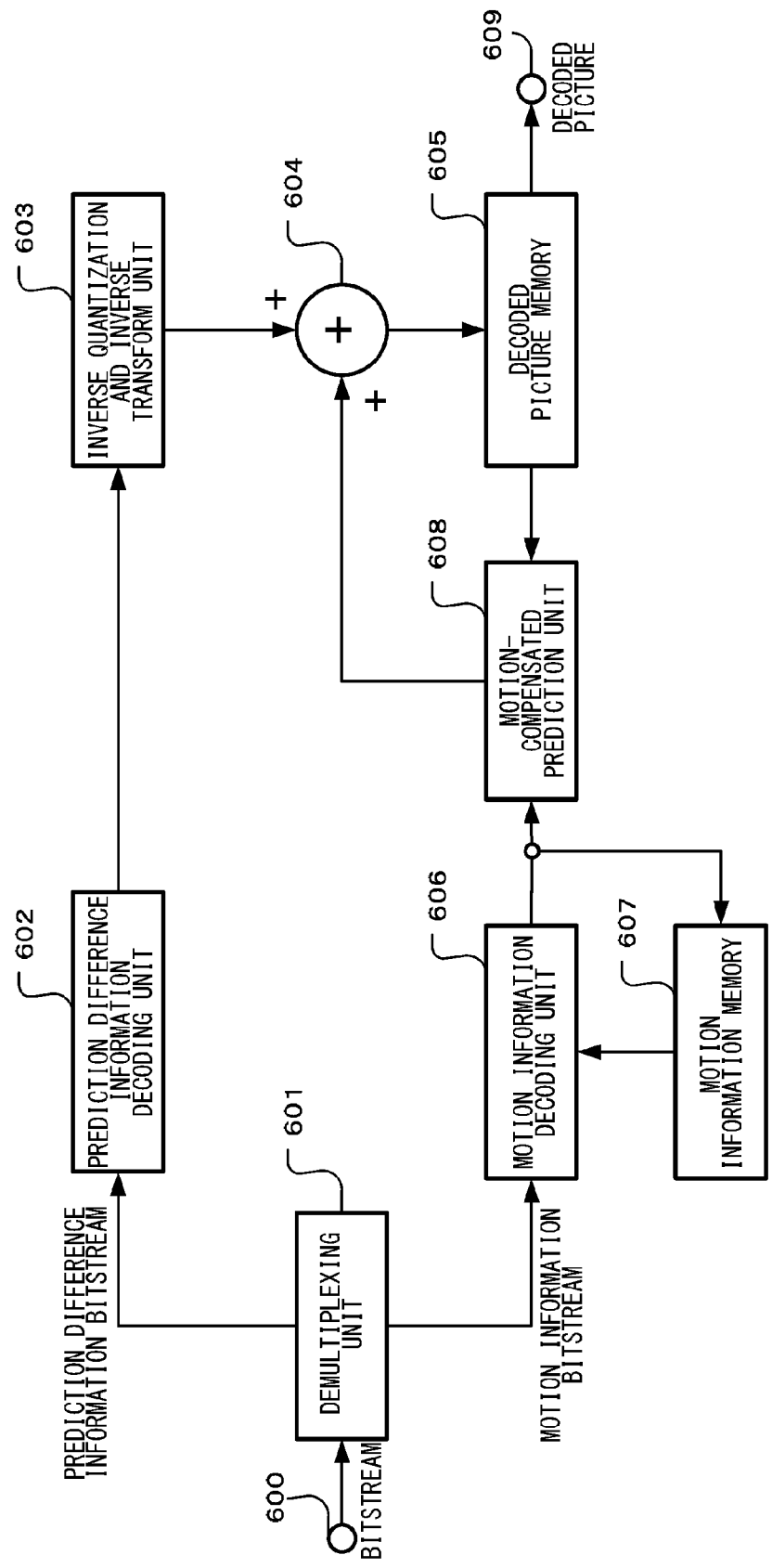
FIG. 6 is a diagram that illustrates the configuration of a moving picture decoding device according to Embodiment 1 of the present invention.

FIG. 6 is a diagram that illustrates the configuration of a moving picture decoding device according to Embodiment 1 of the present invention. The moving picture decoding device according to Embodiment 1 includes: an input terminal 600; a demultiplexing unit 601; a prediction difference information decoding unit 602; an inverse quantization and inverse transform unit 603; an addition unit 604; a decoded picture memory 605; a motion information decoding unit 606; a motion information memory 607; a motion-compensated prediction unit 608; and an output terminal 609.

A bitstream is supplied from the input terminal 600 to the demultiplexing unit 601. The demultiplexing unit 601 splits the supplied bitstream into a bitstream of the prediction error information and a bitstream of the motion information that is configured by the prediction mode, the prediction type corresponding to the prediction mode, the motion vector, and the information specifying the reference picture designation information. The bitstream of the prediction error information is supplied to the prediction difference information decoding unit 602, and the bitstream of the motion information is supplied to the motion information decoding unit 606.

The prediction difference information decoding unit 602 generates a quantized prediction error signal by decoding the bitstream of the prediction error information that is supplied from the demultiplexing unit 601. The prediction difference information decoding unit 602 supplies the generated quantized prediction error signal to the inverse quantization and inverse transform unit 603.

The inverse quantization and inverse transform unit 603 generates a prediction error signal by performing the processes of as inverse quantization, an inverse transform, and the like of the quantized prediction error signal supplied from the prediction difference information decoding unit 602 and supplies the decoded prediction error signal to the addition unit 604.

The addition unit 604 generates a decoded picture signal by adding the decoded prediction error signal supplied from the inverse quantization and inverse transform unit 603 and the prediction signal supplied from the motion-compensated prediction unit 608 and supplies the decoded picture signal to the decoded picture memory 605.

The decoded picture memory 605 has the same function as that of the decoded picture memory 106 of the moving picture coding device illustrated in FIG. 1, stores the decoded picture signal supplied from the addition unit 604, and supplies the reference picture signal to the motion-compensated prediction unit 608. In addition, the decoded picture memory 605 supplies stored decoded picture signals to the output terminal 609 in accordance with the reproduction time in the display order of the picture.

The motion information decoding unit 606 decodes the prediction mode, the prediction type corresponding to the prediction mode, the motion vector, and the information specifying the reference picture designation information from the bitstream of the motion information that is supplied from the demultiplexing unit 601 as motion information. The motion information decoding unit 606 reproduces the prediction type used for the motion-compensated prediction, the motion vector, and the reference picture designation information from the decoded motion information and the motion information of a candidate block group that is supplied from the motion information memory 607 and supplies the prediction type, the motion vector, and the reference picture designation information that have been reproduced to the motion-compensated prediction unit 608. In addition, the motion information decoding unit 606 supplies the reproduced motion information to the motion information memory 607. The detailed configuration of the motion information decoding unit 606 will be described later.

The motion information memory 607 has the same function as that of the motion information memory 111 of the moving picture coding device illustrated in FIG. 1 and stores the reproduced motion information, which is supplied from the motion information decoding unit 606, corresponding to a predetermined number of pictures using the unit of the minimal prediction block size as the reference. In addition, the motion information memory 607 supplies the motion information of the spatial candidate block group and the temporal candidate block group to the motion information decoding unit 606 as the motion information of the candidate block groups.

The motion-compensated prediction unit 608 has the same function as that of the motion-compensated prediction unit 108 of the moving picture coding device illustrated in FIG. 1. The motion-compensated prediction unit 608 derives a pictures signal located at a position acquired by moving the reference picture represented by the reference picture designation information stored inside the decoded picture memory 605 from the same position as that of the picture signal of the prediction block by the motion vector value based on the motion information supplied from the motion information decoding unit 606 and generates a prediction signal. In a case where the prediction type of the motion-compensated prediction is the bi-prediction, a signal acquired by averaging the prediction signals of the prediction types is generated as a prediction signal, and the predication signal is supplied to the addition unit 604.

The output terminal 609 outputs the decoded picture signal supplied from the decoded picture memory 605 to a display medium such as a display, whereby the decoded picture signal is reproduced.

Similarly to the configuration of the moving picture coding device illustrated in FIG. 1, the configuration of the moving picture decoding device illustrated in FIG. 6 may be realized by hardware such as an information processing device including a CPU, a frame memory, a hard disk, and the like.

Figure 7:
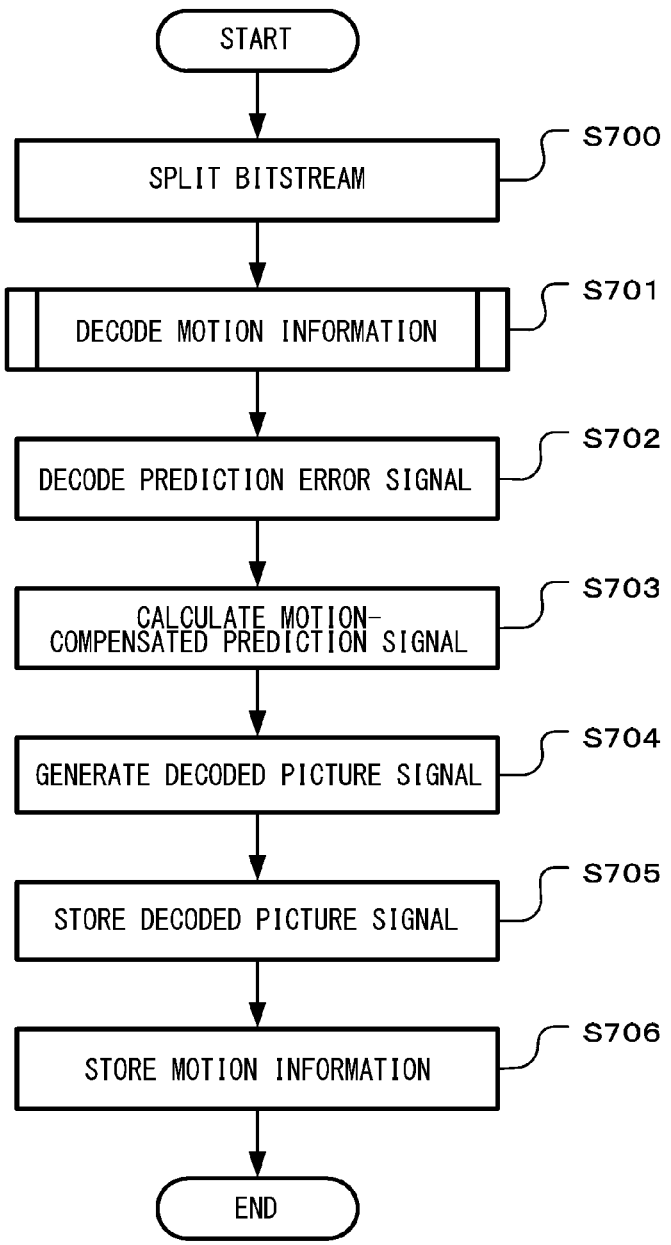
FIG. 7 is a flowchart that illustrates the flow of the operation of a decoding process performed by the moving picture decoding device according to Embodiment 1 of the present invention.

FIG. 7 is a flowchart that illustrates the flow of the operation of the decoding process performed by the moving picture decoding device according to Embodiment 1 of the present invention. The demultiplexing unit 601 splits the bitstream supplied from the input terminal 600 into a bitstream of the prediction error information and a bitstream of the motion information in step S700. The split bitstream of the motion information is supplied to the motion information decoding unit 606 and is used for decoding the motion information of a decoding target block by using the motion information of the candidate block group that is supplied from the motion information memory 607 in step S701. The detailed process of step S701 will be described later.

The split bitstream of the prediction error information is supplied to the prediction difference information decoding unit 602 and is decoded as a quantized prediction error signal, and the processes of inverse quantization, an inverse transform, and the like are performed for the quantized prediction error signal using the inverse quantization and inverse transform unit 603, whereby a decoded prediction error signal is generated in step S702.

The motion information of the decoding target block is supplied from the motion information decoding unit 606 to the motion-compensated prediction unit 608, and the motion-compensated prediction unit 608 makes a motion-compensated prediction based on the motion information, thereby calculating a prediction signal in step S703. The addition unit 604 generates a decoded picture signal by adding the decoded prediction error signal supplied from the inverse quantization and inverse transform unit 603 and the prediction signal supplied from the motion-compensated prediction unit 608 in step S704.

The decoded picture signal supplied from the addition unit 604 is stored in the decoded picture memory 605 in step S705, and the motion information of the decoding target block that is supplied from the motion information decoding unit 606 is stored in the motion information memory 607 in step S706. With this, the decoding process performed in units of prediction blocks ends.

[Description of Detailed Function of Embodiment 1]

Hereinafter, detailed descriptions of the operation of the prediction mode determining unit 109 of the moving picture coding device according to Embodiment 1 of the present invention, the process of step S502 represented in the flowchart illustrated in FIG. 5, the operation of the motion information decoding unit 606 of the moving picture decoding device according to Embodiment 1 of the present invention, and the process of step S701 represented in the flowchart illustrated in FIG. 7 will be presented.

[Definition of Motion-Compensated Prediction Mode According to Embodiment 1]

Figure 8:
FIGS. 8A and 8B are diagrams that illustrate two prediction modes used for coding motion information used in a motion-compensated prediction according to Embodiment 1 of the present invention.

FIGS. 8A and 8B are diagrams that illustrate two prediction modes used for coding motion information used in a motion-compensated prediction according to Embodiment 1 of the present invention. The first prediction mode is a technique for using the motion information of a block that is neighboring in space and time for coding by using the continuity of the motion in the temporal direction and the spatial direction between a prediction target block and a coded block neighboring to the prediction target block without directly coding the motion information of the prediction target block and is called a merging prediction mode (merge mode).

The first prediction mode is a technique for using the motion information of a block that is neighboring in space and time for coding by using the continuity of the motion in the temporal direction and the spatial direction between a prediction target block and a coded block neighboring to the prediction target block without directly coding the motion information of the prediction target block and is called a merging prediction mode (merge mode).

Here, the block neighboring in space represents a block neighboring to the prediction target block out of coded blocks belonging to the picture of the prediction target block. In addition, the block neighboring in time represents a block located at the spatial position of the prediction target block and blocks neighboring thereto out of blocks belonging to a coded picture other than that of the prediction target block.

In the case of the merging prediction mode, motion information that is selectively merged from a plurality of neighboring block candidates can be defined, and, as the motion information, by coding information (index) designating neighboring blocks to be used, the motion information derived based on the designation information is directly used for a motion-compensated prediction. In addition, in the merging prediction mode, a configuration is employed in which a skip mode in which the prediction difference information is not transmitted with being coded, but a prediction signal predicted in the merging prediction mode is set as a decoding picture is defined, and the decoding picture can be reproduced using a small amount of information of only the merging motion information. In the skip mode, the motion information to be transmitted, similarly to the merging prediction mode, is designation information that defines a neighboring block.

The second prediction mode is a technique for individually coding all the constituent elements of the motion information and transmitting motion information having a small prediction error for the prediction block and is called a motion detection prediction mode. In the motion detection prediction mode, similarly to the coding of the motion information of a conventional motion-compensated prediction, information (reference picture index) specifying the reference picture and information specifying a motion vector are separately coded.

In the motion detection prediction mode, one of the single prediction and the bi-prediction to be used is directed using a prediction mode. In the case of the single prediction, information specifying a reference picture and a differential vector representing a difference of the motion vector from the vector predictor for one reference picture are coded. On the other hand, in the case of the bi-prediction, information specifying reference pictures and motion vectors for the two reference pictures are individually coded. While the vector predictor for the motion vector, similarly to the AVC, is generated from the motion information of a neighboring block, similarly to the merging prediction mode, a motion vector used for the vector predictor can be selected from among a plurality of neighboring block candidates, and the motion vector is transmitted with two of information (index) designating a neighboring block used for the vector predictor and a differential vector being coded.

[Description of Detailed Operation of Prediction Mode Determining Unit of Moving Picture Coding Device According to Embodiment 1]

Figure 9:
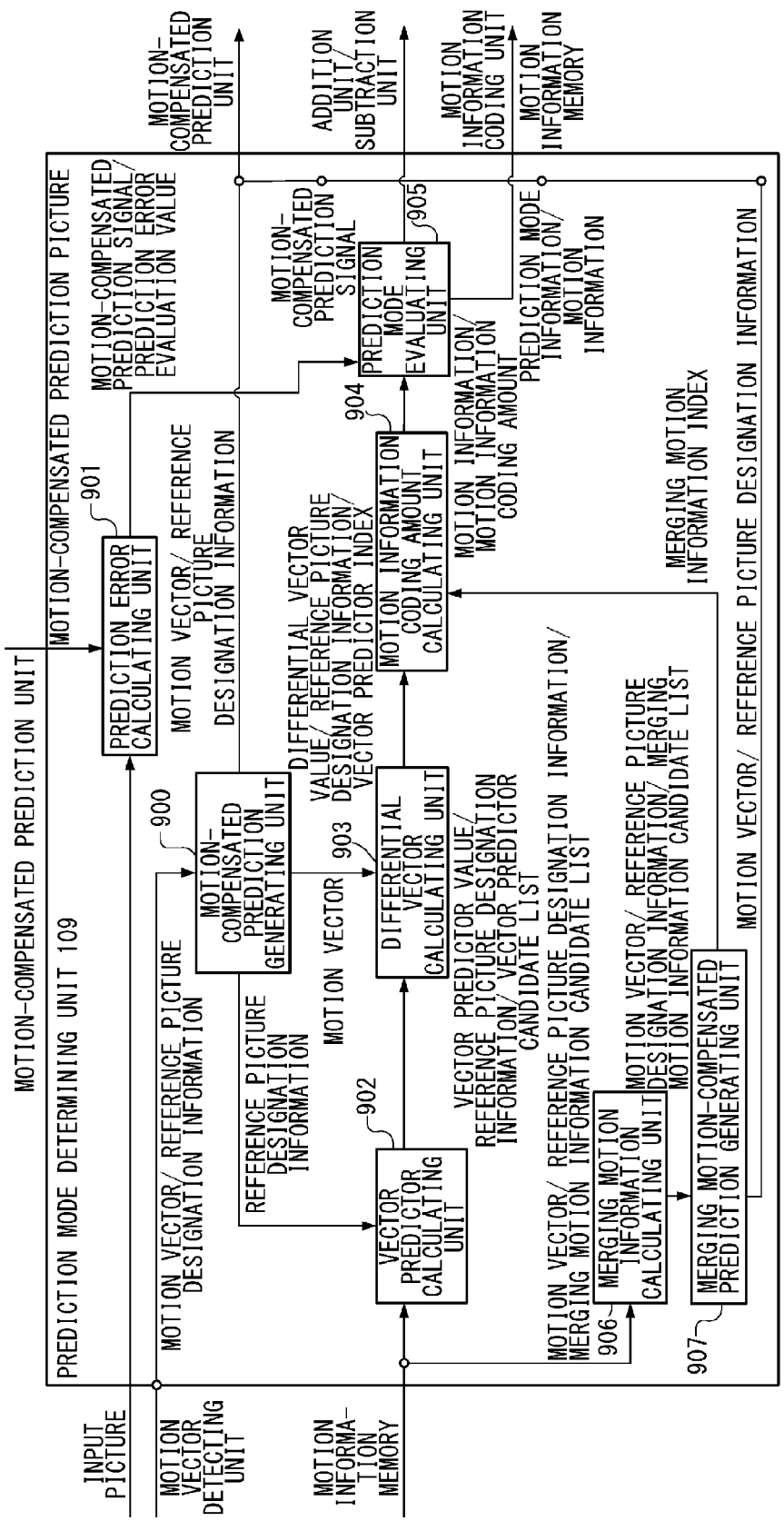
FIG. 9 is a diagram that illustrates the detailed configuration of a prediction mode determining unit of the moving picture coding device according to Embodiment 1.

FIG. 9 is a diagram that illustrates the detailed configuration of a prediction mode determining unit 109 of the moving picture coding device according to Embodiment 1. The prediction mode determining unit 109 has a function for determining an optimal motion-compensated prediction mode.

The prediction mode determining unit 109 includes: a motion-compensated prediction generating unit 900; a prediction error calculating unit 901; a vector predictor calculating unit 902; a differential vector calculating unit 903; a motion information coding amount calculating unit 904; a prediction mode evaluating unit 905; a merging motion information calculating unit 906; and a merging motion-compensated prediction generating unit 907.

A motion vector value input to the prediction mode determining unit 109 illustrated in FIG. 1 from the motion vector detecting unit 107 is supplied to the motion-compensated prediction generating unit 900, and motion information input from the motion information memory 111 is supplied to the vector predictor calculating unit 902 and the merging motion information calculating unit 906.

In addition, reference picture designation information and a motion vector used for a motion-compensated prediction are output from the motion-compensated prediction generating unit 900 and the merging motion-compensated prediction generating unit 907 to the motion information coding unit 110, and a generated motion-compensated prediction picture is supplied from the motion-compensated prediction unit 108 to the prediction error calculating unit 901. In addition, a picture signal of the prediction block that is the coding target is supplied from the input terminal 100 to the prediction error calculating unit 901.

Furthermore, the motion information to be coded and the determined prediction mode information are supplied to the motion information coding unit 110 from the prediction mode evaluating unit 905, the motion information is supplied to the motion information memory 111, and the motion-compensated prediction signal is supplied to the subtraction unit 101 and the addition unit 105.

The motion-compensated prediction generating unit 900 receives a motion vector value calculated for each reference picture that can be used for the prediction, supplies the reference picture designation information to the vector predictor calculating unit 902, and outputs the reference picture designation information and the motion vector.

The prediction error calculating unit 901 calculates a prediction error evaluation value based on the input motion-compensated prediction picture and the prediction block picture that is the processing target. As an operation for calculating the error evaluation value, similarly to the error evaluation value in the motion vector detecting process, a sum SAD of absolute values of differences for pixels, a sum SSE of the squares of error values of pixels, or the like may be used. In addition, by performing an orthogonal transform and quantization performed at the time of coding a prediction residual, a more accurate error evaluation value can be calculated with the amount of a distortion component generated in a decoded picture also being taken into account. Such a case can be realized by including the functions of the subtraction unit 101, the orthogonal transform and quantization unit 102, the inverse quantization and inverse transform unit 104, and the addition unit 105 illustrated in FIG. 1 in the prediction error calculating unit 901

The prediction error calculating unit 901 supplies the prediction error evaluation value calculated for each prediction mode and the motion-compensated prediction signal to the prediction mode evaluating unit 905.

The vector predictor calculating unit 902 is supplied with the reference picture designation information from the motion-compensated prediction generating unit 900, receives a motion vector value for the designated reference picture from the candidate block group included in the motion information of the neighboring block that is supplied from the motion information memory 111, generates a plurality of vector predictors together with a vector predictor candidate list, and supplies the generated vector predictors and the vector predictor candidate list to the differential vector calculating unit 903. The vector predictor calculating unit 902 generates candidates for the vector predictor and adds the generated candidates as the vector predictor candidates.

The differential vector calculating unit 903 calculates a difference from the motion vector value supplied from the motion-compensated prediction generating unit 900 for each vector predictor candidate supplied from the vector predictor calculating unit 902, thereby calculating a differential vector value. When the calculated differential vector value and the vector predictor index that is the designation information of the vector predictor candidate are coded, the coding amount is the smallest. The differential vector calculating unit 903 supplies the vector predictor index and the differential vector value for the vector predictor corresponding to the smallest amount of information to the motion information coding amount calculating unit 904 together with the reference picture designation information.

The motion information coding amount calculating unit 904 calculates a coding amount required for the motion information of each prediction mode based on the differential vector value, the reference picture designation information, the vector predictor index, and the prediction mode supplied from the differential vector calculating unit 903. In addition, the motion information coding amount calculating unit 904 receives a merging motion information index and information representing the prediction mode, which need to be transmitted in the merging prediction mode, from the merging motion-compensated prediction generating unit 907 and calculates a coding amount required for the motion information in the merging prediction mode.

The motion information coding amount calculating unit 904 supplies the motion information and the coding amount required for the motion information that are calculated in each prediction mode to the prediction mode evaluating unit 905.

The prediction mode evaluating unit 905 calculates a total motion-compensated prediction error evaluation value of each prediction mode by using the prediction error evaluation value of each prediction mode that is supplied from the prediction error calculating unit 901 and the motion information coding amount of each prediction mode that is supplied from the motion information coding amount calculating unit 904, selects a prediction mode having the smallest evaluation value, and outputs the selected prediction mode and the motion information for the selected prediction mode to the motion information coding unit 110 and the motion information memory 111. In addition, the prediction mode evaluating unit 905, similarly, selects a prediction signal in the selected prediction mode from among the motion-compensated prediction signals supplied from the prediction error calculating unit 901 and outputs the selected prediction signal to the subtraction unit 101 and the addition unit 105.

The merging motion information calculating unit 906 generates a plurality of sets of motion information as motion information configured by a prediction type representing a single prediction or a bi-direction, reference picture designation information, and a motion vector value together with a merging motion information candidate list by using a candidate block group included in the motion information of a neighboring block that is supplied from the motion information memory 111 and supplies the plurality of sets of motion information and the merging motion information candidate list to the merging motion-compensated prediction generating unit 907.

Figure 10:
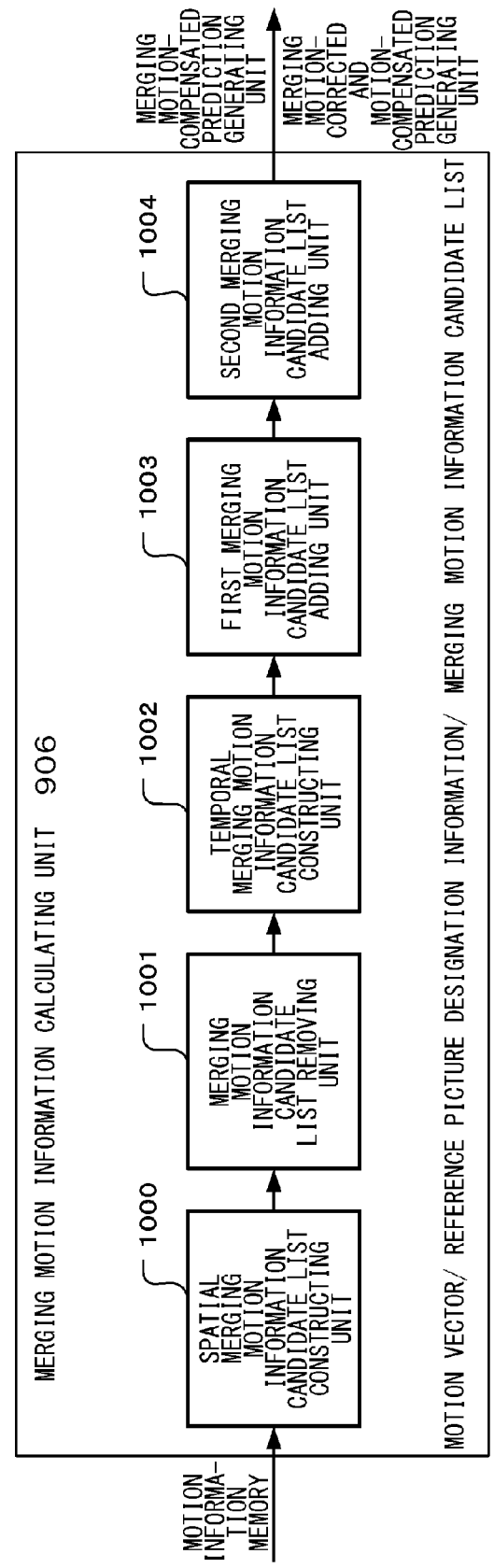
FIG. 10 is a diagram that illustrates the configuration of a merging motion information calculating unit according to Embodiment 1 illustrated in FIG. 9.

FIG. 10 is a diagram that illustrates the configuration of the merging motion information calculating unit 906. The merging motion information calculating unit 906 includes: a spatial merging motion information candidate list constructing unit 1000; a merging motion information candidate list removing unit 1001; a temporal merging motion information candidate list constructing unit 1002; a first merging motion information candidate list adding unit 1003; and a second merging motion information candidate list adding unit 1004. The merging motion information calculating unit 906 generates candidates for motion information in a predetermined order from a candidate block group that is neighboring in space, removes candidates having the same motion information therefrom, and adds candidates for the motion information that are generated from a candidate block group neighboring in time, thereby adding only valid motion information as merging motion information candidates. A point that the temporal merging motion information candidate list constructing unit is arranged on a stage later than that of the merging motion information candidate list removing unit forms a featured configuration of this embodiment. Thus, by excluding the temporal merging motion information candidates from the targets for the process of removing the same motion information, the calculation amount can be reduced without lowering the coding efficiency. The detailed operation of the merging motion information calculating unit 906 will be described later.

Referring back to FIG. 9, the merging motion-compensated prediction generating unit 907, for each of the added merging motion information candidates according to the merging motion information candidate list supplied from the merging motion information calculating unit 906, designates reference picture designation information of one reference picture (single prediction) or two reference pictures (bi-prediction) and a motion vector value from among the motion information in the motion-compensated prediction unit 108 in accordance with the prediction type so as to generate a motion-compensated prediction picture and supplies each merging motion information index to the motion information coding amount calculating unit 904.

In the configuration illustrated in FIG. 9, while the evaluation of the prediction mode for each merging motion information index is performed by the prediction mode evaluating unit 905, a configuration may be employed in which the prediction error evaluation value and the motion information coding amount are received from the prediction error calculating unit 901 and the motion information coding amount calculating unit 904, a merging motion index of the optimal merging motion-compensated prediction is determined inside the merging motion-compensated prediction generating unit 907, and then, an optimal prediction mode including the other prediction modes is evaluated.

Figure 11:
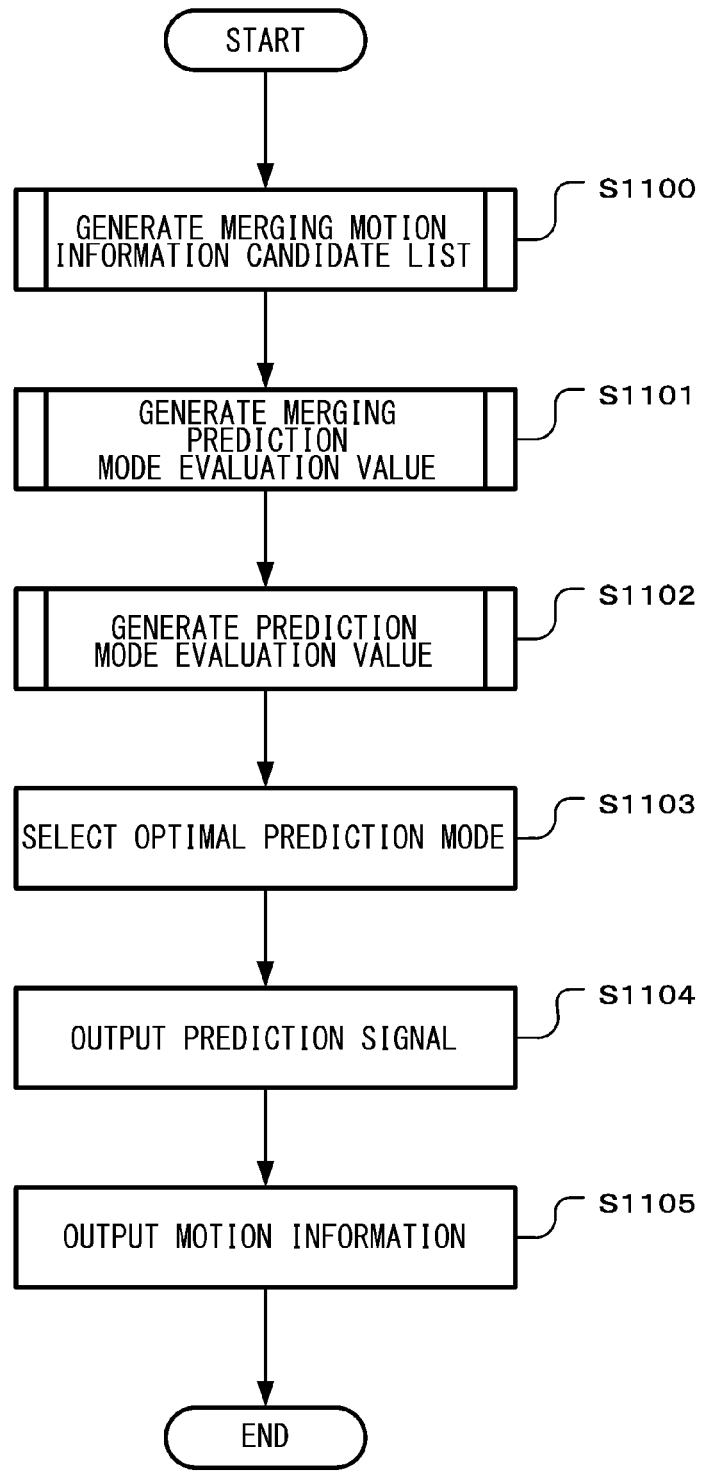
FIG. 11 is a flowchart that illustrates the detailed operation of a motion-compensated prediction mode/prediction signal generating process of step S502 illustrated in FIG. 5.

FIG. 11 is a flowchart that illustrates the detailed operation of the motion-compensated prediction mode/prediction signal generating process of step S502 illustrated in FIG. 5. This operation illustrates the detailed operation of the prediction mode determining unit 109 illustrated in FIG. 9.

First, a merging motion information candidate list is generated in step S1100, and a merging prediction mode evaluation value is generated in step S1101. Subsequently, prediction mode evaluation values are generated in step S1102, and an optimal prediction mode is selected by comparing the generated evaluation values in step S1103. However, the sequence of generating the evaluation values of steps S1101 and S1102 is not limited thereto.

First, a prediction signal is output in accordance with the selected prediction mode in step S1104, and motion information is output in accordance with the selected prediction mode in step S1105, whereby the motion-compensated prediction mode/prediction signal generating process performed in units of prediction blocks ends. The detailed operations of steps S1100, S1101, and S1102 will be described later.

Figure 12:
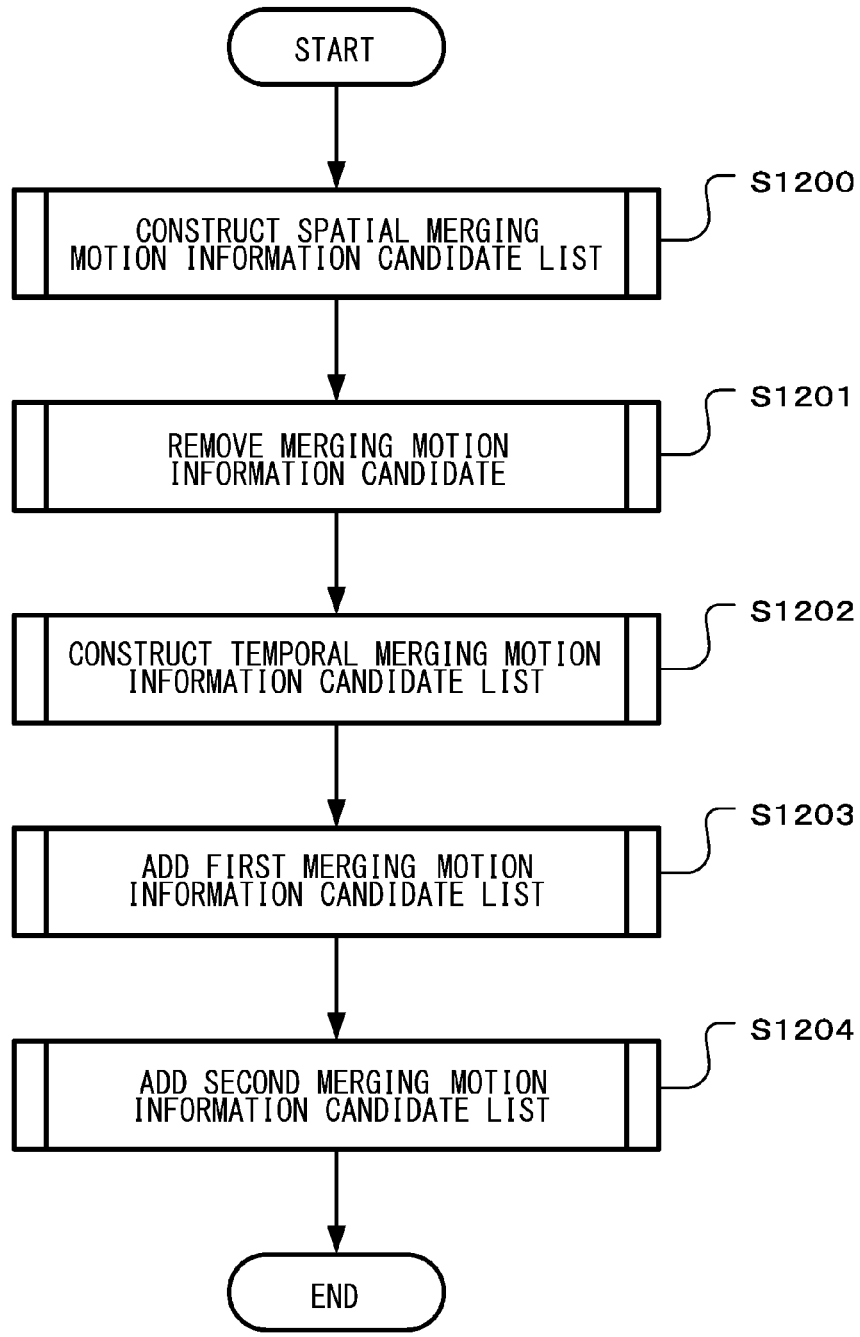
FIG. 12 is a flowchart that illustrates the detailed operation of a merging motion information candidate list constructing process according to Embodiment 1 illustrated in FIG. 11.

FIG. 12 is a flowchart that illustrates the detailed operation of the merging motion information candidate list constructing process of step S1100 illustrated in FIG. 11. This operation illustrates the detailed operation of the configuration of the merging motion information calculating unit 906 illustrated in FIG. 9.

The spatial merging motion information candidate list constructing unit 1000 illustrated in FIG. 10 constructs a spatial merging motion information candidate list from candidate blocks acquired by excluding candidate blocks that are located outside the area and candidate blocks that are in the intra mode from the spatial candidate block group supplied from the motion information memory 111 in step S1200. The detailed operation performed in the spatial merging motion information candidate list constructing process will be described later.

Subsequently, the merging motion information candidate list removing unit 1001 removes merging motion information candidates having the same motion information from the generated spatial merging motion information candidate list, thereby updating the motion information candidate list in step S1201. The detailed operation performed in the merging motion information candidate removing process will be described later.

Subsequently, the temporal merging motion information candidate list constructing unit 1002 constructs a temporal merging motion information candidate list from candidate blocks acquired by excluding candidate blocks that are located outside the area and candidate blocks that are in the intra mode from the temporal candidate block group supplied from the motion information memory 111 in step S1202, combines the generated temporal merging motion information candidate list with the temporal merging motion information candidate list, and sets a resultant motion information candidate list as a merging motion information candidate list. The detailed operation of the temporal merging motion information candidate list will be described later.

Next, the first merging motion information candidate list adding unit 1003 generates zero to four first supplementary merging motion information candidates from the merging motion information candidates added in the merging motion information candidate list constructed by the temporal merging motion information candidate list constructing unit 1002 and adds the generated first supplementary merging motion information candidates in the merging motion information candidate list in step S1203 and then supplies the merging motion information candidate list to the second merging motion information candidate list adding unit 1004. The detailed operation performed in the first merging motion information candidate list adding process will be described later.

Next, the second merging motion information candidate list adding unit 1004 generates zero to two second supplementary merging motion information candidates not depending on the merging motion information candidate list supplied from the first merging motion information candidate list adding unit 1003, adds the generated second supplementary merging motion information candidates in the merging motion information candidate list supplied from the first merging motion information candidate list adding unit 1003 in step S1204, and the process ends. The detailed operation performed in the second merging motion information candidate list process will be described later.

In the candidate block group of the motion information supplied from the motion information memory 111 to the merging motion information calculating unit 906, a spatial candidate block group and a temporal candidate block group are included. First, the spatial merging motion information candidate list constructing process will be described.

Figure 13:
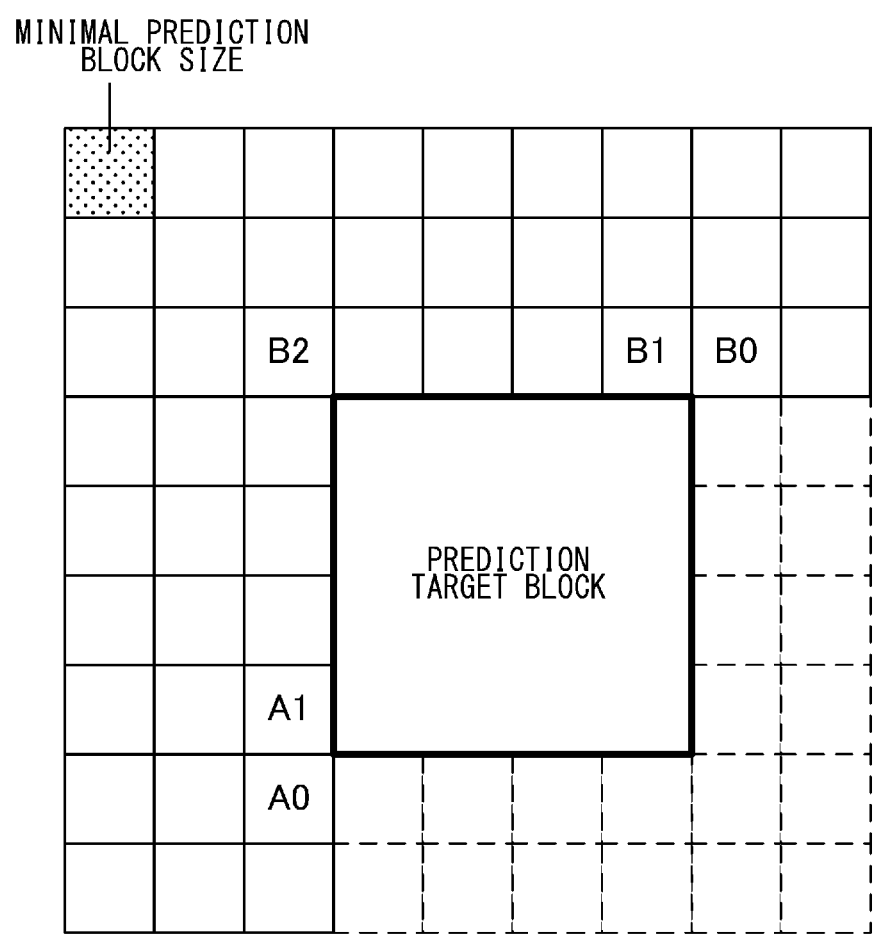
FIG. 13 is a diagram that illustrates a spatial candidate block group used for a spatial merging motion information candidate list constructing process.

FIG. 13 is a diagram that illustrates the spatial candidate block group used for the spatial merging motion information candidate list constructing process. The spatial candidate block group represents blocks of a same picture that are neighboring to the prediction target block of a coding target picture. The block group is managed in unit of the minimal block sizes, and the position of a candidate block is managed in units of the minimal prediction block size. However, in a case where the prediction block size of the neighboring block is larger than the minimal prediction block size, the same motion information is stored in all the candidate blocks within the prediction block size. In embodiment 1, out of neighboring block groups, five blocks including blocks A0, A1, B0, B1, and B2 as illustrated in FIG. 13 are set as the spatial candidate block group.

Figure 14:
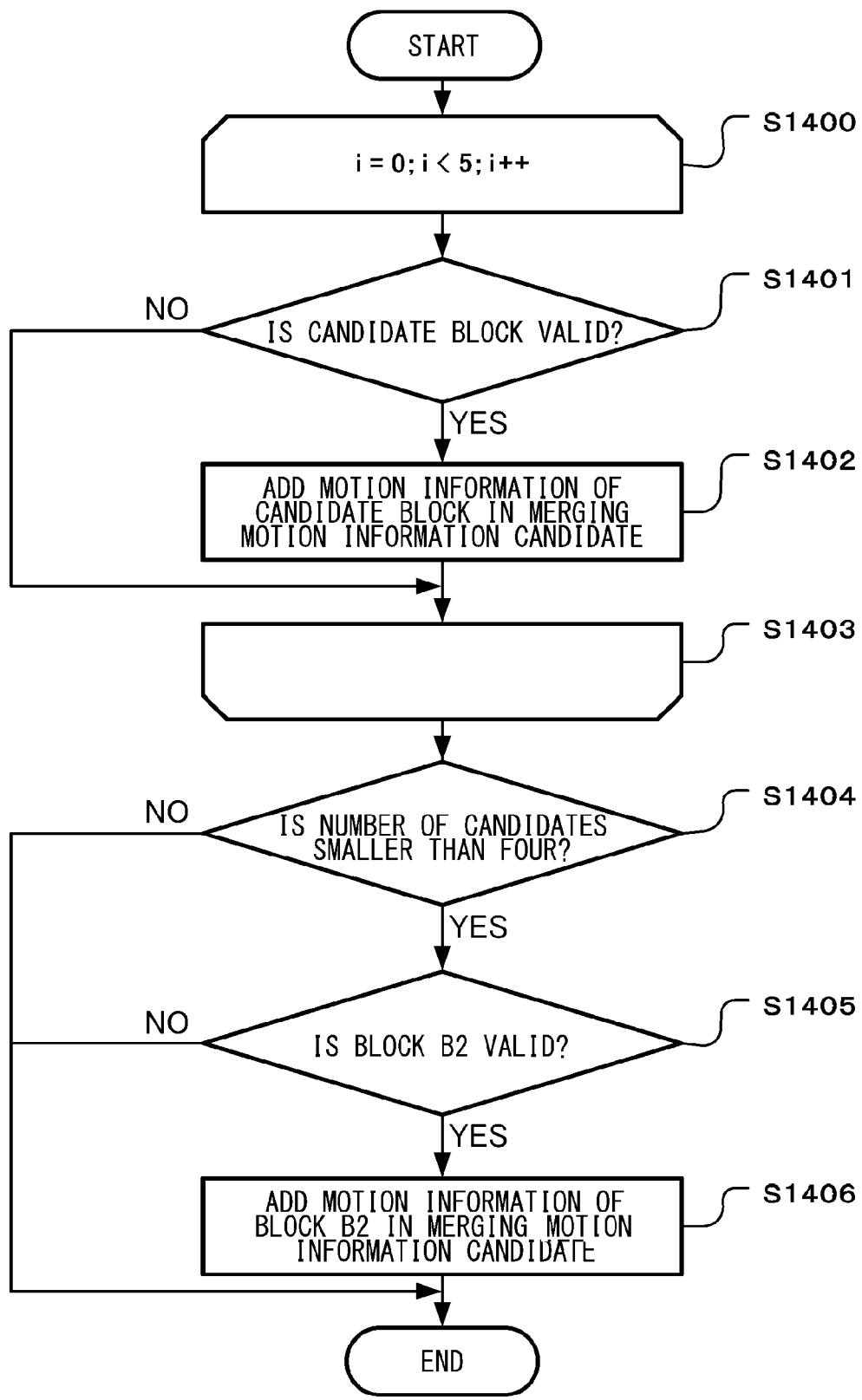
FIG. 14 is a flowchart that illustrates the detailed operation performed in the spatial merging motion information candidate list constructing process.

FIG. 14 is a flowchart that illustrates the detailed operation performed in the spatial merging motion information candidate list constructing process. Out of the five candidate blocks included in the spatial candidate block group, for the blocks A0, A1, B0, B1, and B2, the following process is repeatedly performed in order of blocks A1, B1, B0, and A0 in steps S1400 to S1403.

First, the validness of a candidate block is checked in step S1401. In a case where the candidate block is not located outside the area, and the prediction mode of the candidate block is not the intra mode, the candidate block is valid. When the candidate block is valid (YES in step S1401), the motion information of the candidate block is added to the spatial merging motion information candidate list in step S1402.

Following the repetitive process of steps S1400 to S1403, in a case where the number of candidates added to the spatial merging motion information candidate list is smaller than four (YES in step S1404), the validness of the candidate block B2 is checked in step S1405. In a case where the block B2 is not located outside the area, and the prediction mode of the block B2 is not the intra mode (YES in step S1405), the motion information of the block B2 is added to the spatial merging motion information candidate list in step S1406.

Here, while the motion information of smaller than or equal to four candidate blocks has been described to be included in the spatial merging motion information candidate list, the present invention is not limited thereto. Thus, the spatial candidate block group may be at least one or more processed blocks neighboring to the prediction block that is the processing target, and the number of candidate blocks of which the motion information is included in the spatial merging motion information candidate list may be changed based on the valid ness of the candidate blocks.

Figure 15:
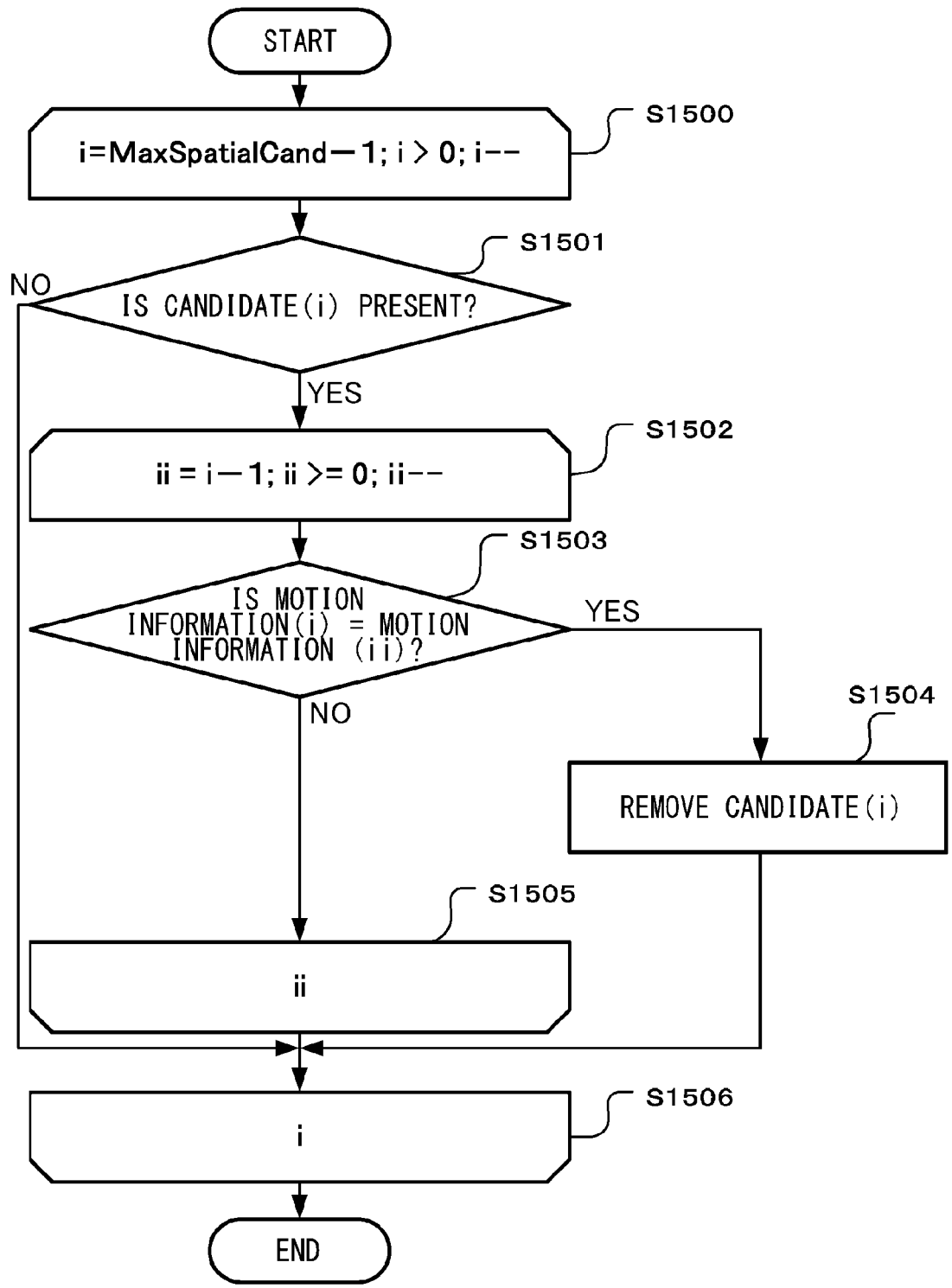
FIG. 15 is a flowchart that illustrates the detailed operation performed in a merging motion information candidate removing process according to Embodiment 1.

FIG. 15 is a flowchart that illustrates the detailed operation performed in the merging motion information candidate removing process. When the maximum number of merging motion information candidates generated in the spatial merging motion information candidate list constructing process is MaxSpatialCand, the following process is repeatedly performed for a merging motion information candidate Candidate(i) from i=MaxSpatialCand−1 to i>0 in steps S1500 to S1506.

When Candidate(i) is present (YES in step S1501), the following process is repeatedly performed for a merging motion information candidate Candidate(ii) from ii=i−1 to ii>=0 in steps S1502 to S1505. On the other hand, in a case where Candidate(i) is not present (NO in step S1501), the repetitive process of steps S1502 to S1505 is skipped for Candidate(ii).

First, it is checked whether or not the motion information Motion Information(i) of Candidate(i) and the motion information Motion Information(ii) of Candidate(ii) are the same in step S1503. In a case where the motion information thereof is the same (YES in step S1503), Candidate(i) is removed from the merging motion information candidate list in step S1504, and the repetitive process for Candidate(ii) ends.

On the other hand, in a case where Motion Information(i) and Motion Information(ii) are not the same (NO in step S1503), one is subtracted from ii, and the process for Candidate(ii) is repeated in steps S1502 to S1505.

Following the repetitive process of steps S1500 to S1505, one is subtracted from i, and the process for Candidate(i) is repeated in steps S1500 to S1506.

Figure 16:
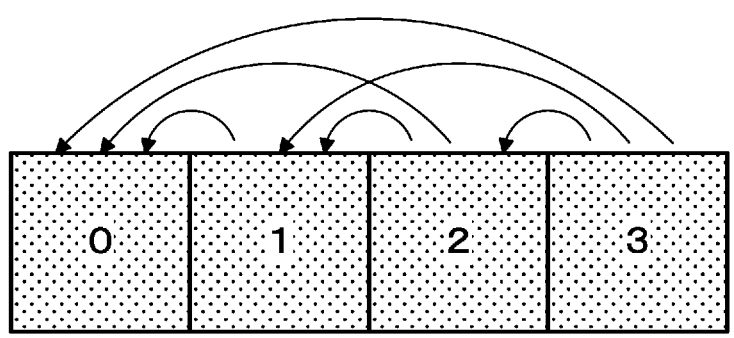
FIG. 16 is a diagram that illustrates comparative relation among motion information candidates in the merging motion information candidate removing process according to Embodiment 1.

FIG. 16 illustrates comparative relation among candidates included in the list in a case where there are four merging motion information candidates. In other words, four spatial merging motion information candidates not including the temporal merging motion information candidate are compared with each other in round robin matches so as to determine the identity, and duplicate candidates are removed.

Here, while the merging prediction mode corresponds to a technique using motion information of blocks neighboring in space and time for a coding process by using the continuity of a motion in the temporal direction and the spatial direction instead of directly coding the motion information of the prediction target block, the spatial merging motion information candidates are based on the continuity in the spatial direction, but the temporal merging motion information candidates are generated using a method to be described later based on the continuity in the temporal direction, whereby the characteristics thereof are different from each other. Accordingly, a case is rare in which the same motion information is included in a temporal merging motion information candidate and a spatial merging motion information candidate, and, even in a case where the temporal merging motion information candidates are excluded from the target for the merging motion information candidate removing process performed for removing the same motion information, there is a rare case in which the same motion information is included in the merging motion information candidate list that is finally acquired.

In addition, since the temporal merging motion information candidate block to be described later is managed in units of the minimal spatial prediction blocks of which the size is larger than the size of the minimal prediction block, in a case where the size of a prediction block neighboring in time is smaller than the minimal spatial prediction block, the motion information located at a position deviating from the original position is used, and, as a result, an error may be frequently included in the motion information. Accordingly, since there are many cases where the motion information is different from the motion information of a spatial merging motion information candidate, in a case where the temporal merging motion information candidates are excluded from the targets for the merging motion information candidate removing process performed for removing the same motion information, the influence thereof is small.

FIGS. 17A and 17B are examples of the contents of comparisons among candidates in the merging motion information candidate removing process in a case where a maximum number of spatial merging motion information candidates is four. FIG. 17A is the content of a comparison of a case where only spatial merging motion information candidates are set as targets for the merging motion information candidate removing process, and FIG. 17B is the content of a comparison of a case where spatial merging motion information candidates and temporal merging motion information candidates are set as targets for the process. By setting only the spatial merging motion information candidates as targets for the merging motion information candidate removing process, the number of comparisons of the motion information decreases to six from ten.

As above, by not setting the temporal merging motion information candidates as targets for the merging motion information candidate removing process, the number of comparisons of the motion information can be reduced from ten to six while the same motion information is appropriately removed.

Figures 18A, 18B:
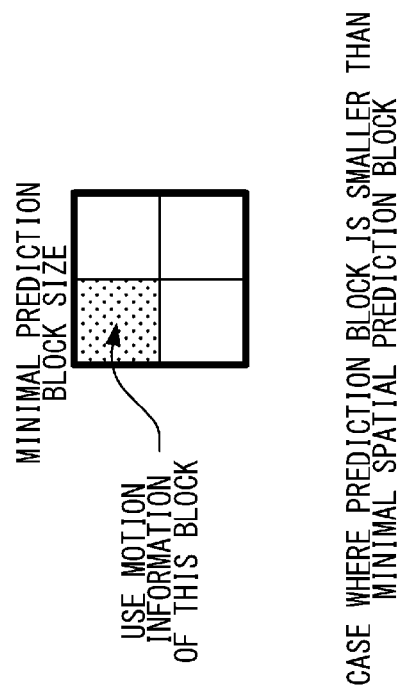
FIGS. 18A and 18B are diagrams that illustrate a temporal candidate block group used for a temporal merging motion information candidate list constructing process.

Subsequently, the temporal merging motion information candidate list constructing process will be described. FIGS. 18A and 18B are diagrams that illustrate the definition of a block neighboring in the temporal direction that is used for the temporal merging motion information candidate list constructing process. A temporal candidate block group represents a block located at the same position as the position of a prediction target block and blocks neighboring thereto out of blocks belonging to a coded picture ColPic other than a picture to which the prediction target block belongs. The block group is managed in units of the minimal spatial prediction block size, and the positions of the candidate blocks are managed in units of the minimal spatial prediction block size. In Embodiment 1 of the present invention, the minimal spatial prediction block size is a size that is twice the minimal prediction block size in the vertical and horizontal directions. In a case where the size of the prediction block of a block neighboring in time is larger than the minimal spatial prediction block size, the same motion information is stored in all the candidate blocks within the prediction block size. On the other hand, in a case where the size of the prediction block is smaller than the minimal spatial prediction block size, the information of a prediction block located on the upper left side of the block neighboring in the temporal direction is set as the information of the prediction block in the temporal direction. FIG. 18B illustrates motion information of a prediction block neighboring in the temporal direction of a case where the prediction block size is smaller than the minimal spatial prediction block size.

In FIG. 18A, blocks located at positions A1 to A4, B1 to B4, C, D, E, F1 to F4, G1 to G4, H, and I1 to I16 form a block group neighboring in time. In Embodiment 1, out of the block group neighboring in time, a temporal candidate block group is configured by two blocks including blocks H and I6.

Figure 19:
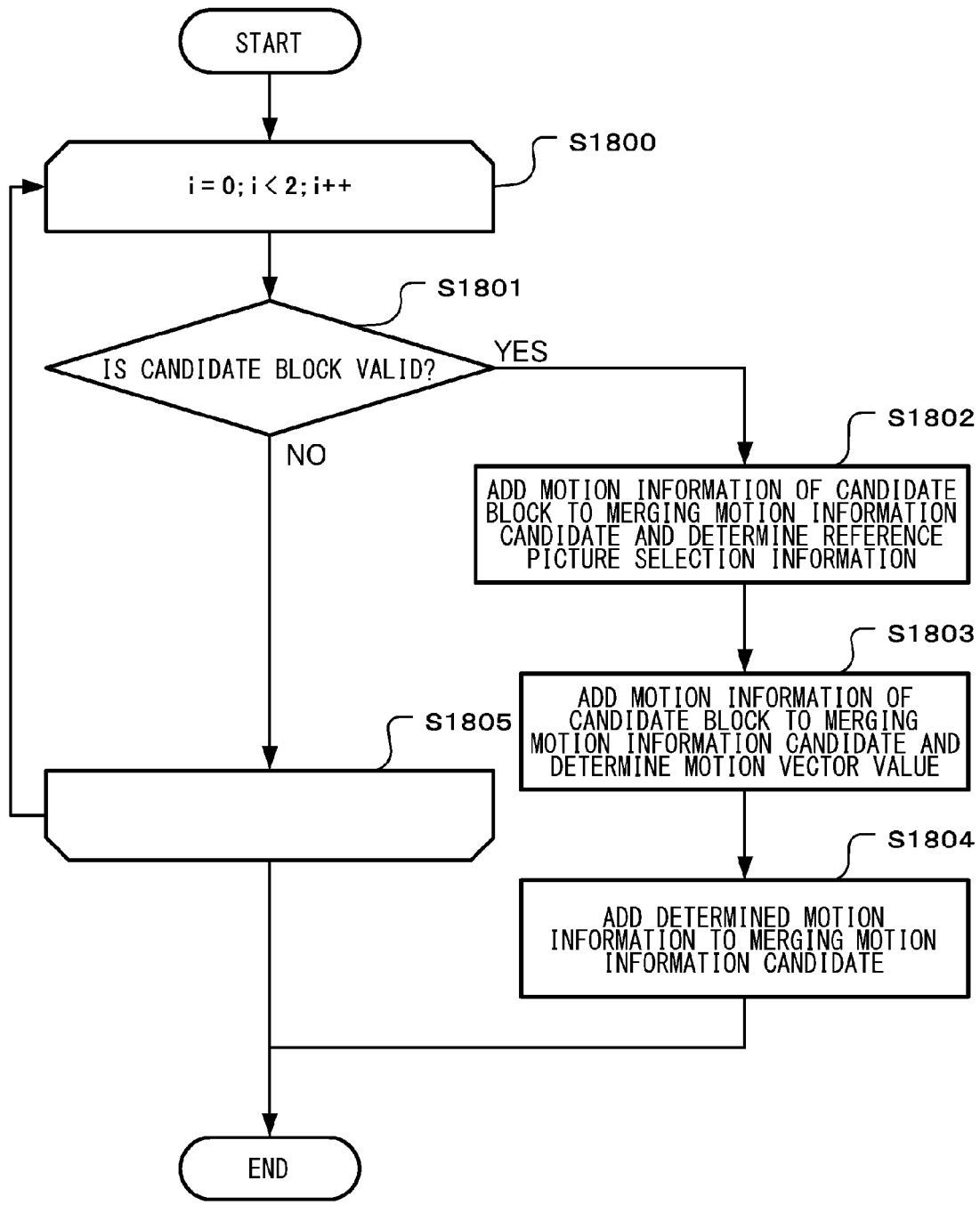
FIG. 19 is a flowchart that illustrates the detailed operation of the temporal merging motion information candidate list constructing process.

FIG. 19 is a flowchart that illustrates the detailed operation of the temporal merging motion information candidate list constructing process. For blocks H and I6 that are two candidate blocks included in a temporal candidate block group (steps S1800 and S1805), the validness of the candidate blocks is checked in order of blocks H and I6 in step S1801. In a case where the candidate block is valid (YES in step S1801), motion information generated by the process of steps S1802 to S1804 is added in the temporal merging motion information candidate list, and the process ends. In a case where the candidate block represents a position located outside the screen area, or the candidate block is an intra prediction block (NO in step S1801), the candidate block is determined not to be valid, and the validness/invalidness of the next candidate block is determined.

In a case where the candidate block is valid (YES in step S1801), a reference picture selection candidate to be added in the merging motion information candidate is determined based on the motion information of the candidate block in step S1802. In Embodiment 1, the reference picture of the L0 prediction is a reference picture having a shortest distance from the processing target picture out of reference pictures of the L0 prediction, and the reference picture of the L1 prediction is a reference picture having a shortest distance from the processing target picture out of reference pictures of the L1 prediction.

Here, the technique for determining the reference picture selection candidate is not limited thereto, and any technique capable of determining a reference picture of the L0 prediction and a reference picture of the L1 prediction may be used. By determining a reference picture using the same technique in the coding process and the decoding process, the reference picture intended at the time of the coding process can be determined. As another technique for determining the reference picture selection candidate, for example, a technique for selecting a reference picture of which the reference picture index is zero is selected from among reference pictures of the L0 prediction and reference pictures of the L1 prediction, a technique for selecting a reference picture that is the most frequently used is selected from among L0 reference pictures and L1 reference pictures used by spatial neighboring blocks as the reference picture of the prediction target block, a technique for designating a reference picture of each prediction type within the bitstream, or the like may be used.

Next, based on the motion information of the candidate block, a motion vector value added in the merging motion information candidate is determined in step S1803. In Embodiment 1, as the temporal merging motion information, motion information of a bi-prediction is calculated based on a motion vector value that is a valid prediction type in the motion information of the candidate block. In a case where the prediction type of the candidate block is a single prediction of the L0 prediction or the L1 prediction, the motion information of the prediction type (the L0 prediction or the L1 prediction) used in the prediction is selected, and the reference picture designation information and the motion vector value are used as the reference values for generating the bi-prediction motion information.

In a case where the prediction type of the candidate block is the bi-prediction, the motion information of one of the L0 prediction and the L1 prediction is selected as the reference value. As the method for selecting the reference value, for example, a method in which motion information that is present for the prediction type that is the same as that of the picture ColPic is selected, a method in which a reference picture having a shortest inter-picture distance from the picture ColPic is selected from among reference pictures of each of the L0 prediction and the L1 prediction of the candidate block, a method in which a reference picture, for which the motion vector of each of the L0 prediction and the L1 prediction of the candidate block intersects the coding process target picture is selected, or the like may be used.

When the motion vector value that is used as the reference for generating the bi-prediction motion information is determined, a motion vector value added in the merging motion information candidate is calculated.

Figure 20:
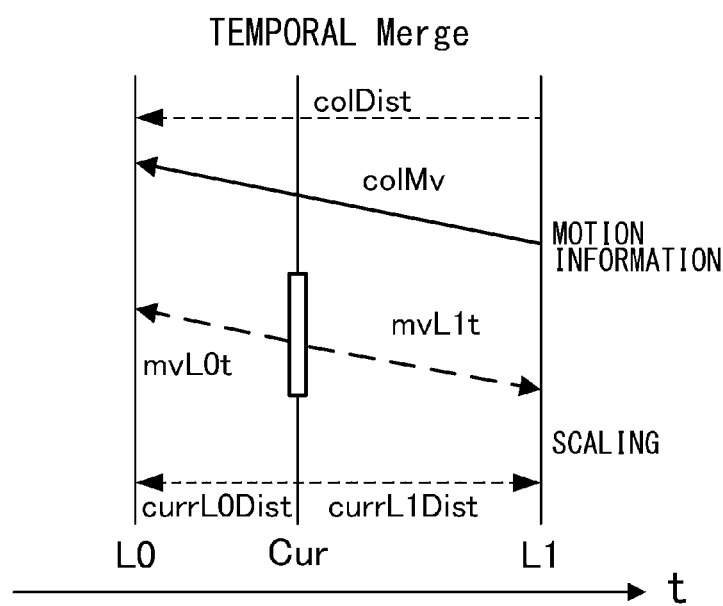
FIG. 20 is a diagram that illustrates a technique for calculating motion vector values mvL0t and mvL1t respectively added in an L0 prediction and an L1 prediction with respect to a reference motion vector value ColMv of temporal merging motion information.

FIG. 20 is a diagram that illustrates a technique for calculating motion vector values mvL0t and mvL1t respectively added in the L0 prediction and the L1 prediction with respect to a reference motion vector value ColMv of the temporal merging motion information.

An inter-picture distance between the picture ColPic with respect to the reference motion vector value ColMv and the reference picture that is a target for a motion vector that is used as the reference for a candidate block is denoted by ColDist. The inter-picture distances between the reference pictures of the L0 prediction and the L1 prediction and the processing target picture are denoted by CurrL0Dist and CurrL1Dist. Motion vectors acquired by scaling the reference motion vector value ColMv at the distance ratios of ColDist and the inter-picture distances CurrL0Dist and CurrL1Dist are set as motion vectors to be added. More specifically, the motion vector values mvL0t and mvL1t are calculated by using the following Equations 1 and 2.

$$mvL0t = mvCol \times CurrL0Dist/ColDist \quad \text{Equation 1}$$

$$mvL1t = mvCol \times CurrL1Dist/ColDist \quad \text{Equation 2}$$

Referring back to FIG. 19, reference picture selection information (indexes) and the motion vector values of the bi-prediction generated in this way are added to the merging motion information candidate in step S1804, and the temporal merging motion information candidate list constructing process ends.

Figure 21:
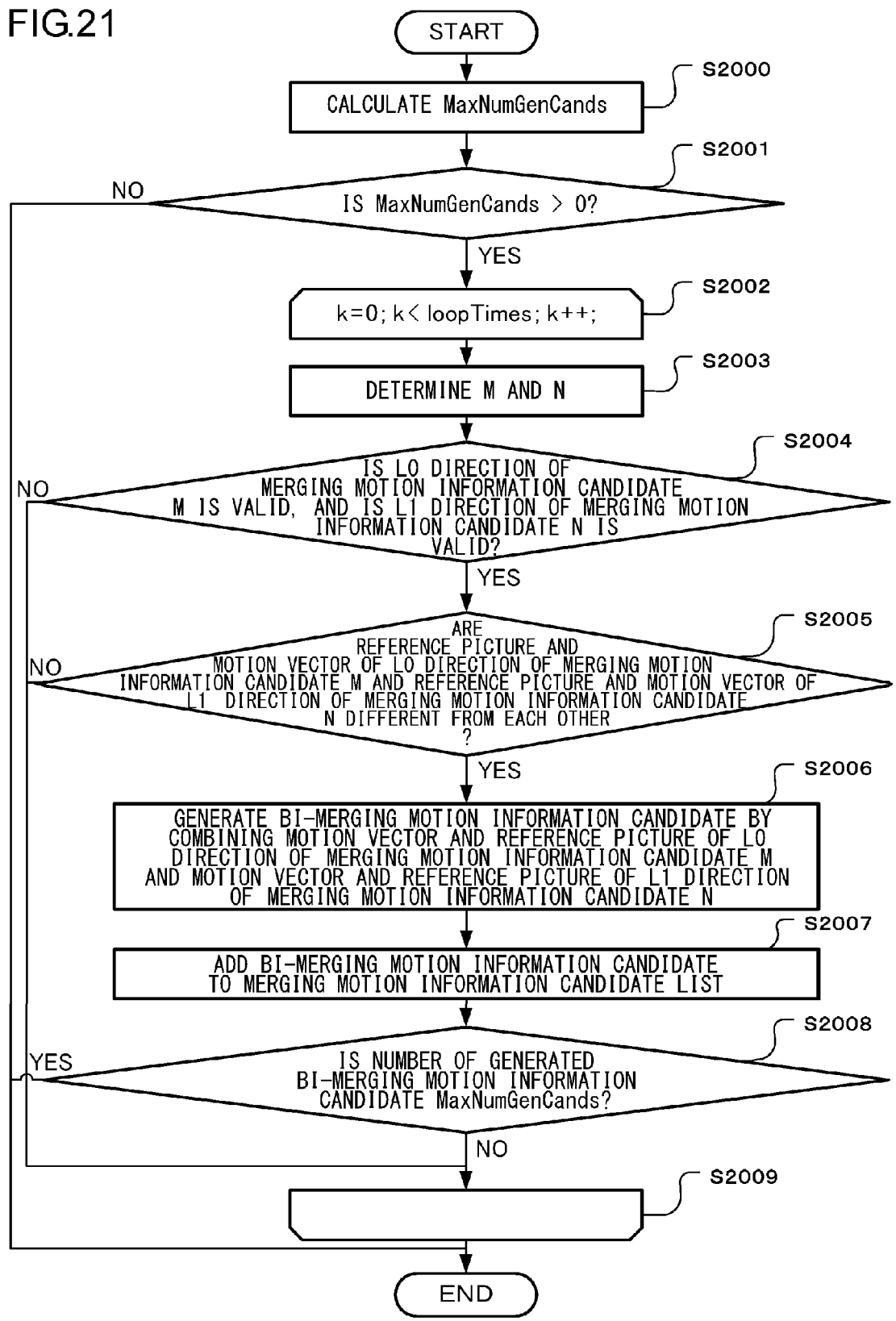
FIG. 21 is a flowchart that illustrates the detailed operation of a first merging motion information candidate list adding unit.

Subsequently, the detailed operation of the first merging motion information candidate list adding unit 1003 will be described. FIG. 21 is a flowchart that illustrates the detailed operation of the first merging motion information candidate list adding unit 1003. First, MaxNumGenCand that is a maximum number of first additional merging motion information candidates to be generated is calculated in accordance with Equation 3 using the number NumCandList of merging motion information candidates added in the merging motion information candidate list that is supplied from the temporal merging motion information candidate list constructing unit 1002 and a maximum number MaxNumMergeCand of the merging motion information candidates in step S2000.

$$MaxNumGenCand = MaxNumMergeCand - NumCandList; (NumCandList > 1) \quad \text{Equation 3}$$

$$MaxNumGenCand = 0; (NumCandList <= 1)$$

Next, it is checked whether MaxNumGenCand is larger than zero in step S2001. In a case where MaxNumGenCand is not larger than zero (NO in step S2001), the process ends. On the other hand, in a case where MaxNumGenCand is larger than zero (YES in step S2001), the following process is performed. First, loopTimes that is the number of times of combination checking is determined. loopTimes is set to NumCandList×NumCandList. However, in a case where loopTimes exceeds eight, loopTimes is limited to eight in step S2002. Here, loopTimes is an integer in the range of zero to seven. The following process is repeatedly performed for the number of times loopTimes in steps S2002 to S2009.

A combination of a merging motion information candidate M and a merging motion information candidate N is determined in step S2003. Here, the relation among the number of times of combination checking, the merging motion information candidate M, and the merging motion information candidate N will be described.

FIG. 22 is a diagram that illustrates the relation among the number of times of combination checking, a merging motion information candidate M, and a merging motion information candidate N. Here, similarly to the case illustrated in FIG. 22, M and N are mutually-different values and are set in the descending order of a total value of M and N.

It is checked whether the L0 prediction of the merging motion information candidate M is valid, and the L1 prediction of the merging motion information candidate N is valid in step S2004. In a case where the L0 prediction of the merging motion information candidate M is valid, and the L1 prediction of the merging motion information candidate N is valid (YES in step S2004), it is checked whether or not the reference picture and the motion vector of the L0 prediction of the merging motion information candidate M are different from the reference picture and the motion vector of the L1 prediction of the merging motion information candidate N in step S2005. In a case where the L0 prediction of the merging motion information candidate M is valid, but the L1 prediction of the merging motion information candidate N is not valid (NO in step S2004), the next combination is processed. In a case where the reference picture of the L0 prediction of the merging motion information candidate M and the reference picture of the L1 prediction of the merging motion information candidate N are different from each other (YES in step S2005), a bi-merging motion information candidate is generated by combining the motion vector and the reference picture of the L0 prediction of the merging motion information candidate M and the motion vector and the reference picture of the L1 prediction of the merging motion information candidate N in step S2006. Here, as a first additional merging motion information candidate, bi-merging motion information acquired by combining the L0 prediction of a certain merging motion information candidate and motion information of the L1 prediction of another merging motion information candidate is generated. In a case where the reference picture of the L0 prediction of the merging motion information candidate M and the reference picture of the L1 prediction of the merging motion information candidate N are the same (NO in step S2005), the next combination is processed. Following step S2006, the bi-merging motion information candidate is added to the merging motion information candidate list in step S2007. Following step S2007, it is checked whether the number of generated sets of the bi-merging motion information is MaxNumGenCand in step S2008. In a case where the number of generated sets of the bi-merging motion information is MaxNumGenCand (YES in step S2008), the process ends. On the other hand, in a case where the number of generated sets of the bi-merging motion information is not MaxNumGenCand (NO in step S2008), the next combination is processed.

Here, while the first additional merging motion information candidate is set as the bi-merging motion information candidate, of which the prediction type of the motion-compensated prediction is the bi-prediction, acquired by combining the motion vector and the reference picture of the L0 prediction of the merging motion information candidate added in the merging motion information candidate list and the motion vector and the reference picture of the L1 prediction of another merging motion information candidate, however, the present invention is not limited thereto. For example, the first additional merging motion information candidate may be set as a merging motion information candidate, of which the prediction type is the bi-prediction, of motion-compensated predictions of a motion vector of the L0 prediction of the merging motion information candidate added in the merging motion information candidate list and a value acquired by adding an offset value such as +1 to the motion vector of the L1 prediction or a merging motion information candidate, of which the prediction type is the single prediction, of a motion-compensated prediction of a motion vector of the L0 prediction of the merging motion information candidate added in the merging motion information candidate list or a value acquired by adding an offset value such as +1 to the motion vector of the L1 prediction, or an arbitrary combination thereof may be set.

Here, as the first additional merging motion information candidate, in a case where there is a small deviation between the motion information of the merging motion information candidate added in the merging motion information candidate list and the motion of the motion information candidate that is the processing target, by generating a valid merging motion information candidate by correcting the motion information of the merging motion information candidate added in the merging motion information candidate list, the coding efficiency can be increased.

Figure 23:
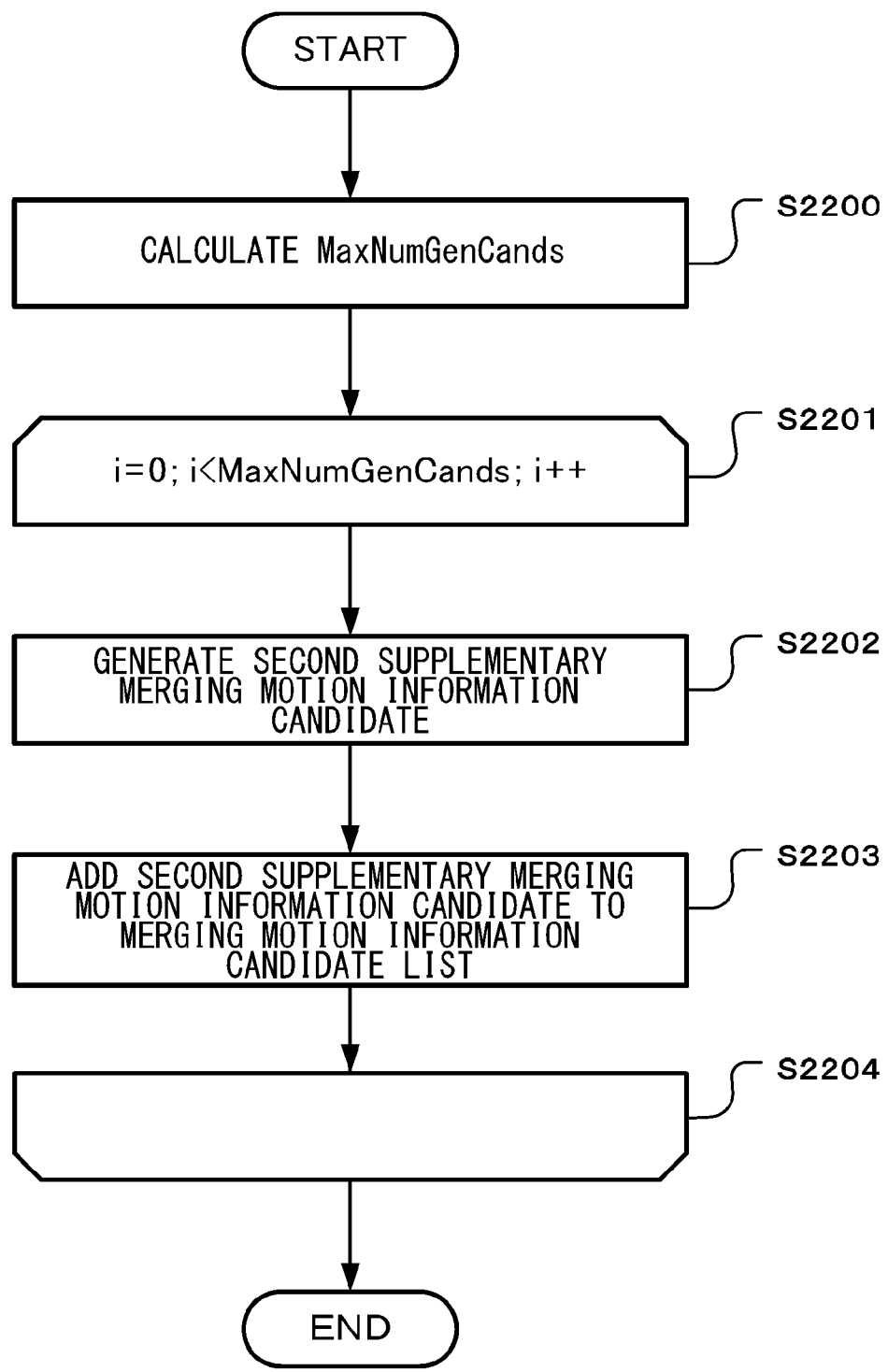
FIG. 23 is a flowchart that illustrates the detailed operation of a second merging motion information candidate list adding unit.

Subsequently, the detailed operation of the second merging motion information candidate list adding unit 1004 will be described. FIG. 23 is a flowchart that illustrates the operation of the second merging motion information candidate list adding unit 1004. First, MaxNumGenCand that is a maximum number of first additional merging motion information candidates to be generated is calculated in accordance with Equation 4 using the number NumCandList of merging motion information candidates added in the merging motion information candidate list that is supplied from the first merging motion information candidate list adding unit 1003 and a maximum number MaxNumMergeCand of the merging motion information candidates in step S2200.

MaxNumGenCand=MaxNumMergeCand−NumCandList;   Equation 4

Next, for i, the following process is repeatedly performed for the number of times MaxNumGenCand (steps S2201 to S2205). Here, i is an integer in the range of zero to MaxNumGenCand−1. A second additional merging motion information candidate, of which the prediction mode is the bi-prediction, in which the motion vector and the reference index of the L0 prediction are (0, 0) and i, and the motion vector and the reference index of the L1 prediction are (0, 0) and i is generated in step S2202. The second additional merging motion information candidate is added to the merging motion information candidate list in step S2203. Then, the process is performed for the next i in step S2204.

Here, the second additional merging motion information candidate is set as a merging motion information candidate, of which the prediction type is the bi-prediction, in which the vector and the reference index of the L0 prediction are (0, 0) and i, and the motion vector and the reference index of the L1 prediction are (0, 0) and i. The reason for this that, in a general moving picture, the occurrence frequency of the merging motion information in which the motion vector of the L0 prediction and the motion vector of the L1 prediction are (0, 0) is statistically high. However, the present invention is not limited thereto, but any merging motion information candidate, of which the use frequency is statistically high, not depending on the motion information of the merging motion information candidate added in the merging motion information candidate list may be used. For example, the motion vectors of the L0 and L1 predictions may have a vector value other than (0, 0), and the reference indexes of the L0 and L1 predictions may be set to be different from each other. In addition, the second additional merging motion information candidate may be set as motion information of a coded picture or a part of a coded picture, of which the occurrence frequency is high, and be set to be transmitted with being coded in a bitstream. Here, while the case of the B picture (B slice) has been described, in the case of the P picture (P slice), a second additional merging motion information candidate, of which the prediction type is the L0 prediction, in which the motion vector of the L0 prediction is (0, 0) is generated.

Here, as the second additional merging motion information candidate, by setting the merging motion information candidate not depending on the merging motion information candidate added in the merging motion information candidate list, in a case where there is no merging motion information candidate added in the merging motion information candidate list, the merging prediction mode can be used, whereby the coding efficiency can be improved. In addition, in a case where the motion information of the merging motion information candidate added in the merging motion information candidate list and the motion of the motion information candidate of the processing target are different from each other, by broadening the range of choices by generating a new merging motion information candidate, the coding efficiency can be improved.

Figure 24:
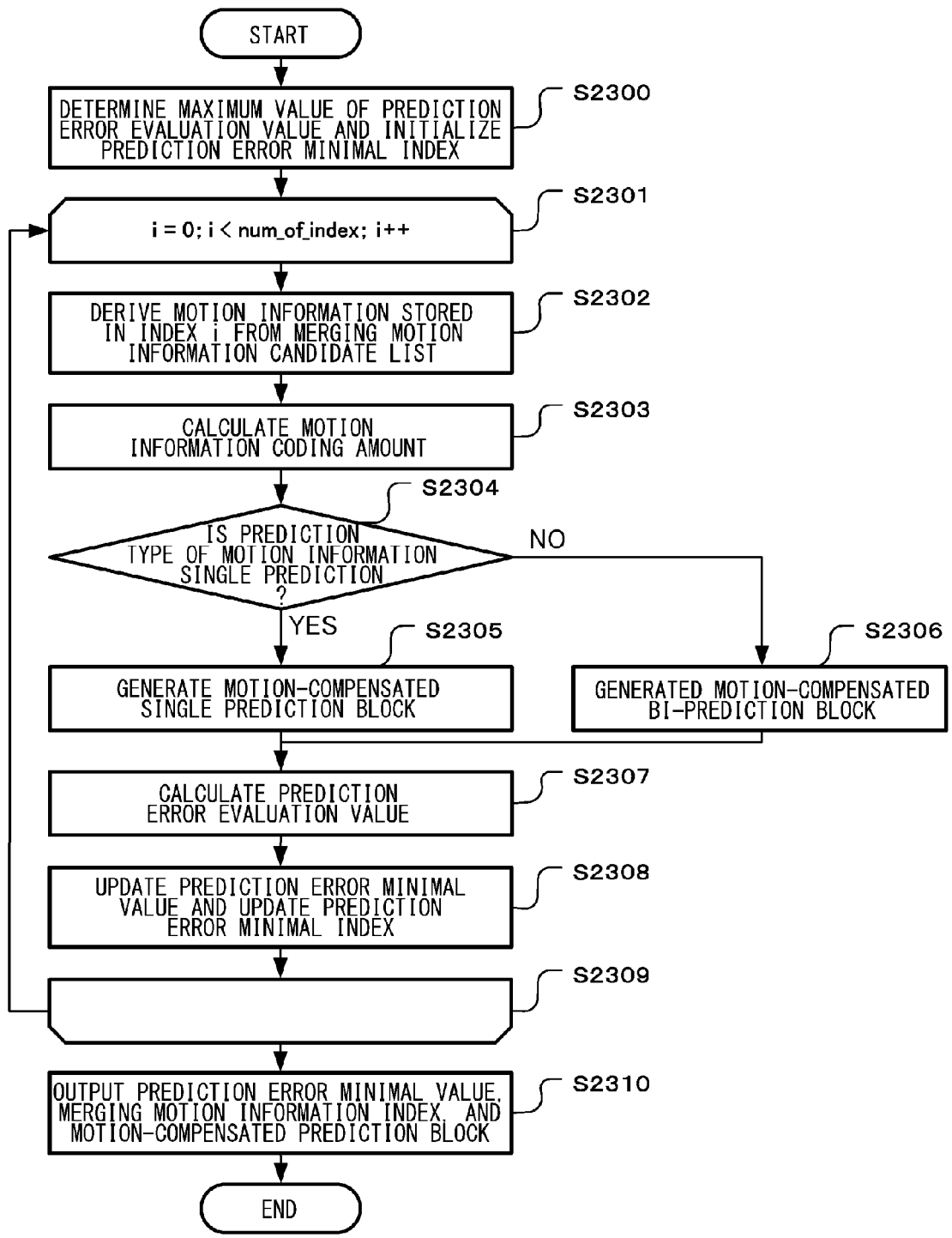
FIG. 24 is a flowchart that illustrates the detailed operation performed in a merging prediction mode evaluation value generating process illustrated in FIG. 11.

FIG. 24 is a flowchart that illustrates the detailed operation performed in a merging prediction mode evaluation value generating process of step S1101 illustrated in FIG. 11. As this operation, the detailed operation of the configuration using the merging motion-compensated prediction generating unit 908 illustrated in FIG. 9 is illustrated.

First, a prediction error evaluation value is set to a maximum value, and a merging motion information index at which the prediction error is the minimum is initialized (for example, a value such as −1 other than that of the list) in step S2300. According to the merging motion information candidate list constructing process, when the number of generated motion information candidate lists is denoted by num_of_index, the following process is repeatedly performed for merging motion information candidates of i=0 to num_of_index−1 in steps S2301 to S2309.

First, motion information stored in the index i is derived from the merging motion information candidate list in step S2302. Subsequently, the coding amount of the motion information is calculated in step S2303. In the merging prediction mode, only the merging motion information index is coded, and accordingly, only the merging motion information index forms the coding amount of the motion information.

As the bitstream of the merging motion information index, in Embodiment 1, a truncated unary bitstream is used. FIG. 25 is a diagram that illustrates a truncated unary bitstream of a case where the number of merging motion information candidates is "5". In a case where the value of the merging motion information index is coded using the truncated unary bitstream, as the merging motion information index decreases, the number of coding bits assigned to the merging motion information index decreases. For example, in a case where the number of the merging motion information candidates is five, when the merging motion information index is "1", it is represented by using two bits of "10", and, when the merging motion information index is "3", it is represented by using four bits of "1110". Here, while the truncated unary bitstream is used for coding the merging motion index as above, the present invention is not limited thereto, but another bitstream generating technique may be used.

Subsequently, in a case where the prediction type of the motion information is the single prediction (YES in step S2304), reference picture designation information and a motion vector for one reference picture are set by the motion-compensated prediction unit 108 illustrated in FIG. 1, and a motion compensation single prediction block is generated in step S2305. On the other hand, in a case where the prediction type of the motion information is not the single prediction (NO in step S2304), reference picture designation information and motion vectors for two reference pictures are set by the motion-compensated prediction unit 108, and a motion prediction bi-prediction block is generated in step S2306.

Subsequently, a prediction error evaluation value is calculated based on the motion-compensated prediction block, the prediction error of the prediction target block, and the coding amount of the motion information in step S2307, and in a case where the prediction error evaluation value is the minimum value, the evaluation value is updated, and the prediction error minimum index is updated in step S2308.

As a result of the comparisons of the prediction error evaluation values of all the merging motion information candidates, the selected prediction error minimum index is output as the merging motion information index used in the merging prediction mode together with the prediction error minimum value and the motion-compensated prediction block in step S2310, and the merging prediction mode evaluation value generating process ends.

Figure 26:
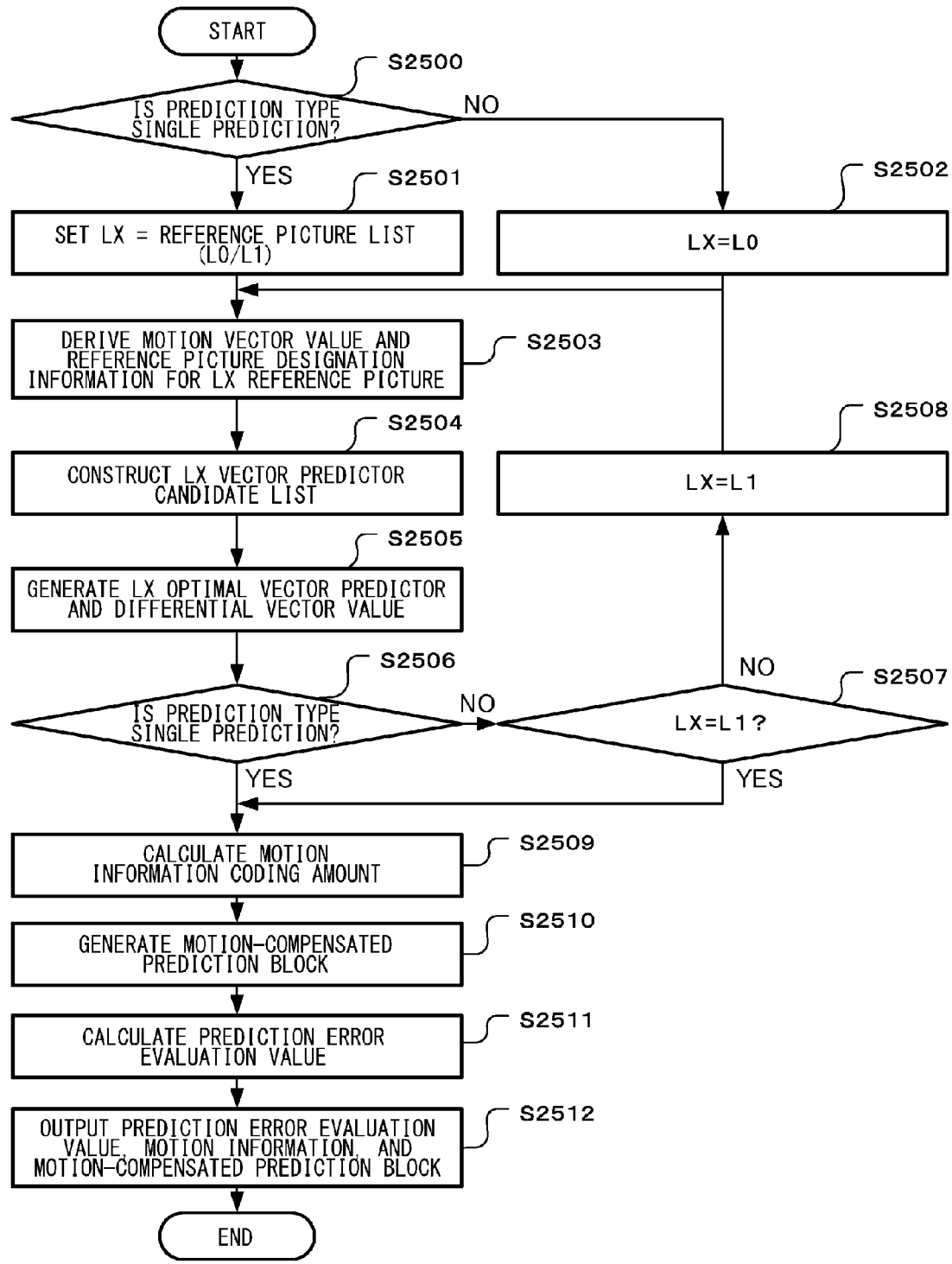
FIG. 26 is a flowchart that illustrates the detailed operation performed in a prediction mode evaluation value generating process illustrated in FIG. 11.

FIG. 26 is a flowchart that illustrates the detailed operation performed in the prediction mode evaluation value generating process of step S1102 illustrated in FIG. 11.

First, it is determined whether or not the prediction mode is the single prediction in step S2500. In a case where the prediction mode is the single prediction, the reference picture list LX that is the processing target is set in the reference picture list used for the prediction in step S2501. On the other hand, in a case where the prediction mode is not the single prediction but the bi-prediction, and accordingly, LX is set to L0 in step S2502.

Next, the reference picture designation information (index) and the motion vector value for the LX prediction are derived in step S2503. Subsequently, a vector predictor candidate list is constructed in step S2504, an optimal vector predictor is selected from among vector predictors, and a differential vector is generated in step S2505. As a technique for selecting the optimal vector predictor, it is preferable to select a differential vector that has the smallest coding amount at the time of actually coding a differential vector of the vector predictor and the motion vector to be transmitted, the optimal vector predictor may be calculated in a simple manner using a technique for selecting a differential vector of which a sum of the absolute values of the horizontal and vertical components is the smallest or the like Subsequently, it is determined whether or not the prediction mode is the single prediction again in step S2506. In a case where the prediction mode is the single prediction, the process proceeds to step S2509. On the other hand, in a case where the prediction mode is not the single prediction but the bi-prediction, it is determined whether or not the reference list LX of the processing target is L1 in step S2507. In a case where the reference list LX is L1, the process proceeds to step S2509. On the other hand, in a case where the reference list LX is not L1 but L0, LX is set as L1 in step S2508, and the same process as the process of steps S2503 to S2506 is performed.

Subsequently, the coding amount of the motion information is calculated in step S2509. In the case of the single prediction mode, as the motion information to be coded, three elements including the reference picture designation information, the differential vector value, and the vector predictor index for one reference picture, and, in the case of the bi-prediction mode, a total of six elements including the reference picture designation information, the differential vector values, and the vector predictor indexes for two reference pictures of L0 and L1 are formed. Then, a total of the coding amount acquired by coding the elements is calculated as the coding amount of the motion information. As the technique for generating the bitstream of the vector predictor index according to this embodiment, similarly to the bitstream of the merging motion information index, a truncated unary bitstream is used.

Subsequently, reference picture designation information and a motion vector for the reference picture is set by the motion-compensated prediction unit 108 illustrated in FIG. 1, and a motion-compensated prediction block is generated in step S2510.

In addition, a prediction error evaluation value is calculated based on the motion-compensated prediction block, the prediction error of the prediction target block, and the coding amount of the motion information in step S2511, the prediction error evaluation value and the reference picture designation information, the differential vector value, and the vector predictor index, which correspond to the motion information of the reference picture, are output together with the motion-compensated prediction block in step S2512, and the prediction mode evaluation value generating process ends.

The above-described process is the detailed operation of the prediction mode determining unit 109 of the moving picture coding device according to Embodiment 1.

[Detailed Operation of Motion Information Decoding Unit of Moving Picture Decoding Device According to Embodiment 1]

Figure 27:
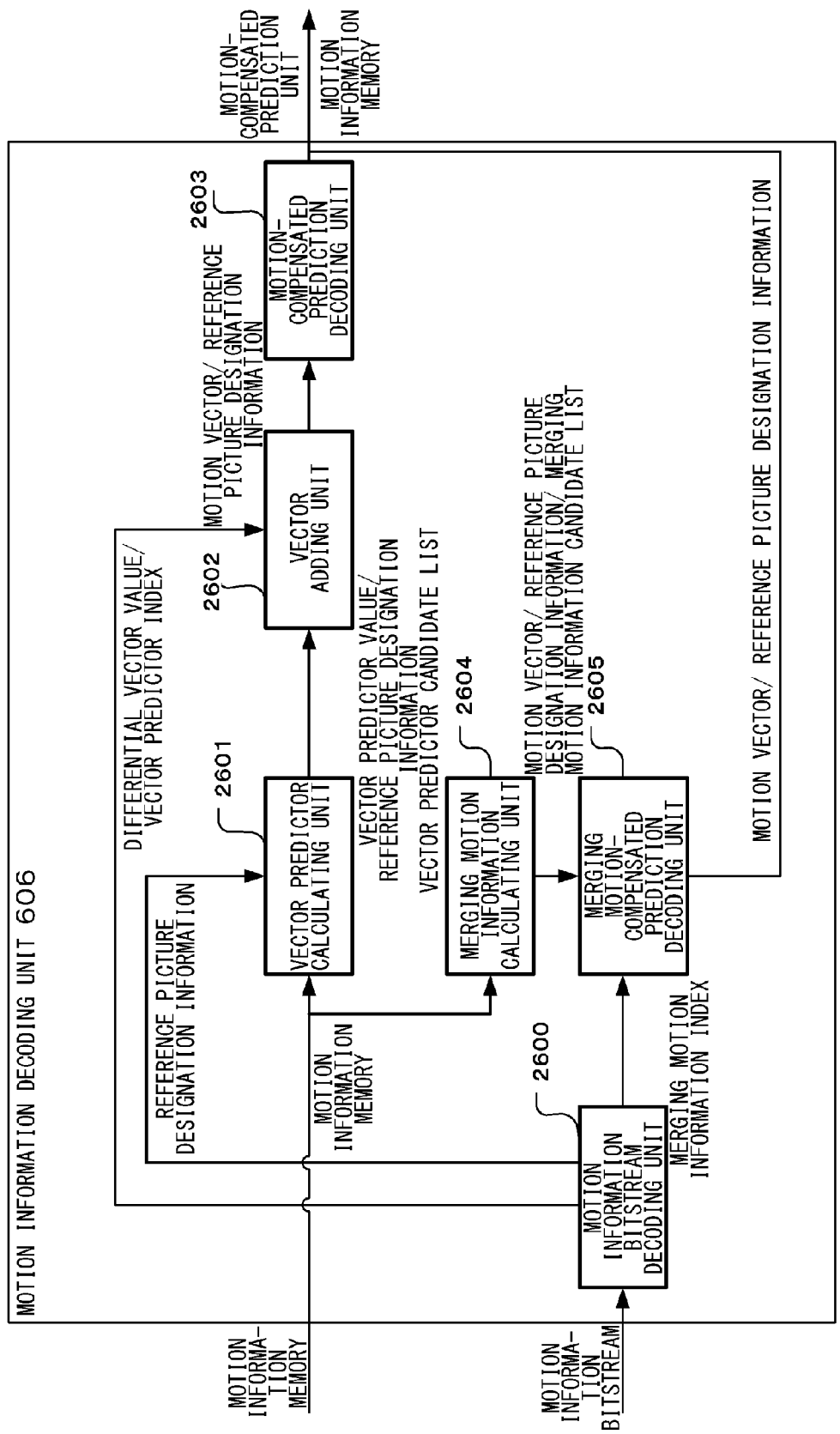
FIG. 27 is a diagram that illustrates the detailed configuration of a motion information decoding unit of the moving picture decoding device according to Embodiment 1.

FIG. 27 is a diagram that illustrates the detailed configuration of the motion information decoding unit 606 of the moving picture decoding device according to Embodiment 1 illustrated in FIG. 6. The motion information decoding unit 606 includes: a motion information bitstream decoding unit 2600; a vector predictor calculating unit 2601; a vector adding unit 2602; a motion-compensated prediction decoding unit 2603; a merging motion information calculating unit 2604; and a merging motion-compensated prediction decoding unit 2605.

The motion information bitstream input from the demultiplexing unit 601 is supplied to the motion information bitstream decoding unit 2600 of the motion information decoding unit 606 illustrated in FIG. 6, and the motion information input from the motion information memory 607 is supplied to the vector predictor calculating unit 2601 and the merging motion information calculating unit 2604.

In addition, in the motion-compensated prediction unit 608, the reference picture designation information and the motion vector used for a motion-compensated prediction are output from the motion-compensated prediction decoding unit 2603 and the merging motion-compensated prediction decoding unit 2605, and decoded motion information including the information representing the prediction type is stored in the motion information memory 607.

The motion information bitstream decoding unit 2600 decodes the motion information bitstream input from the demultiplexing unit 601 in accordance with a coding syntax, thereby generating a transmitted prediction mode and motion information according to the prediction mode. Out of the generated motion information, the merging motion information index is supplied to the merging motion-compensated prediction decoding unit 2605, the reference picture designation information is supplied to the vector predictor calculating unit 2601, the vector predictor index is supplied to the vector adding unit 2602, and the differential vector value is supplied to the vector adding unit 2602.

The vector predictor calculating unit 2601 constructs a vector predictor candidate list for a reference picture that is the target for the motion-compensated prediction based on the motion information of a neighboring block that is supplied from the motion information memory 607 and the reference picture designation information supplied from the motion information bitstream decoding unit 2600 and supplies the constructed vector predictor candidate list to the vector adding unit 2602 together with the reference picture designation information. As the operation of the vector predictor calculating unit 2601, the same operation as that of the vector predictor calculating unit 902 of the moving picture coding device illustrated in FIG. 9 is performed, and the same candidate list as the vector predictor candidate list at the time of the coding process is constructed.

The vector adding unit 2602 adds the vector predictor value added at a position represented by the vector predictor index and the differential vector value based on the vector predictor candidate list and the reference picture designation information supplied from the vector predictor calculating unit 2601 and the vector predictor index and the differential vector supplied from the motion information bitstream decoding unit 2600, thereby reproducing a motion vector value for the reference picture that is the target for the motion-compensated prediction. The reproduced motion vector value is supplied to the motion-compensated prediction decoding unit 2603 together with the reference picture designation information.

The motion-compensated prediction decoding unit 2603 is supplied with the reproduced motion vector value and the reference picture designation information for the reference picture from the vector adding unit 2602 and sets the motion vector value and the reference picture designation information in the motion-compensated prediction unit 608, thereby generating a motion-compensated prediction signal.

The merging motion information calculating unit 2604 constructs a merging motion information candidate list based on the motion information of the neighboring block that is supplied from the motion information memory 607 and supplies the merging motion information candidate list and the reference picture designation information and the motion vector value of the merging motion information candidate, which are constituent elements of the list, to the merging motion-compensated prediction decoding unit 2605.

As the operation of the merging motion information calculating unit 2604, the same operation as that of the merging motion information calculating unit 906 of the moving picture coding device illustrated in FIG. 9 is performed, and the same candidate list as the merging motion information candidate list at the time of the coding process is constructed.

The merging motion-compensated prediction decoding unit 2605 reproduces the reference picture designation information and the motion vector value included in the merging motion information candidate list that is represented by the merging motion information index based on the merging motion information candidate list supplied from the merging motion information calculating unit 2604, the reference picture designation information and the motion vector value of the merging motion information candidate, which are the constituent elements of the list, and the merging motion information index supplied from the motion information bitstream decoding unit 2600 and sets the reference picture designation information and the motion vector value in the motion-compensated prediction unit 608, thereby generating a motion-compensated prediction signal.

Figure 28:
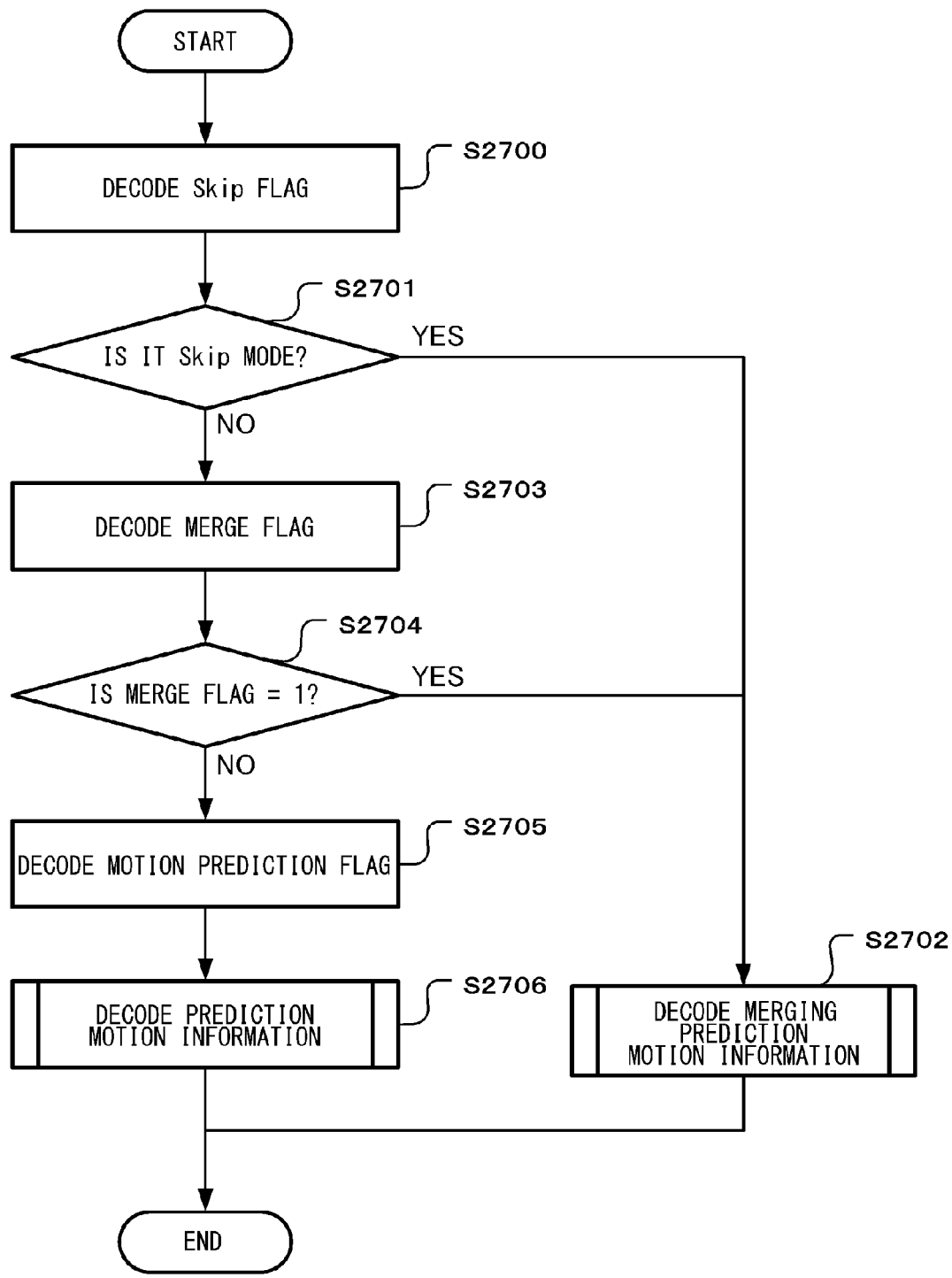
FIG. 28 is a flowchart that illustrates the detailed operation of the motion information decoding process illustrated in FIG. 7.

FIG. 28 is a flowchart that illustrates the detailed operation of the motion information decoding process illustrated of step S701 illustrated in FIG. 7. The motion information decoding process of step S701 illustrated in FIG. 7 is performed by the motion information bitstream decoding unit 2600, the vector predictor calculating unit 2601, and the merging motion information calculating unit 2604.

The motion information decoding process is a process of decoding the motion information from the bitstream coded in accordance with a specific syntax structure. First, a skip flag is decoded in predetermined units of coding blocks in step S2700. Subsequently, the process is performed in units of prediction blocks.

In a case where the skip flag represents the skip mode (YES in step S2701), the merging prediction motion information is decoded in step S2702. The detailed process of step S2702 will be described later.

On the other hand, in a case where the skip flag does not represents the skip mode (NO in step S2701), a merge flag is decoded in step S2703. In a case where the merge flag represents "1" (YES in step S2704), the process proceeds to the merging prediction motion information decoding process of step S2702.

On the other hand, in a case where the merge flag is not "1" (NO in step S2704), the motion prediction flag is decoded in step S2705, and the prediction motion information decoding process is performed in step S2706. The detailed operation of step S2706 will be described later.

Figure 29:
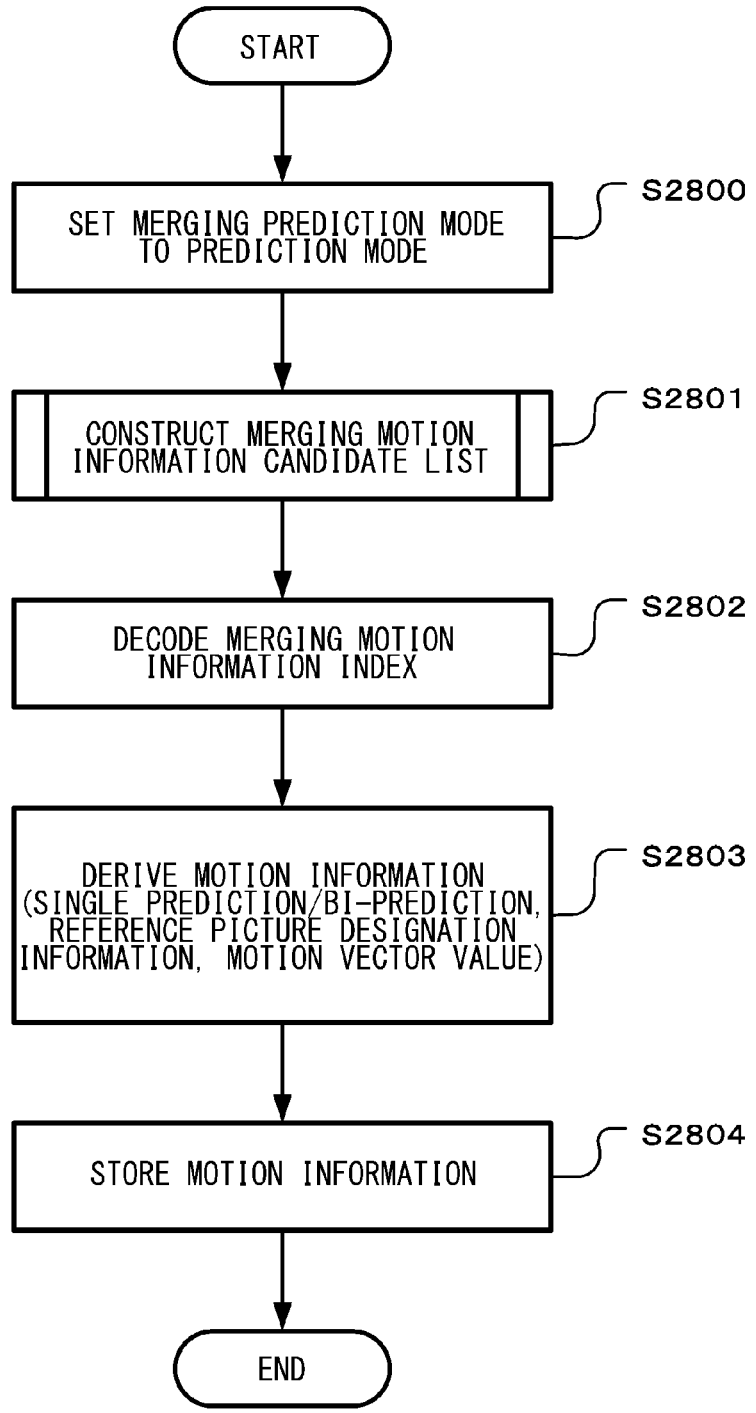
FIG. 29 is a flowchart that illustrates the detailed operation of a merging prediction motion information decoding process illustrated in FIG. 28.

FIG. 29 is a flowchart that illustrates the detailed operation of the merging prediction motion information decoding process of step S2702 illustrated in FIG. 28.

First, the merging prediction mode is set in the prediction mode in step S2800, and a merging motion information candidate list is constructed in step S2801. The process of step S2801 is the same as the merging motion information candidate list constructing process of step S1100 illustrated in FIG. 11 in the moving picture coding device.

Next, the merging motion information index is decoded in step S2802. Subsequently, the motion information stored at a position represented by the merging motion information index is derived from the merging motion information candidate list in step S2803. As the derived motion information, there are a prediction type representing the single prediction/bi-prediction, reference picture designation information, and a motion vector value The generated motion information is stored as the motion information of the merging prediction mode in step S2804 and is supplied to the merging motion-compensated prediction decoding unit 2606.

Figure 30:
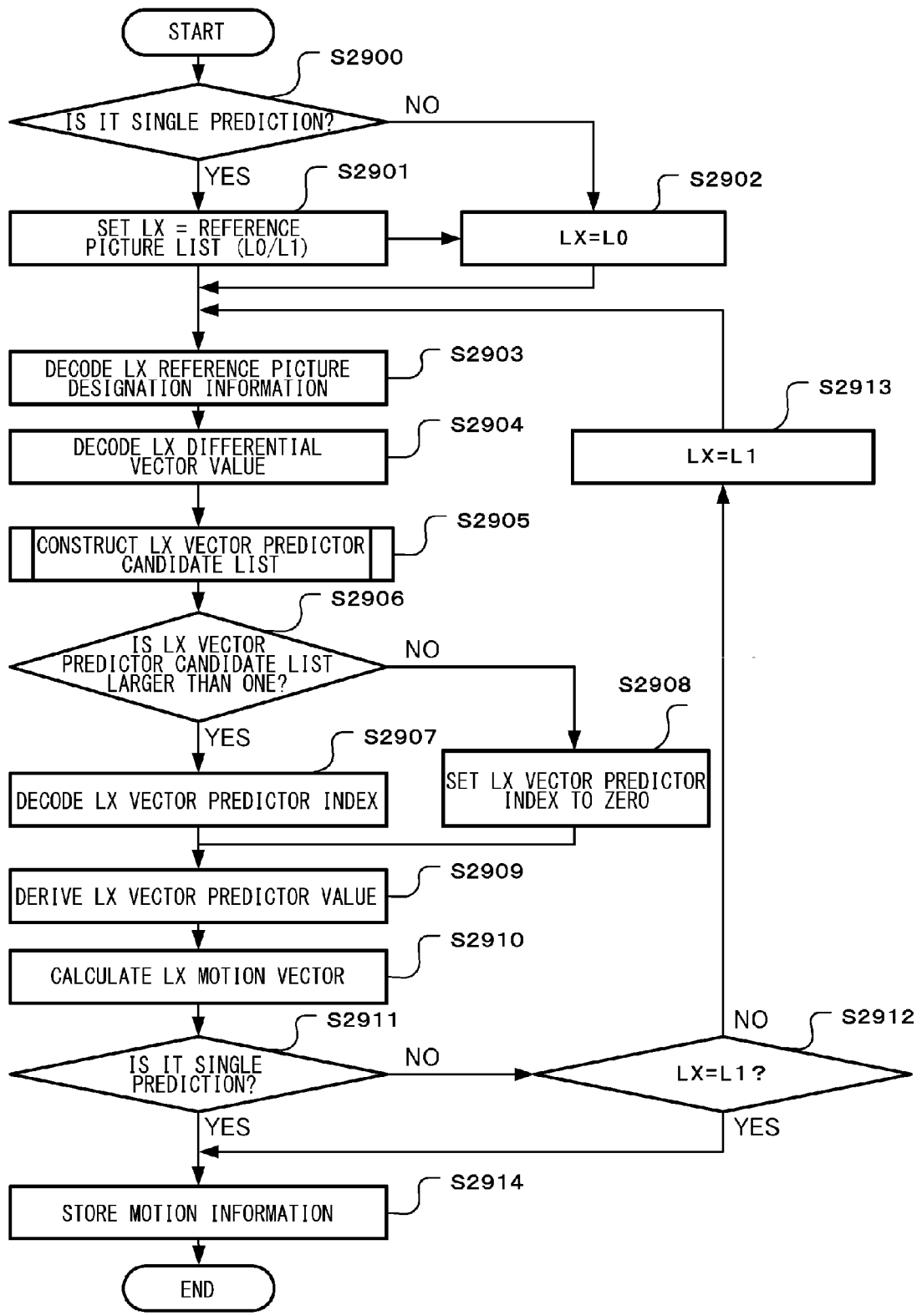
FIG. 30 is a flowchart that illustrates the detailed operation of the prediction motion information decoding process illustrated in FIG. 28.

FIG. 30 is a flowchart that illustrates the detailed operation of the prediction motion information decoding process of step S2706 illustrated in FIG. 28.

First, it is determined whether or not the prediction type is the single prediction in step S2900. In a case where the prediction type is the single prediction, the reference picture list LX that is the processing target is set in the reference picture list used for the prediction in step S2901. On the other hand, in a case where the prediction type is not the single prediction but the bi-direction, and, in this case, LX is set to L0 in step S2902.

Next, the reference picture designation information is decoded in step S2903, and the differential vector value is decoded in step S2904. Next, a vector predictor candidate list is constructed in step S2905. In a case where the vector predictor candidate list is larger than "1" (YES in step S2906), the vector predictor index is decoded in step S2907. On the other hand, in a case where the vector predictor candidate list is "1" (NO in step S2906), the vector predictor index is set to zero in step S2908.

Here, in step S2905, the same process as the process of step S2504 represented in the flowchart illustrated in FIG. 26 in the moving picture coding device is performed.

Next, a position vector value stored at the position represented by the vector predictor index is derived from the vector predictor candidate list in step S2909. By adding the decoded differential vector value and the motion vector value together, the motion vector is reproduced in step S2910.

Subsequently, it is determined whether or not the prediction type is the single prediction again in step S2911. In a case where the prediction type is the single prediction, the process proceeds to step S2914. On the other hand, in a case where the prediction type is not the single prediction but the bi-prediction, it is determined whether or not the reference list LX of the processing target is L1 in step S2912. In a case where the reference list LX is L1, the process proceeds to step S2914. On the other hand, in a case where the reference list LX is not L1 but L0, the reference list LX is set to L1 in step S2913, and the same process as that of steps S2903 to S2911 is performed.

Subsequently, as the generated motion information, in a case where the prediction type is the single prediction, the reference picture designation information and the motion vector value for one reference picture, and in a case where the prediction type is the bi-prediction, the reference picture designation information and the motion vector values for two reference pictures are stored as the motion information in step S2914 and are supplied to the motion-compensated prediction decoding unit 2603.

In the moving picture coding device and the moving picture decoding device according to Embodiment 1, the temporal merging motion information candidate list constructing unit is arranged on a stage later than that of the merging motion information candidate list removing unit in the merging motion information calculating unit, and only the spatial merging motion information candidates are set as the targets for the merging motion information candidate removing process. Accordingly, the merging motion information candidates having the same motion information can be appropriately removed from the merging motion information candidate list with a small calculation amount, and, as a result, by adding a new merging motion information candidate to the merging motion information candidate list, the kinds of motion information that can be used for the merging prediction mode increases, whereby the coding efficiency can be improved.

In addition, in the moving picture coding device and the moving picture decoding device according to Embodiment 1, the number of comparisons of the motion information made in the moving information candidate list removing unit decreases, and accordingly, there is an advantage of reducing the circuit scale and the processing time is also acquired.

(Embodiment 2)

Next, Embodiment 2 of the present invention will be described. In Embodiment 2, a merging prediction candidate removing operation is different from that of Embodiment 1. The configurations and processes other than the merging prediction candidate removing operation are the same as those of Embodiment 1, and here, only a difference in the merging motion information list removing process performed by the merging motion information candidate list removing unit 1001 illustrated in FIG. 10 from that of Embodiment 1 will be described.

Figure 31:
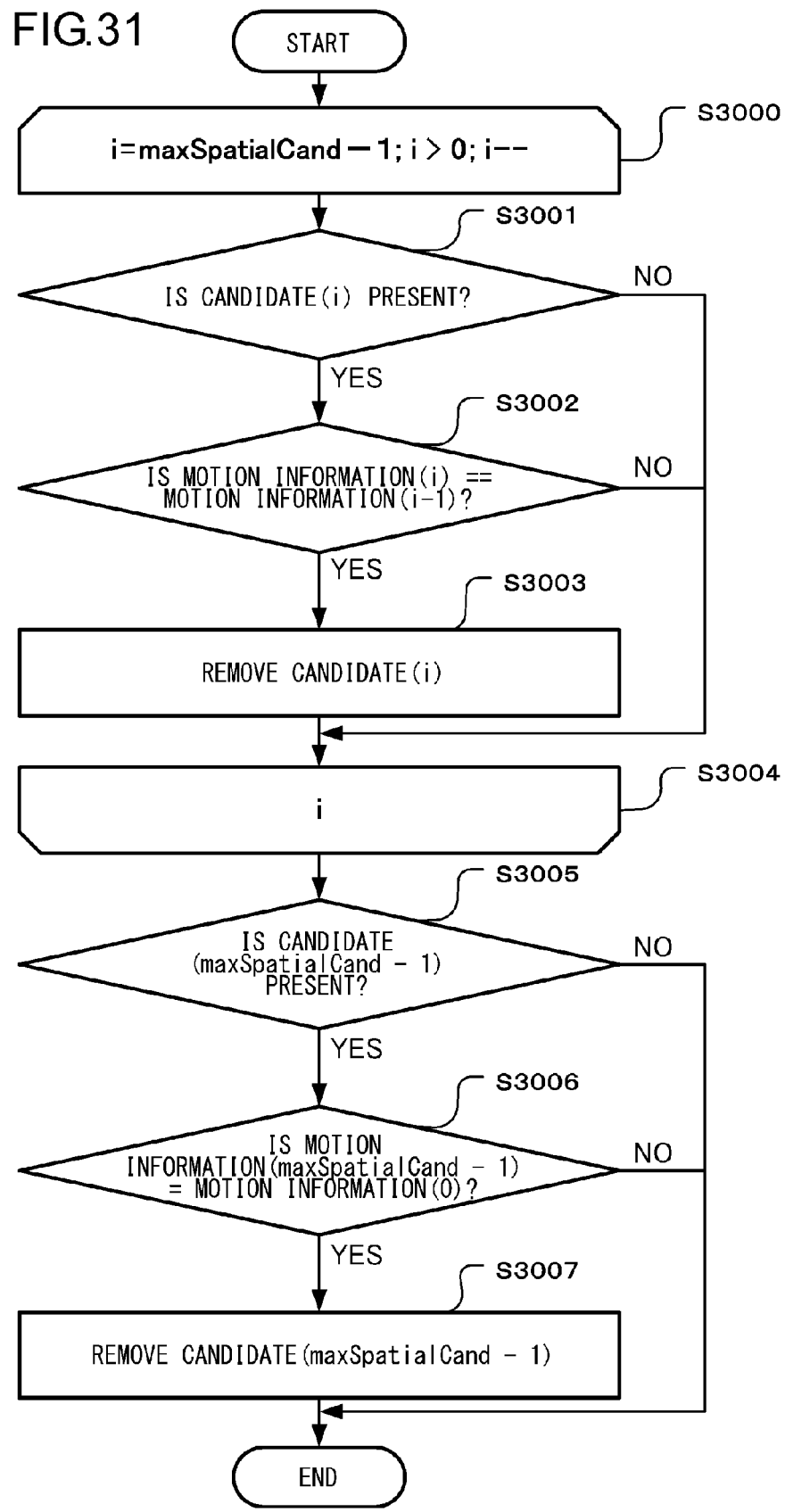
FIG. 31 is a flowchart that illustrates the detailed operation of a merging motion information candidate removing process according to Embodiment 2.

FIG. 31 is a flowchart that illustrates the detailed operation performed in the merging motion information candidate removing process according to Embodiment 2. When the maximum number of merging motion information candidates generated in the spatial merging motion information candidate list constructing process (step S1200) performed by the spatial merging motion information candidate list constructing unit 1000 is maxSpatialCand, the following process is repeatedly performed for a merging motion information candidate Candidate(i) from i=maxSpatialCand−1 to i>0 in steps S3000 to S3004.

In a case where Candidate(i) is present (YES in step S3001), and the motion information Motion Information(i) of Candidate(i) and the motion information Motion Information(i-1) of Candidate(i-1) are the same (YES in step S3002), Candidate(i) is removed from the merging motion information candidate list in step S3003.

On the other hand, in a case where Candidate(i) is not present (NO in step S3001) or a case where Candidate(i) is present but Motion Information(i) and Motion Information (i-1) are not the same (NO in step S3002), the process is repeated in step S3004.

Subsequently, in a case where Candidate(maxSpatial-Cand−1) is present (YES in step S3005), and the motion information Motion Information(maxSpatialCand−1) of Candidate(maxSpatialCand−1) and the first merging motion information candidate Motion Information(0) of the merging motion information candidate list are the same (YES in step S3006), Candidate(maxSpatialCand−1) is removed in step S3007, and the process ends.

In a case where Candidate(maxSpatialCand−1) is not present (NO in step S3005) or a case where Candidate (maxSpatialCand−1) is present, but Motion Information (maxSpatialCand−1) and Motion Information(0) are not the same (NO in step S3006), the process directly ends.

Figure 32:
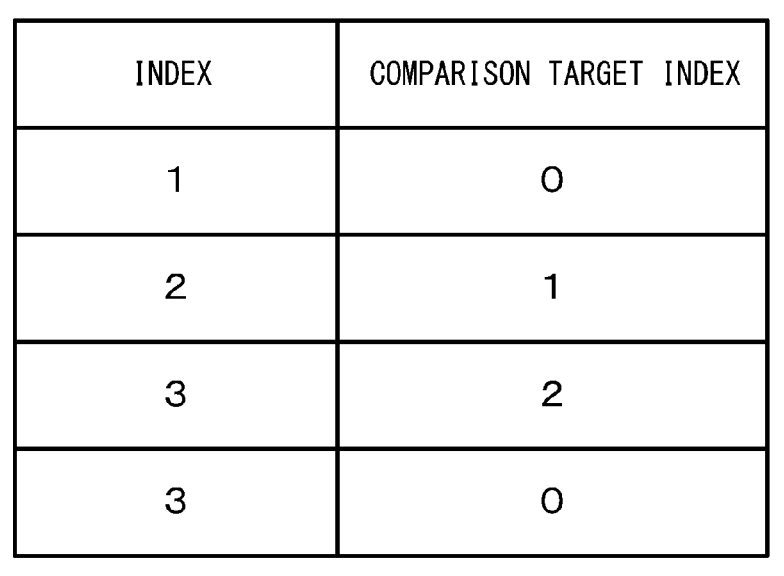

FIG. 32 is an example of the content of comparisons among candidates in the merging motion information candidate removing process according to Embodiment 2 in a case where a maximum number of the spatial merging motion information candidates is four. As illustrated in FIG. 32, in the case where the maximum number of the spatial merging motion information candidates is four, only four comparisons are made.

Figure 33:
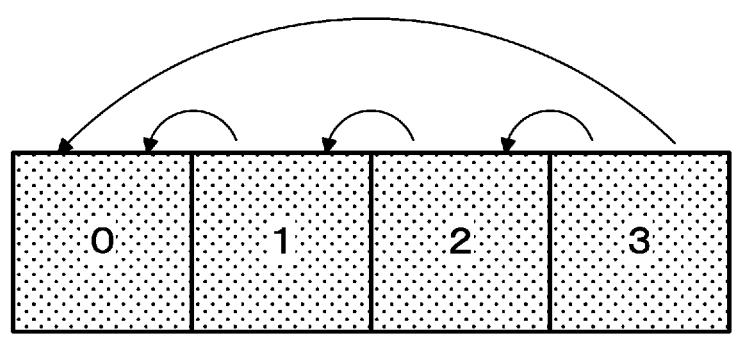
FIG. 33 is a diagram that illustrates comparative relation among motion information candidates in the merging motion information candidate removing process according to Embodiment 2.

FIG. 33 illustrates comparative relation among candidates included in the list of a case where there are four merging motion information candidates. In other words, for four spatial merging motion information candidates not including any temporal merging motion information candidate, candidates neighboring to each other in the arrangement order in the merging motion information candidate list are compared with each other, and a candidate of the highest rank and a candidate of the lowest rank are compared with each other, whereby the identity is determined, and duplicate candidates are removed.

Figure 34C:
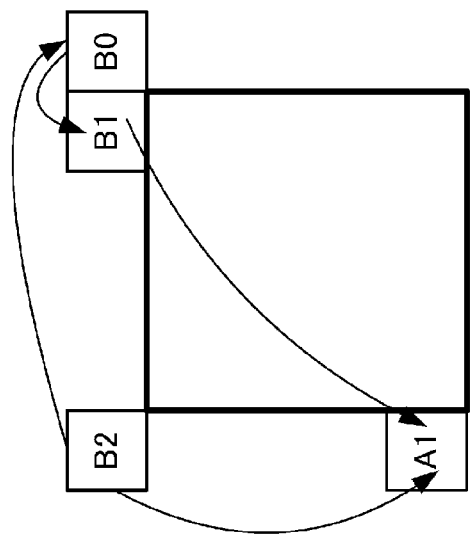
FIGS. 34A to 34C are diagrams that illustrate comparative relations among motion information candidates in the merging motion information candidate removing process according to Embodiment 2.
Figure 34B:
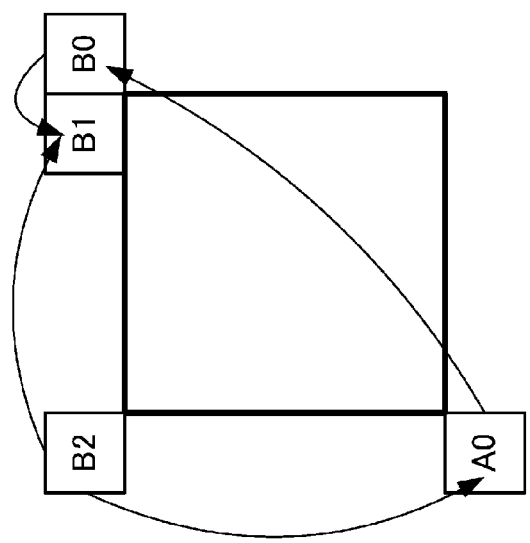
Figure 34A:
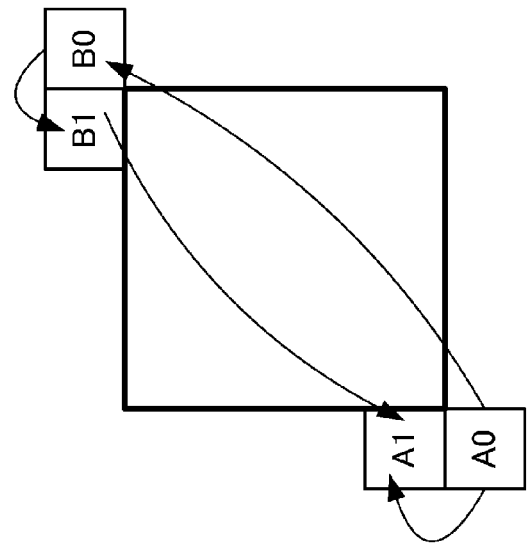

FIGS. 34A to 34C are diagrams that illustrates comparisons among neighboring blocks in the merging motion information candidate removing process of a case where a maximum number of spatial merging motion information candidates is four. FIG. 34A illustrates an example of a case where blocks A1, B1, B0, and A0 can be used. In the case where the blocks A1, B1, B0, and A0 can be used, the merging motion information candidate list constructed by the above-described spatial merging motion information candidate list constructing process is {A1, B1, B0, A0}, and accordingly, the comparison of motion information in the merging motion information candidate removing process is performed in the relation denoted by arrows illustrated in FIG. 32A.

Similarly, FIG. 34B illustrates comparative relation of motion information in the merging motion information candidate removing process in a case where blocks B1, B0, A0, and B2 can be used, and FIG. 34C illustrates comparative relation of motion information in the merging motion information candidate removing process in a case where blocks A1, B1, B0, and B2 can be used.

Here, since the continuity of the motion information is strong in the spatial direction, there is a high probability that the motion information is the same in neighboring blocks, and there is a low probability that the motion information is the same in blocks that are not neighboring to each other. Accordingly, in the merging motion information candidate removing process, by only making comparisons between neighboring blocks, the motion information can be appropriately removed.

In addition, in order to compare only the motion information of neighboring blocks, a method may be also considered in which the motion information of block positions determined in advance among the neighboring candidate block group is compared. However, in such a case, all the block positions of the motion information candidates of the merging motion information candidate list need to be stored, which leads to an increase in the circuit scale and an increase in the degree of complexity of the process.

Thus, in the merging motion information candidate removing process according to Embodiment 2 of the present invention, regardless of the block positions of the merging motion information candidates, comparisons are made in order in which the merging motion information candidates are added to the merging motion information candidate list, and then, the first candidate and the final candidate in the merging motion information candidate list are compared with each other. Accordingly, as illustrated in FIGS. 34A to 34C, the motion information between neighboring blocks can be compared with each other, and the same motion information can be appropriately removed with a small number of comparisons.

(Embodiment 3)

Next, Embodiment 3 of the present invention will be described. In Embodiment 3, a merging prediction candidate removing operation is different from that of Embodiment 1. The configurations and processes other than the merging prediction candidate removing operation are the same as those of Embodiment 1, and here, only a difference in the merging motion information list removing process performed by the merging motion information candidate list removing unit 1001 illustrated in FIG. 10 from that of Embodiment 1 will be described.

Figure 35:
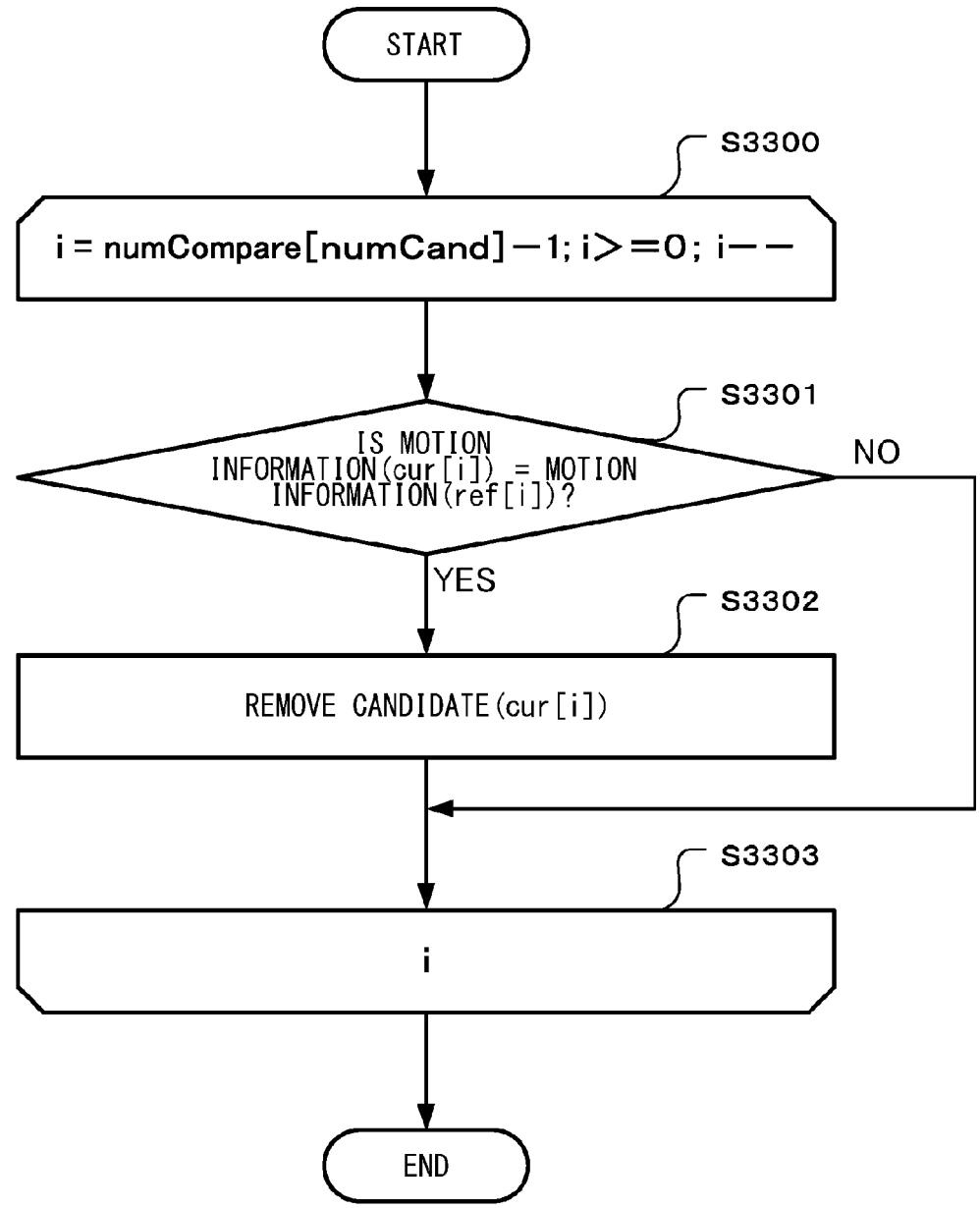
FIG. 35 is a flowchart that illustrates the detailed operation of a merging motion information candidate removing process according to Embodiment 3.

FIG. 35 is a flowchart that illustrates the detailed operation of the merging motion information candidate removing process according to Embodiment 3. When the number of merging motion information candidates generated in the spatial merging motion information candidate list constructing process (step S1200) performed by the spatial merging motion information candidate list constructing unit 1000 is numCand, and the number of times of calculation of comparison between the merging motion information candidates in the merging motion information candidate removing operation is numCompare, the following process is repeatedly performed for i=numCompare[numCand]−1 to i>0 in steps S3300 to S3303.

Here, the number of times of comparative calculation numCompare[i] is determined in accordance with the value of numCand as illustrated in FIG. 37A. In addition, in accordance with the value of i, the values of the comparison candidate index cur[i] and the reference candidate index ref[i] are determined as illustrated in FIG. 37B.

In a case where the motion information Motion Information(cur[i]) of the merging motion information candidate Candidate(cur[i]) of the index cur[i] of the merging motion information candidate list and the motion information Motion Information(ref[i]) of Candidate(ref[i]) are the same (YES in step S3301), Candidate(cur[i]) is removed from the merging motion information candidate list in step S3302.

In a case where Motion Information(cur[i]) and Motion Information(ref[i]) are not the same (NO in step S3301), the process is repeated in step S3303.

Figure 36:
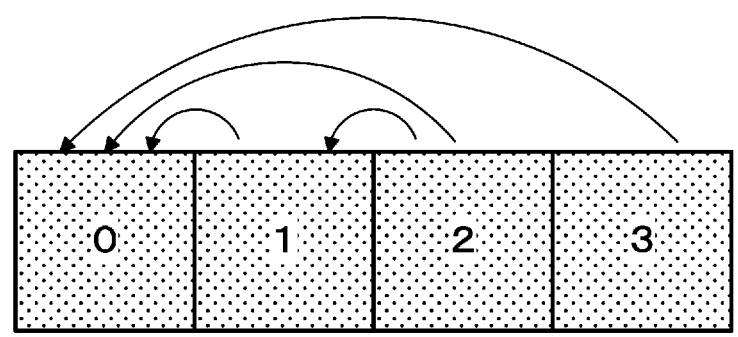
FIG. 36 is a diagram that illustrates comparative relation among motion information candidates in the merging motion information candidate removing process according to Embodiment 3.

FIG. 36 illustrates comparative relations among candidates included in the list of a case where there are four merging motion information candidates. In other words, for four spatial merging motion information candidates not including any temporal merging motion information candidate, candidates included up to the third from the position of the highest rank in the arrangement order of the merging motion information candidate list are compared with one another in round robin matching, and the candidate of the highest rank and the candidate of the lowest rank are compared with each other as is necessary, whereby the identity is determined, and duplicate candidates are removed.

As illustrated in FIGS. 37A and 37B, in the merging prediction candidate removing operation according to Embodiment 3 of the present invention, the number of comparisons of the motion information is zero to four in accordance with the number of the merging motion information candidates included in the merging motion information candidate list constructed by the spatial merging motion information candidate list constructing unit, and, compared to a case where all the motion information is compared, the number of comparisons can be markedly reduced.

In addition, since all the combinations of first three merging motion information candidates included in the merging motion information candidate list are compared with one another, even in a case where the merging motion information candidates having the same motion information cannot be removed due to the reduction of the number of comparisons, the same motion information is present only in the latter half of the merging motion information candidate list.

As described above, as the bitstream of the merging motion information index, the truncated unary bitstream is used, and accordingly, in a case where redundant motion information is present at an index having a small value in a short bitstream, the coding efficiency is lowered. However, according to the method of removing the merging motion information candidates of Embodiment 3 of the present invention, the same motion information of the merging motion information candidate list, which has a small index value, can be reliably removed, and accordingly, the coding efficiency of the motion information can be improved while the processing load is reduced.

(Embodiment 4)

Next, Embodiment 4 of the present invention will be described. In Embodiment 4, a merging prediction candidate removing operation is different from that of Embodiment 2. The configurations and processes other than the merging prediction candidate removing operation are the same as those of Embodiment 2, and here, only a difference in the merging motion information list removing process performed by the merging motion information candidate list removing unit 1001 illustrated in FIG. 10 from that of Embodiment 1 will be described.

Figure 38:
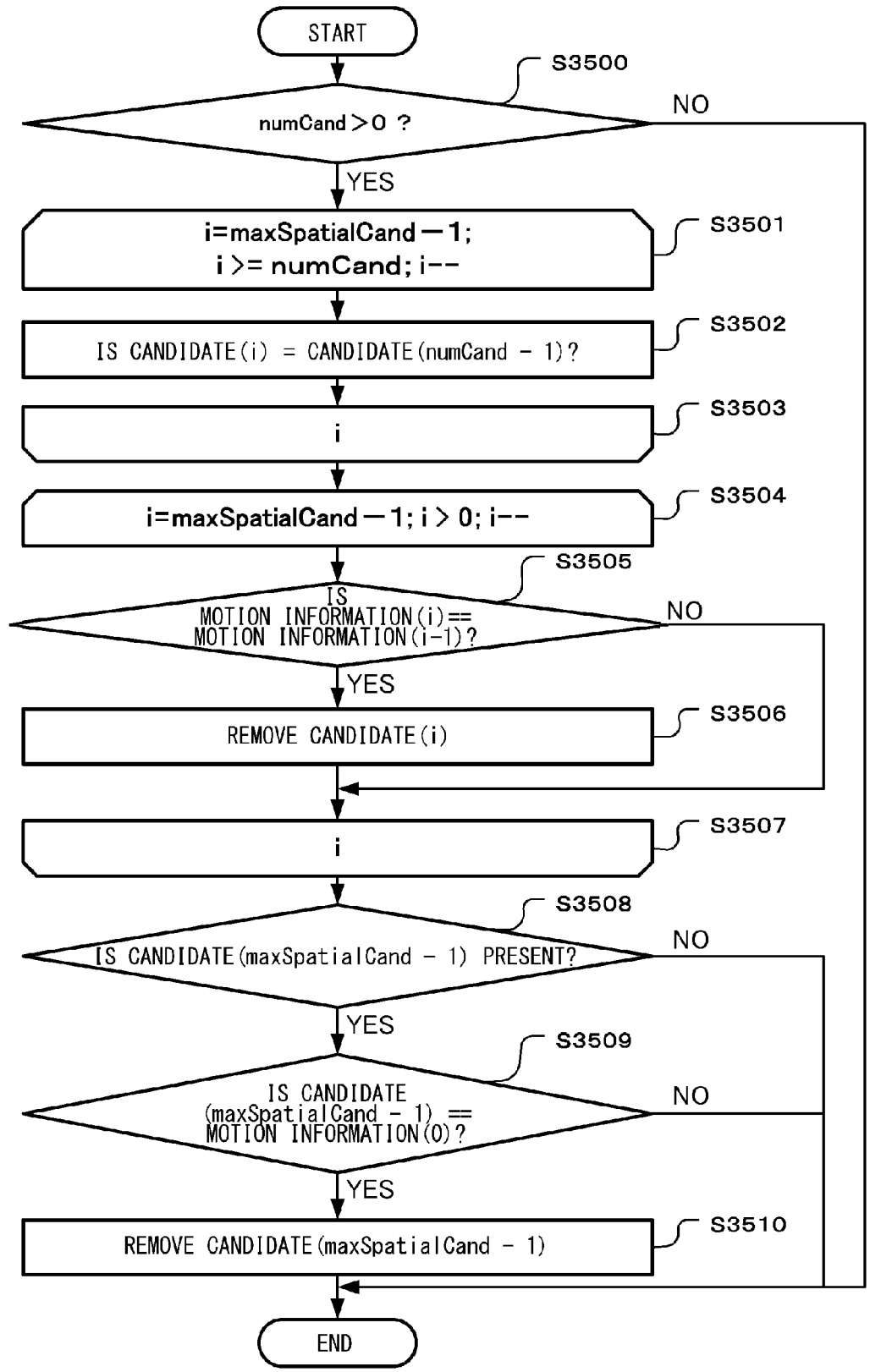
FIG. 38 is a flowchart that illustrates the detailed operation of a merging motion information candidate removing process according to Embodiment 4.

FIG. 38 is a flowchart that illustrates the detailed operation performed in the merging motion information candidate removing process according to Embodiment 4. When the number of candidates generated in the spatial merging motion information candidate list constructing process (step S1200) performed by the spatial merging motion information candidate list constructing unit 1000 is numCand, and the maximum number of the merging motion information candidates is maxSpatialCand, in a case where numCand>0 (YES in step S3500), the value of the merging motion information candidate Candidate(i) from i=maxSpatialCand−1 to i>=numCand is set to the final merging motion information candidate Candidate(numCand−1) of the merging motion information candidate list in steps S3501 to S3503.

In a case where numCand is smaller than or equal to zero (NO in step S3500), the process ends without performing any operation.

Next, the following process is repeatedly performed for the merging motion information candidate Candidate(i) from i=maxSpatialCand−1 to i>0 in steps S3504 to S3507.

In a case where the motion information Motion Information(i) of Candidate(i) and the motion information Motion Information(i−1) of Candidate(i−1) are the same (YES in step S3505), Candidate(i) is removed from the merging motion information candidate list in step S3506.

In a case where Motion Information(i) and Motion Information(i−1) are not the same (NO in step S3505), the process is repeated in step S3507.

Subsequently, in a case where Candidate(maxSpatialCand−1) is present (YES in step S3508), and the motion information Motion Information(maxSpatialCand−1) of Candidate(maxSpatialCand−1) and the first merging motion information candidate Motion Information(0) of the merging motion information candidate list are the same (YES in step S3509), Candidate(maxSpatialCand−1) is removed in step S3510, and the process ends.

In a case where Candidate(maxSpatialCand−1) is not present (NO in step S3508) or a case where Candidate (maxSpatialCand−1) is present, but Motion Information (maxSpatialCand−1) and Motion Information(0) are not the same (NO in step S3509), the process directly ends.

The merging motion information candidate removing operation according to Embodiment 4 of the present invention is different from the merging motion information candidate removing operation according to Embodiment 2 in that steps S3500 to S3503 are added, and step S30001 is removed. By adding steps S3500 to S3503, in accordance with the spatial merging motion information candidate list constructing process of step S1200 in the spatial merging motion information candidate list constructing unit 1000, in a case where the number of generated merging motion information candidates is below the maximum number of the spatial merging motion information candidates, merging motion information candidates are added at the end of the merging motion information candidates up to the maximum number of the merging motion information candidates.

Figure 39:
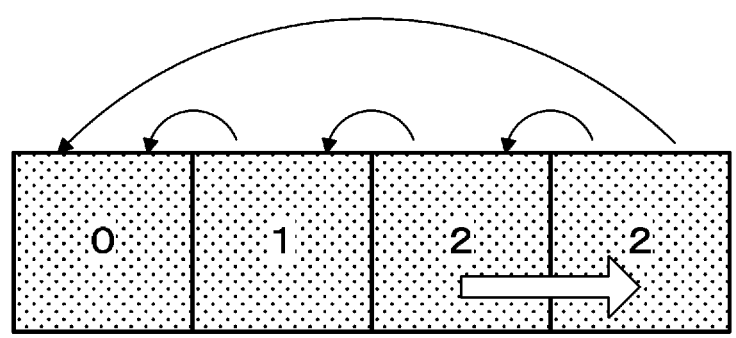
FIG. 39 is a diagram that illustrates comparative relation among motion information candidates in the merging motion information candidate removing process according to Embodiment 4.

FIG. 39 illustrates comparative relations among candidates included in the list of a case where there are four merging motion information candidates. In other words, in a case where the number of candidates added in the merging motion information candidate list is below a predetermined maximum number of candidates, the candidate of the lowest rank of the merging motion information candidate list is copied so as to embed an empty candidate, then candidates neighboring to each other in the arrangement order of the merging motion information candidate list are compared with each other, and, the identity is determined by comparing the candidate of the highest rank and the candidate of the lowest rank with each other, and duplicate candidates are removed. For example, when one candidate is lacking, the third candidate is copied to the position of the fourth candidate, then candidates neighboring to each other are compared, and the candidate of the highest rank and the candidate of the lowest rank are compared with each other. As a result, the above-described process is substantially the same as the process of making comparisons of three candidates in the round robin matching.

FIGS. 40A and 40B are diagrams that illustrate the merging motion information candidate removing operation according to Embodiment 4. FIG. 40A illustrates merging motion information candidates before and after the addition of a leading candidate in a case where the number of generated merging motion information candidates is three, and the maximum number of the spatial merging motion information candidates is four. As above, since the final merging motion information candidate is added to the position of the index 3, the comparison of the merging motion information candidates in steps S3504 to S3507 is made as illustrated in FIG. 40B, and, in a case where the number of generated merging motion information candidates is below the maximum number of the spatial merging motion information candidates, comparisons are made for all the combinations in round robin matching, and the merging motion information candidates having the same motion information can be reliably removed.

(Embodiment 5)

Next, Embodiment 5 of the present invention will be described. In Embodiment 5, a merging prediction candidate removing operation is different from that of Embodiment 1. The configurations and processes other than the merging prediction candidate removing operation are the same as those of Embodiment 1, and here, only a difference in the merging motion information list removing process performed by the merging motion information candidate list removing unit 1001 illustrated in FIG. 10 from that of Embodiment 1 will be described.

Figure 41:
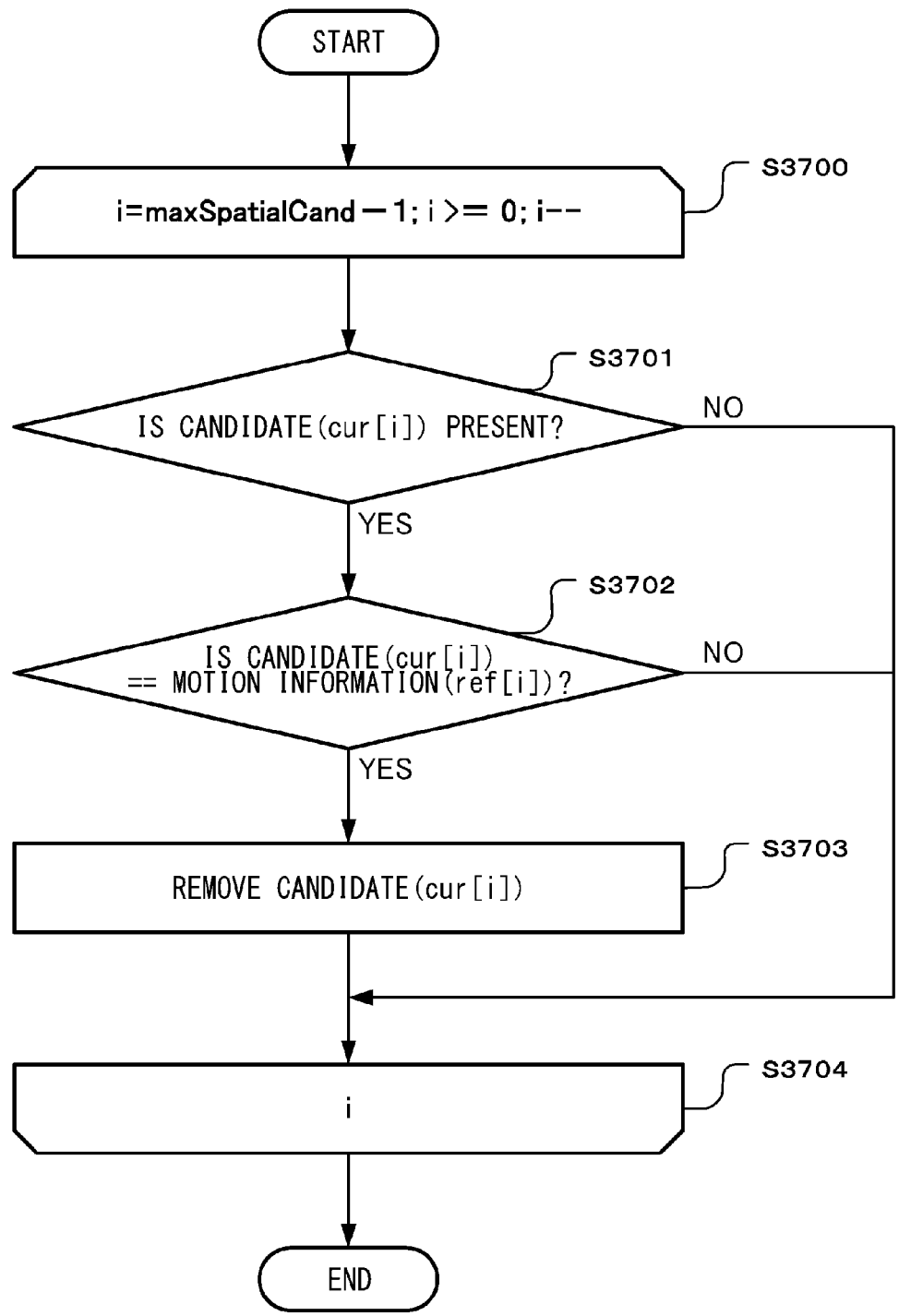
FIG. 41 is a flowchart that illustrates the detailed operation of a merging motion information candidate removing process according to Embodiment 5.

FIG. 41 is a flowchart that illustrates the detailed operation performed in the merging motion information candidate removing process according to Embodiment 3. When the maximum number of merging motion information candidates generated in the spatial merging motion information candidate list constructing process (step S1200) performed by the spatial merging motion information candidate list constructing unit 1000 is maxSpatialCand, the following process is repeatedly performed from i=maxSpatialCand−1 to i>=0 in steps S3700 to S3704.

Figure 43:
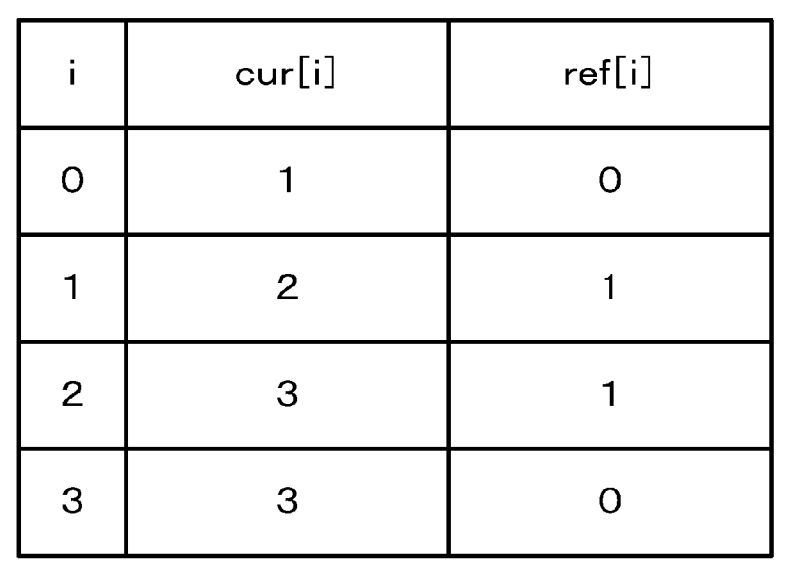

Here, the values of the comparison candidate index cur[i] and the reference candidate index ref[i] are determined as illustrated in FIG. 43 in accordance with the value of i.

In a case where the merging motion information candidate Candidate(cur[i]) of the index cur[i] is present in the merging motion information candidate list (YES in step S3701), and the motion information Motion Information(cur[i]) of Candidate(cur[i]) and the motion information Motion Information (ref[i]) of Candidate(ref[i]) are the same (YES in step S3702), Candidate(cur[i]) is removed from the merging motion information candidate list in step S3703.

On the other hand, in a case where Candidate(cur[i]) is not present (NO in step S3701) or a case where Candidate(cur[i]) is present but Motion Information(cur[i]) and Motion Information(ref[i]) are not the same (NO in step S3702), the process is repeated in step S3004.

Figure 42:
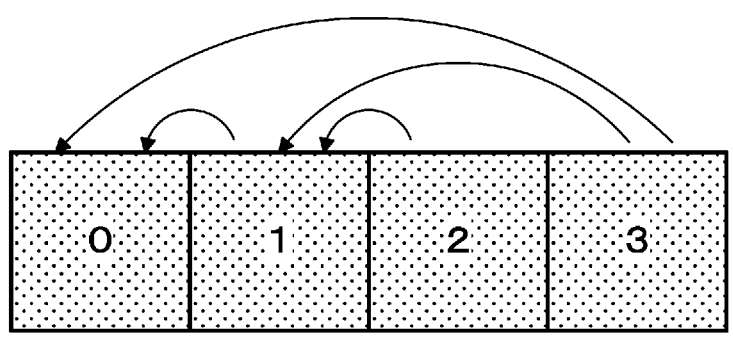
FIG. 42 is a diagram that illustrates comparative relation among motion information candidates in the merging motion information candidate removing process according to Embodiment 5.

FIG. 42 illustrates comparative relations among candidates included in the list of a case where there are four merging motion information candidates. In other words, for four spatial merging motion information candidates not including any temporal merging motion information candidate, candidates neighboring to each other up to the third position from the position of the highest rank in the arrangement order of the merging motion information candidate list are compared with each other, a candidate of the lowest rank and a candidate of the highest rank are compared with each other, and additionally, a candidate of the lowest rank and the second candidate are compared with other, whereby the identify is determined and the duplicate candidates are removed.

As illustrated in FIG. 43, in the merging prediction candidate removing operation according to Embodiment 5 of the present invention, the number of comparisons of the motion information is four, and, compared to a case where all the motion information is compared, the number of comparisons can be markedly reduced.

Figure 44:
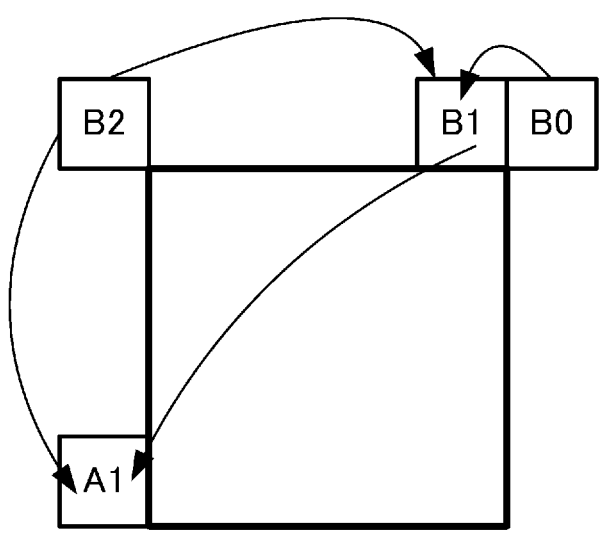
FIG. 44 is a diagram that illustrates comparative relation among motion information candidates in the merging motion information candidate removing process according to Embodiment 5.

FIG. 44 is a diagram that illustrates comparisons among neighboring blocks in the merging prediction candidate removing process according to Embodiment 5 of the present invention of a case where a maximum number of spatial merging motion information candidates is four, and a block A0 out of spatial merging motion information candidate blocks cannot be used. As illustrated in FIG. 44, according to the spatial merging motion information candidate removing operation of Embodiment 5 of the present invention, in the case where the block A0 cannot be used, comparisons between neighboring blocks are appropriately made.

In addition, FIGS. 45A to 45F are diagrams that illustrate a situation in which the block A0 can be used for various prediction block sizes and various intra-CU partition modes. In FIGS. 45A to 45F, each prediction block that can be used by the block A0 is denoted by "o", and each prediction block that cannot be used by the block A0 is denoted by "x". As illustrated in FIGS. 45A to 45F, since the frequency at which the block A0 cannot be used is high, in a case where the block A0 cannot be used, by appropriately making comparisons, the same motion information can be appropriately removed at a high frequency, and accordingly, the coding efficiency can be improved while the processing load is reduced.

(Embodiment 6)

Next, Embodiment 6 of the present invention will be described. Embodiment 6 is different from Embodiment 3 in that the configuration of the merging motion information calculating unit 906, the detailed operation performed in the merging motion information candidate list constructing process of step S1100 illustrated in FIG. 11, and the values of the number numCompare[i] of times of comparative calculation, the comparison candidate index cur[i], and the reference candidate index ref[i] in the merging prediction candidate removing operation. The other configurations and processes are the same as those of Embodiment 3, and only differences from Embodiment 3 in the configuration of the merging motion information calculating unit 906, the detailed operation performed in the merging motion information candidate list constructing process of step S1100 illustrated in FIG. 11, and the values of the number numCompare[i] of times of comparative calculation, the comparison candidate index cur[i], and the reference candidate index ref[i] in the merging prediction candidate removing operation will be described.

Figure 46:
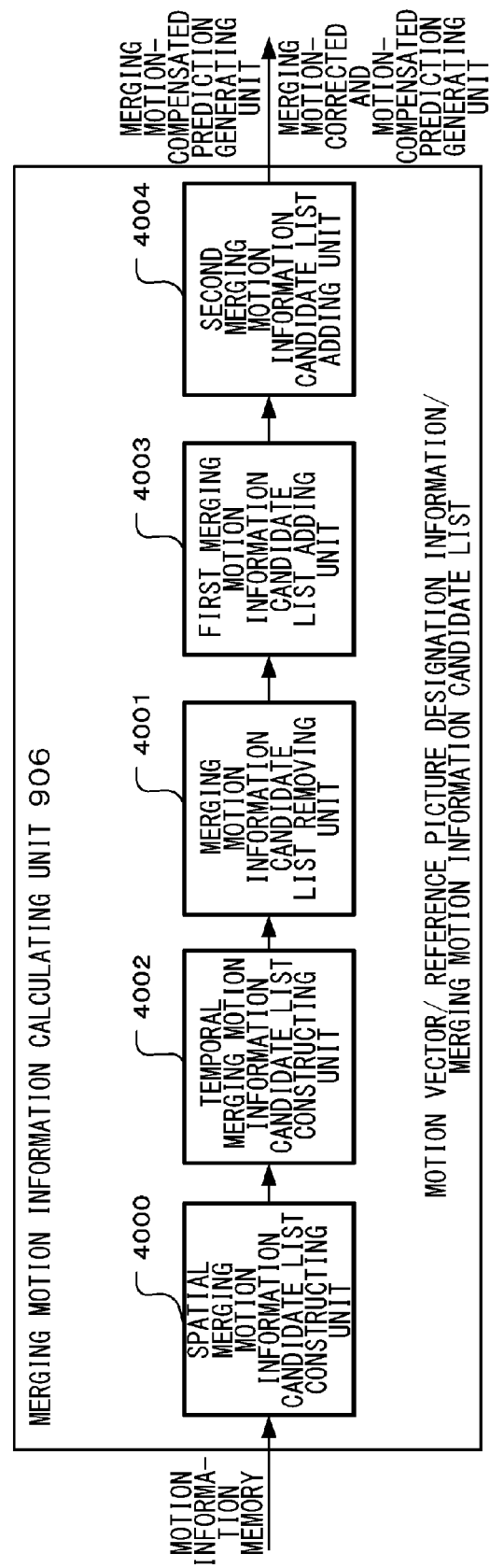
FIG. 46 is a diagram that illustrates the configuration of a merging motion information calculating unit, which is illustrated in FIG. 9, according to Embodiment 6.

FIG. 46 is a diagram that illustrates the configuration of the merging motion information calculating unit 906 according to Embodiment 6 of the present invention. The merging motion information calculating unit 906 includes: a spatial merging motion information candidate list constructing unit 4000; a temporal merging motion information candidate list constructing unit 4002; a merging motion information candidate list removing unit 4001; a first merging motion information candidate list adding unit 4003; and a second merging motion information candidate list adding unit 4004. The merging motion information calculating unit 906 generates candidates for the motion information in a predetermined order based on a candidate block groups neighboring in space, candidates having the same motion information out of the candidates are removed, and candidates for the motion information that are generated based on neighboring block groups neighboring in time are added, whereby only valid motion information is added as motion information candidates.

Figure 47:
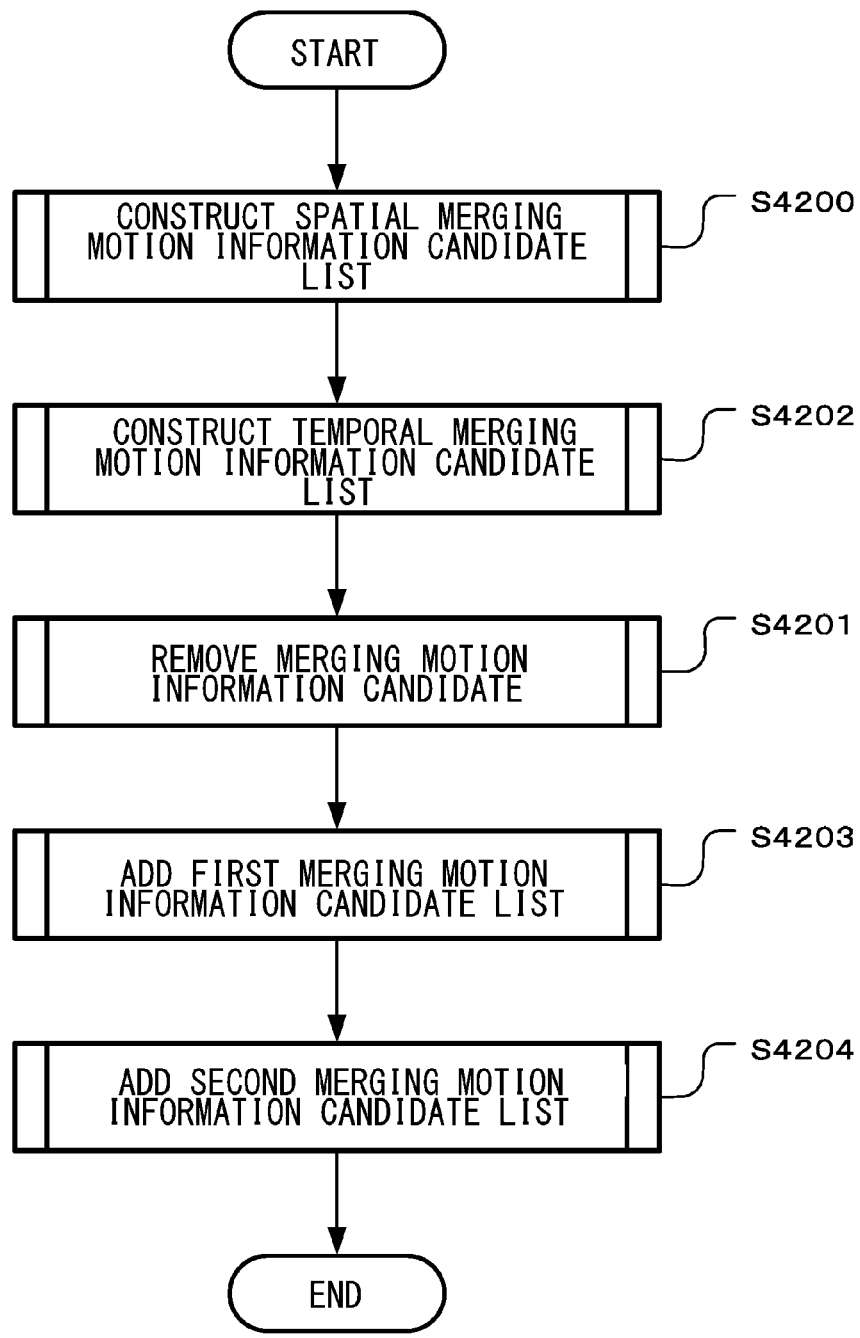
FIG. 47 is a flowchart that illustrates the detailed operation of a merging motion information candidate list constructing process according to Embodiment 6.

FIG. 47 is a flowchart that illustrates the detailed operation of the merging motion information candidate list constructing process of step S1100 illustrated in FIG. 11 according to Embodiment 6 of the present invention. This operation illustrates the detailed operation of Embodiment 6 of the present invention according to the configuration of the merging motion information calculating unit 906 illustrated in FIG. 9.

The spatial merging motion information candidate list constructing operation of step S4200, the temporal merging motion information candidate list constructing operation of step S4202, the first merging motion information candidate list adding operation of step S4203, and the second merging motion information candidate list adding operation of step S4204 of FIG. 47 are the same as steps of Embodiment 3 of the present invention to which the same reference signs as those represented in FIG. 12 are assigned, and description thereof will not be presented.

The merging motion information candidate list removing unit 4001 updates the motion information candidate list by removing merging motion information candidates having the same motion information from the merging motion information candidate list constructed by the temporal merging motion information candidate list constructing unit 4002 in step S4201. The merging motion information candidate list removing unit 4001 is arranged on a stage later than that of the temporal merging motion information candidate list constructing unit 4002, and the temporal merging motion information candidates are included in the merging prediction candidate removing process in the merging prediction candidate removing operation to be described later, which are features of Embodiment 6 of the present invention.

Next, the detailed operation performed in the merging prediction candidate removing process according to Embodiment 6 of the present invention will be described with reference to FIGS. 35 and 48A and 48B. FIG. 35 is a flowchart that illustrates the detailed operation of the merging prediction candidate removing process according to Embodiment 6 and is the same as that according to Embodiment 3 of the present invention.

In addition, the number of the merging prediction candidates included in the merging motion information candidate list constructed by the temporal merging motion information candidate list constructing unit 4002 is numCand, the number numCompare[i] of times of comparative calculation is determined as illustrated in FIG. 48A in accordance with the value of numCand, and the values of the comparison candidate index cur[i] and the reference candidate index ref[i] are determined as illustrated in FIG. 48B in accordance with the value of i.

In Embodiment 6 of the present invention, a maximum value of the number of spatial merging prediction candidates generated by the spatial merging motion information candidate list constructing unit 4000 is four, and temporal merging motion information candidates are generated by the temporal merging motion information candidate list constructing unit 4002. Accordingly, while a maximum value of the number of the merging prediction candidates included in the merging prediction candidate list is five, as illustrated in FIG. 48A, the number numCompare[i] of times of comparative calculation is four also when the value of numCand is five.

In other words, in a case where the number of the spatial motion information candidates generated by the spatial merging motion information candidate list constructing unit 4000 is four that is the maximum value, the temporal merging motion information candidates generated by the temporal merging motion information candidate list constructing unit 4002 are not the targets for the comparative calculation in the merging prediction candidate removing operation. Accordingly, the operation of performing the merging motion information candidate removing process of step S4201 on a stage before that of the temporal merging motion information candidate list constructing process of step S4202, in other words, the same operation as the merging motion information candidate list constructing operation according to Embodiment 3 of the present invention is performed.

On the other hand, in a case where the number of the spatial motion information candidates generated by the spatial merging motion information candidate list constructing unit 4000 is below four, the temporal merging motion information candidates generated by the temporal merging motion information candidate list constructing unit 4002 are also the targets for the comparative calculation in the merging prediction candidate removing operation.

Figure 49A:
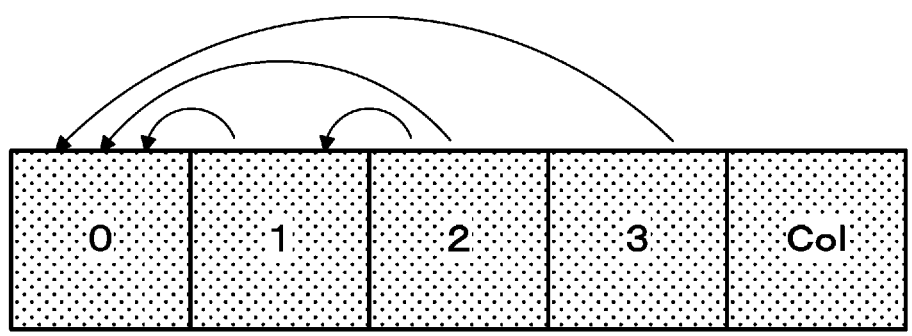
FIGS. 49A and 49B are diagrams that illustrate comparative relation among motion information candidates in the merging motion information candidate removing process according to Embodiment 6.
Figure 49B:
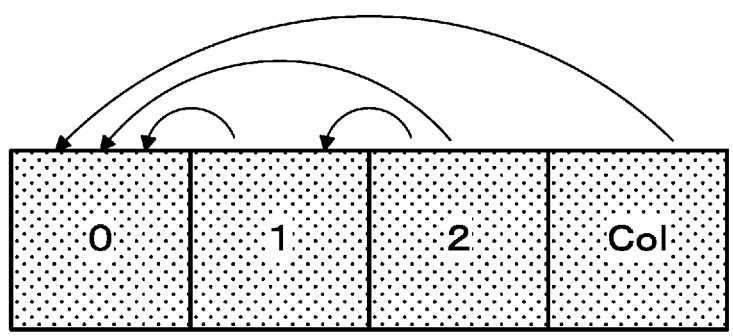

FIGS. 49A and 49B illustrate comparison relations among candidates included in the list of a case where there are four spatial merging motion information candidates and a case where there are three spatial merging motion information candidates. In other words, in the case where there are four spatial merging motion information candidates (FIG. 49A), for the four spatial merging motion information candidates not including any temporal merging motion information candidate, candidates included up to the third from the position of the highest rank in the arrangement order of the merging motion information candidate list are compared with each other in the round robin matching, the identity is determined by comparing the candidate of the highest rank and the candidate of the lowest rank with each other as is necessary, and duplicate candidates are removed. In the case where there are three spatial merging motion information candidates (FIG. 49B), for four merging motion information candidates including a temporal merging motion information candidate, candidates included up to the third from the position of the highest rank in the arrangement order of the merging motion information candidate list are compared with each other in the round robin matching, the identity is determined by comparing the candidate of the highest rank and the candidate of the lowest rank with each other as is necessary, and duplicate candidates are removed.

Accordingly, in a case where the number of valid spatial motion information candidates is the maximum value, the temporal merging motion information candidate having different characteristics is excluded from the target for the merging motion information candidate removing process so as to reduce the processing load. On the other hand, in a case where the number of valid spatial motion information candidates is below the maximum value, the temporal merging motion information candidate is set as the target for the merging motion information candidate removing process, and accordingly, the accuracy of the merging motion information candidate removing process can be further improved with the same processing load. Therefore, the coding efficiency of the motion information can be improved while the processing load is reduced.

In the description presented above, while an example has been described in which the method of Embodiment 3 is used as the method of comparing the merging prediction candidates in Embodiment 6, any of the methods of Embodiments 1, 2, 4, and 5 may be applied as the method of comparing the merging prediction candidates in Embodiment 6.

The moving picture coding devices and the moving picture decoding devices according to the above-described embodiments have the following technical aspects.

[1] In the candidate removing process according to the merge coding technology, the candidate removing process is performed before the construction of the temporal merging motion information candidate, and the temporal merging prediction candidate is excluded from the target for the candidate removing process (see steps S1201 and S1202 illustrated in FIGS. 10 and 12). Accordingly, the number of times of calculation for comparing candidates in the candidate removing process can be reduced while the coding efficiency is maintained.

[2] In the candidate removing process according to the merge coding technology, the merging motion information candidates added in the merging motion information candidate list are compared with each other in the order in which the merging motion information candidates are added to the list, and then, the final candidate and the first candidate are compared with each other (see steps S3000 to S3018 illustrated in FIG. 31).

[3] In the candidate removing process according to the merge coding technology, the comparative calculation process determining the identity of merging motion information candidates included in the merging motion information candidate list is performed for the number of times that is determined in advance for the index determined in advance (see steps S3300 to S3303 illustrated in FIG. 35, FIGS. 37A and 37B, steps S3700 to S3704 illustrated in FIG. 41, FIG. 43, steps S4200 to S4204 illustrated in FIG. 47, and FIGS. 48A and 48B).

[4] In the candidate removing process according to the merge coding technology, in a case where the number of merging motion information candidates generated in the spatial merging information candidate generating process is below the maximum value, merging motion information candidates of the indexes, which are determined in advance, of the merging motion information candidate list are added until the number of the merging motion information candidates arrives at the maximum value, and then the comparative calculation of the motion information of the candidates is performed (see steps S3501 to S3503 illustrated in FIG. 38).

The bitstream of a moving picture output by the moving picture coding device according to the embodiment described above has a specific data format so as to be decoded in accordance with the coding method used in the embodiment, and accordingly, the moving picture decoding device corresponding to the moving picture coding device can decode the bitstream of the specific data format.

In a case where a wired or wireless network is used for exchanging a bitstream between the moving picture coding device and the moving picture decoding device, the bitstream may be converted into a data format that is appropriate for the transmission form in a communication path and be transmitted. In such a case, a moving picture reception device is disposed, which converts a bitstream output by the moving picture coding device into coding data of a data format that is appropriate to the transmission form in the communication path, receives the coding data from a moving picture transmission device that transmits the coding data to the network and the network, restores the bitstream from the coding data, and supplies the restored bitstream to the moving picture decoding device.

The moving picture transmission device includes: a memory that buffers a bitstream output by the moving picture coding device; a packet processing unit that packetizes the bitstream; and a transmission unit that transmits packetized coding data through a network. The moving picture reception device includes: a reception unit that receives packetized coding data through a network; a memory that buffers the received coding data; and a packet processing unit that generates a bitstream by performing a packet process of coding data and supplies the generated bitstream to the moving picture decoding device.

The processes relating to the coding and decoding described above may be realized not only as a transmission/storage/reception device using hardware but also by firmware stored in a read only memory (ROM), a flash memory, or the like or software of a computer or the like. The firmware or the software program may be provided with being recorded in a recording medium that can be read by a computer or the like, may be provided from a server through a wired or wireless network, or may be provided as data broadcasting of satellite digital broadcasting.

As above, the present invention has been described based on the embodiments. However, such embodiments are merely examples, and it is understood to a person skilled in the art that various modifications may be made in each constituent element thereof or a combination of each process sequence, and such modified examples also belong to the scope of the present invention.

What is claimed is:

1. A moving picture decoding device that decodes a coded bitstream in units of blocks acquired by partitioning each picture of moving picture data, the moving picture decoding device comprising:
  a candidate list constructing unit configured to derive motion information of a decoded block included in a picture that is different in time from a picture including a decoding target block that is a target for the decoding, derive a temporal motion information candidate of the decoding target block based on the derived motion information of the decoded block, derive a plurality of candidates based on motion information of a plurality of decoded neighboring blocks located at predetermined positions neighboring to the decoding target block in space, derive spatial motion information candidates based on the plurality of derived candidates, and construct a list of motion information candidates including the derived temporal motion information candidate and the derived spatial motion information candidates; and
  a decoding unit configured to decode information representing whether or not the decoding is performed in a merging prediction mode deriving the motion information of the decoding target block based on the motion information candidates included in the list, in a case where the information representing to perform the decoding in the merging prediction mode is decoded, decode an index designating a predetermined motion information candidate included in the list, derive the motion information of the decoding target block based on the motion information candidate designated by the decoded index, and decodes the decoding target block,
  wherein the candidate list constructing unit does not compare all possible combinations of the spatial motion information candidates with each other but compares predefined partial combinations of the spatial motion information candidates with each other and, in a case where there are candidates having the same moving information out of the candidates, derives one spatial motion information candidate from the candidates of which the motion information is the same.

2. A moving picture decoding method for decoding a coded bitstream in units of blocks acquired by partitioning each picture of moving picture data, the moving picture decoding method comprising:
  deriving motion information of a decoded block included in a picture that is different in time from a picture including a decoding target block that is a target for the decoding, deriving a temporal motion information candidate of the decoding target block based on the derived motion information of the decoded block, deriving a plurality of candidates based on motion information of a plurality of decoded neighboring blocks located at predetermined positions neighboring to the decoding target block in space, deriving spatial motion information candidates based on the plurality of derived candidates, and constructing a list of motion information candidates including the derived temporal motion information candidate and the derived spatial motion information candidates; and decoding information representing whether or not the decoding is performed in a merging prediction mode deriving the motion information of the decoding target block based on the motion information candidates included in the list, in a case where the information representing to perform the decoding in the merging prediction mode is decoded, decoding an index designating a predetermined motion information candidate included in the list, deriving the motion information of the decoding target block based on the motion information candidate designated by the decoded index, and decoding the decoding target block, wherein, in the constructing of a list of motion information candidates, all possible combinations of the spatial motion information candidates are not compared with each other but predefined partial combinations of the spatial motion information candidates are compared with each other and, in a case where there are candidates having the same moving information out of the candidates, one spatial motion information candidate is derived from the candidates of which the motion information is the same.

3. A non-transitory computer readable medium having a moving picture decoding program for decoding a coded bitstream in units of blocks acquired by partitioning each picture of moving picture data stored thereon, the moving picture decoding program causes a computer to perform:

deriving motion information of a decoded block included in a picture that is different in time from a picture including a decoding target block that is a target for the decoding, deriving a temporal motion information candidate of the decoding target block based on the derived motion information of the decoded block, deriving a plurality of candidates based on motion information of a plurality of decoded neighboring blocks located at predetermined positions neighboring to the decoding target block in space, deriving spatial motion information candidates based on the plurality of derived candidates, and constructing a list of motion information candidates including the derived temporal motion information candidate and the derived spatial motion information candidates; and decoding information representing whether or not the decoding is performed in a merging prediction mode deriving the motion information of the decoding target block based on the motion information candidates included in the list, in a case where the information representing to perform the decoding in the merging prediction mode is decoded, decoding an index designating a predetermined motion information candidate included in the list, deriving the motion information of the decoding target block based on the motion information candidate designated by the decoded index, and decoding the decoding target block, wherein, in the constructing of a list of motion information candidates, all possible combinations of the spatial motion information candidates are not compared with each other but predefined partial combinations of the spatial motion information candidates are compared with each other and, in a case where there are candidates having the same moving information out of the candidates, one spatial motion information candidate is derived from the candidates of which the motion information is the same.

* * * * *